United States Patent

Yanai et al.

[11] Patent Number: 5,872,596
[45] Date of Patent: *Feb. 16, 1999

[54] DEVICE FOR WIDENING THE DYNAMIC RANGE OF SOLID-STATE IMAGE PICKUP ELEMENTS

[75] Inventors: Toshikazu Yanai, Kawasaki; Shigeo Ogura; Makoto Kondo, both of Yokohama; Eiji Ohara, Kawasaki, all of Japan

[73] Assignee: Canon Kabushiki Kaisha, Toyko, Japan

[*] Notice: This patent issued on a continued prosecution application filed under 37 CFR 1.53(d), and is subject to the twenty year patent term provisions of 35 U.S.C. 154(a)(2).

[21] Appl. No.: 554,461

[22] Filed: Nov. 7, 1995

Related U.S. Application Data

[63] Continuation of Ser. No. 125,820, Sep. 24, 1993, abandoned.

[30] Foreign Application Priority Data

Sep. 28, 1992 [JP] Japan ................................. 4-281129
Dec. 25, 1992 [JP] Japan ................................. 4-358965
Dec. 28, 1992 [JP] Japan ................................. 4-360134

[51] Int. Cl.$^6$ .............................. H04N 3/14; H04N 5/335
[52] U.S. Cl. ........................................... 348/297; 348/296
[58] Field of Search ................................. 348/294–297, 348/299, 367, 241, 314, 674, 678, 302

[56] References Cited

U.S. PATENT DOCUMENTS

| | | | |
|---|---|---|---|
| 3,934,161 | 1/1976 | Caywood | 307/311 |
| 4,663,667 | 5/1987 | Shenk | 358/169 |
| 4,831,453 | 5/1989 | Takemura | 358/213.19 |
| 4,835,617 | 5/1989 | Todaka et al. | 358/213.13 |
| 5,003,394 | 3/1991 | Lagoni | 358/168 |
| 5,055,667 | 10/1991 | Sayag | 250/208.1 |
| 5,182,658 | 1/1993 | Ishizaki et al. | 348/297 |
| 5,233,428 | 8/1993 | Alford et al. | 348/296 |
| 5,257,108 | 10/1993 | Muraoka | 358/164 |
| 5,264,940 | 11/1993 | Komiya et al. | 358/228 |
| 5,539,460 | 7/1996 | Tamura | 348/296 |

*Primary Examiner*—Bipin Shalwala
*Attorney, Agent, or Firm*—Fitzpatrick, Cella, Harper & Scinto

[57] ABSTRACT

An image pickup device includes a decision circuit for comparing a signal amount stored in each pixel of a solid-state image pickup element with a predetermined signal amount which is set in advance, thereby deciding which of the two signal amounts is larger, a time measuring circuit for measuring a time required for the signal amount stored in each pixel to reach the predetermined signal amount, and an operating circuit for operating the stored signal of the pixel whose stored signal amount is found to be larger than the predetermined signal amount by the decision circuit, on the basis of the time information obtained from the time measuring circuit.

6 Claims, 40 Drawing Sheets

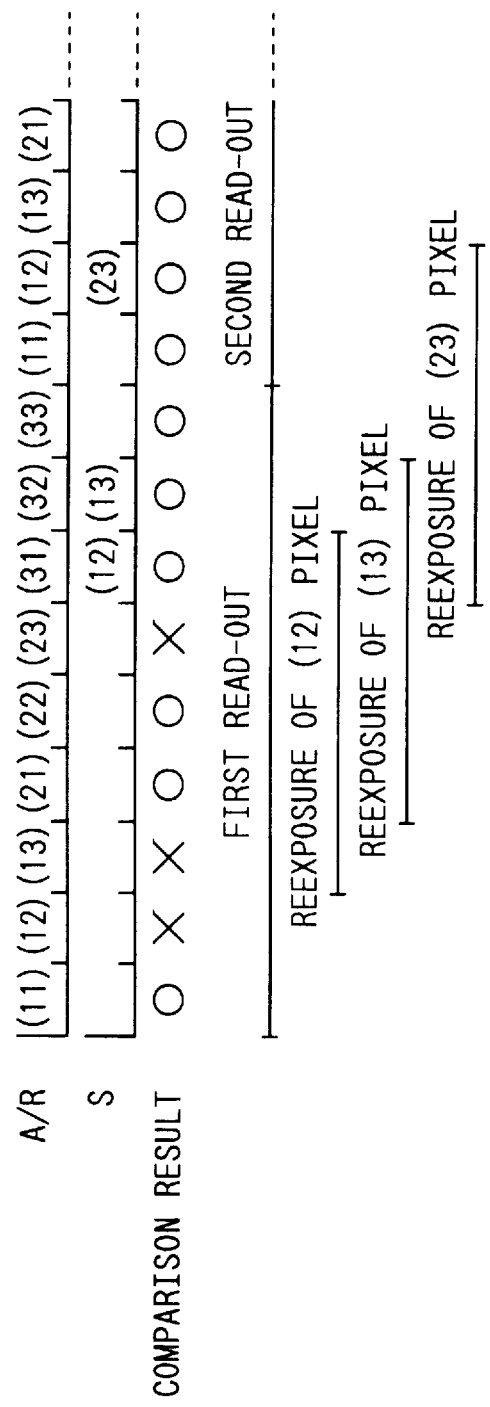

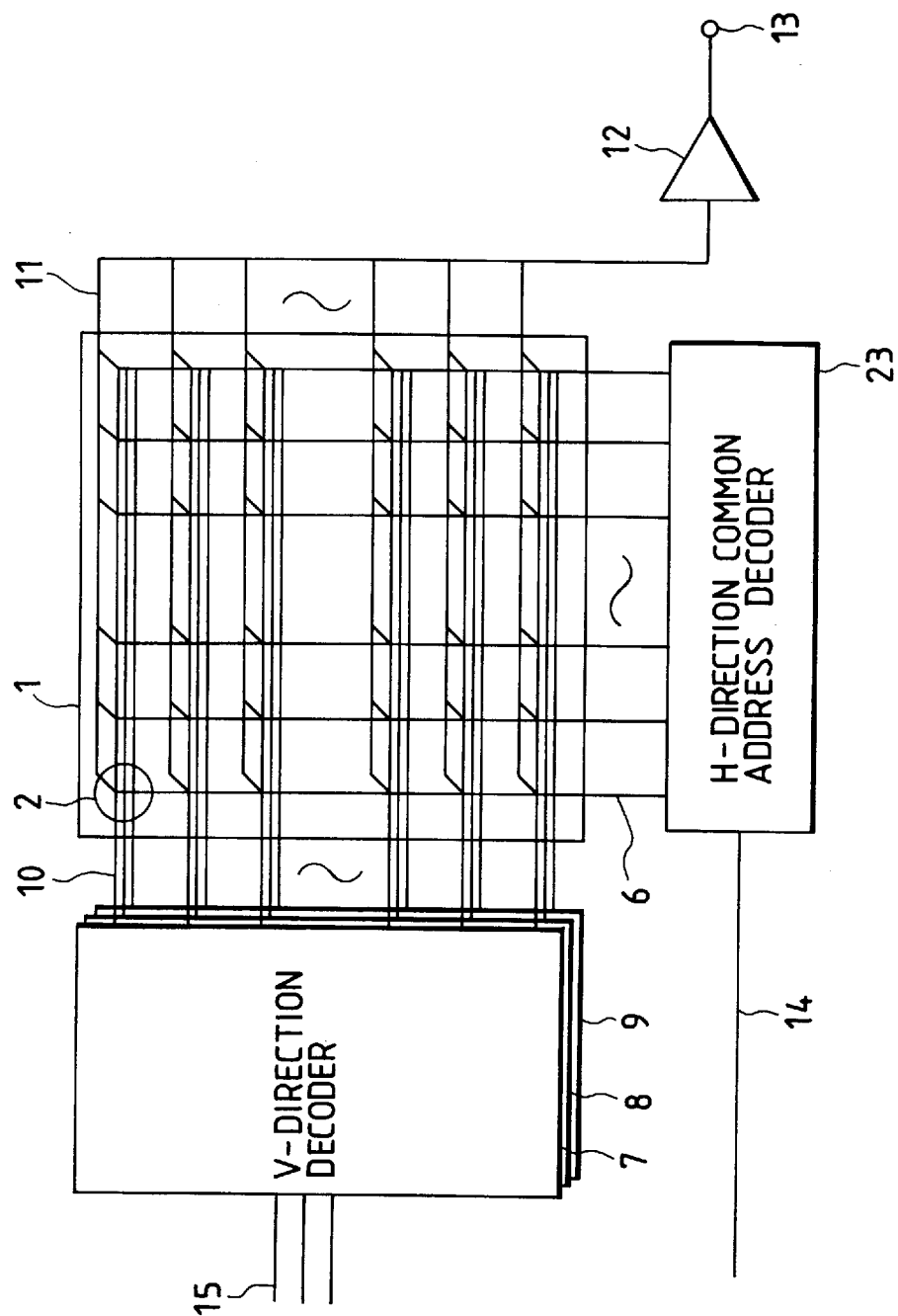

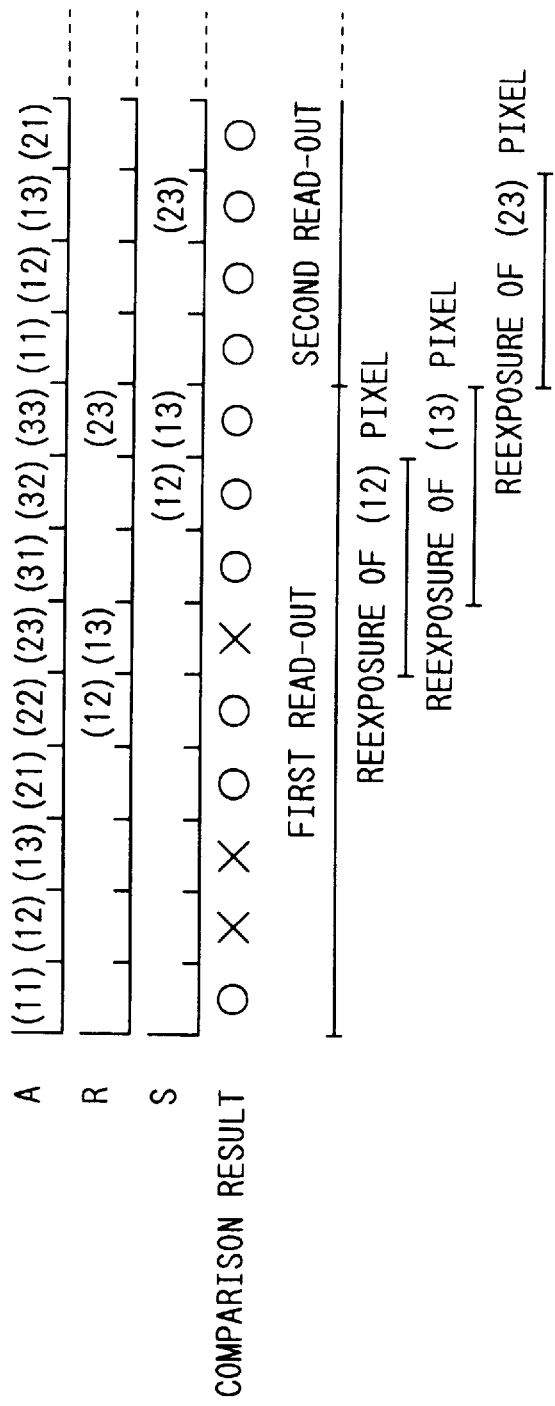

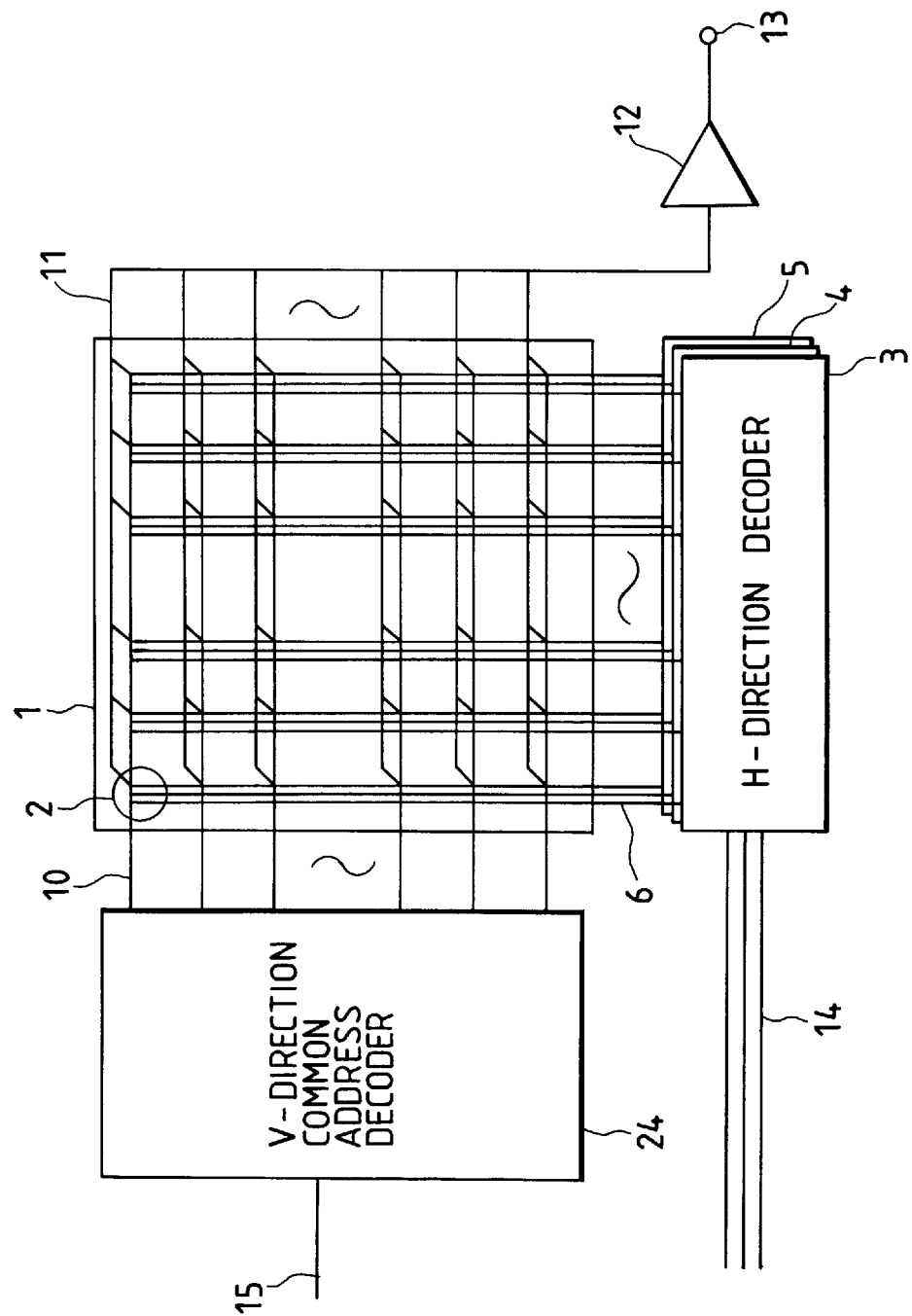

DEVICE FOR WIDENING THE DYNAMIC RANGE OF SOLID-STATE IMAGE PICKUP ELEMENTS

This application is a continuation of application Ser. No. 08/125,820 filed Sep. 24, 1993, now abandoned.

BACKGROUND OF THE INVENTION

1. Field of the Invention

The present invention relates to an image pickup device and, more particularly, to an image pickup device which uses a solid-state image pickup element and has a wide dynamic range.

2. Related Background Art

Conventionally, there have been proposed a large number of inventions related to widening of the dynamic ranges of image pickup devices using solid-state image pickup elements. As an example of these conventional techniques, there is a method of dividing one field period of a television signal mode into a plurality of periods and adding signals stored in the individual divided periods. This prevents saturation of the stored electric charge, thereby widening the dynamic range.

As another example, there is a method in which long and short different charge storage times are set, and, if overflow occurs in the long storage time, the corresponding signal is removed, and the signal stored in the short storage time is output, thereby preventing overflow and blooming.

In the former example, however, noise components are mixed because signals are read out a plurality of number of times, and this degrades the S/N ratio, leading to a decrease in the dynamic range. The latter example has a problem of complexity in the stored gate signal. In addition, the storage time is shortened in an overflowed pixel unlike in other pixels, and the charge amount of this pixel becomes smaller than those of other pixels which have not overflown.

SUMMARY OF THE INVENTION

The present invention has been made in consideration of the above problems and has as its object to obtain an image with a wide dynamic range regardless of whether individual pixels are saturated.

An image pickup device according to one embodiment of the present invention comprises decision means for comparing a signal amount stored in each pixel of a solid-state image pickup element with a predetermined signal amount which is set in advance, thereby deciding which of the two signal amounts is larger, time measuring means for measuring a time required for the signal amount stored in each pixel to reach the predetermined signal amount, and operating means for operating the stored signal of the pixel whose stored signal amount is found to be larger than the predetermined signal amount by the decision means, on the basis of the time information obtained from the time measuring means.

An image pickup device according to another embodiment of the present invention comprises decision means for comparing a signal amount stored in each pixel of a solid-state image pickup element with a predetermined signal amount, thereby deciding whether the signal amounts stored in each pixel has reached the predetermined signal amount, and reset means for resetting the stored signal for each pixel in accordance with the decision result of the decision means.

In the former embodiment, the time measuring means measures the time required for the signal amount stored in each pixel of the solid-state image pickup element to reach the predetermined signal amount. Therefore, when the signal amount stored in a given pixel of the solid-state image pickup element has reached the predetermined amount, the total stored amount of the pixel within a predetermined time can be calculated on the basis of the value measured by the time measuring means.

In the latter embodiment, the signal amount stored in each pixel of the solid-state image pickup element is compared with the predetermined signal amount to thereby decide whether the signal amount stored in each pixel has reached the predetermined signal amount. In addition, the stored charge is reset for each pixel in accordance with the decision result. This makes it possible to calculate the total stored signal of each pixel from the number of reset times within a predetermined time and the signal amount stored after the predetermined time has elapsed.

Other objects and features of the present invention will become apparent from the following detailed description taken in conjunction with the accompanying drawings.

BRIEF DESCRIPTION OF THE DRAWINGS

FIG. 11 is a view showing the operation of the solid-state image pickup element according to the embodiment shown in FIG. 8;

FIG. 22 is a view showing the circuit configuration of still another embodiment of a solid-state image pickup element according to the present invention;

FIG. 24 is a view showing the operation of the solid-state image pickup element according to the embodiment shown in FIG. 22;

FIG. 26 is a view showing the circuit configuration of still another embodiment of a solid-state image pickup element according to the present invention;

DETAILED DESCRIPTION OF THE PREFERRED EMBODIMENTS

Figure 1:
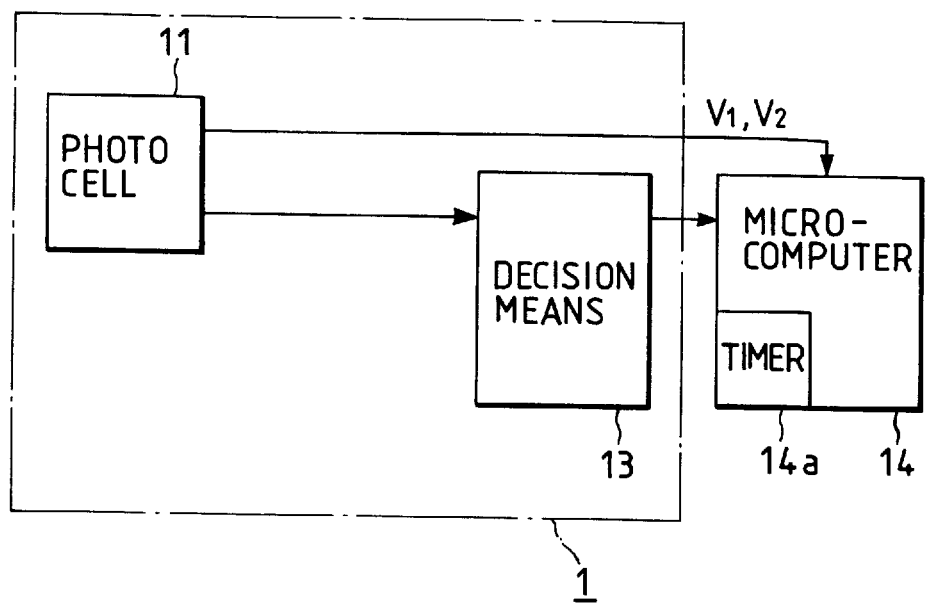
FIG. 1 is a block diagram showing the schematic arrangement of an image pickup device according to the first embodiment of the present invention.
Figure 2:
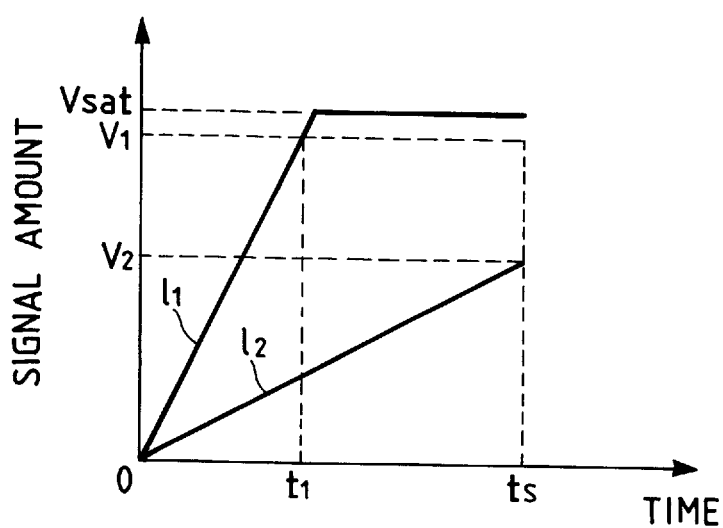
FIG. 2 is a graph showing the relationship between the signal amount stored in one pixel and time.

The preferred embodiments of an image pickup device of the present invention will be described in detail below with reference to the accompanying drawings. FIGS. 1 and 2 show the first embodiment of an image pickup device of the present invention. FIG. 1 is a block diagram showing the schematic arrangement of the image pickup device, and FIG. 2 is a graph showing the relationship between the storage time and the signal amount.

Referring to FIG. 1, a photo cell 11 stores an electric charge of one pixel of an image pickup element 1. When the signal amount stored in the photo cell 11 exceeds a predetermined signal amount, a decision means 13 generates a signal indicating the situation. A microcomputer 14 has a timer 14a for measuring for each pixel the time between starting storage and outputting the signal from the decision means 13.

Two cases of the way the signal charge is stored in the photo cell 11 will be described with reference to FIG. 2.

In the first case, the stored signal amount exceeds a predetermined signal amount ($V_1$) within a predetermined storage time ($t_s$).

In this case, the signal amount increases along a first straight line $l_1$. When the stored signal amount becomes equal to the predetermined signal amount $V_1$, the microcomputer 14 measures a time $t_1$ until the stored signal amount reaches the predetermined signal amount $V_1$ in accordance with the signal from the decision means 13.

The signal amount $V_1$ as a threshold value is commonly set at a value close to a saturation signal amount $V_{sat}$ of the photo cell 11 so as to obtain an S/N ratio as high as possible. For this reason, the stored signal amount reaches the saturation signal amount $V_{sat}$ within a short time period after it exceeds the predetermined signal amount $V_1$.

Thereafter, when time elapses to reach the predetermined storage time ($t_s$), the signal storage is finished. This predetermined storage time $t_s$ is one field period (1/60 sec) in, e.g., a camera-integrated recorder, and corresponds to a shutter speed of, e.g., 1/500 sec in an electronic still camera.

Generally, the microcomputer 14 computes a stored signal amount Vi of the photo cell 11 from Equation 1 below:

$$V_i = V_1 \times t_s / t_1 \qquad \text{(Equation 1)}$$

If the stored signal amount $V_i$ does not exceed the predetermined signal amount $V_1$ within the predetermined storage time $t_s$, the signals stored in the photo cell 11 along a straight line $l_2$ reach a signal amount $V_2$ when the predetermined storage time $t_s$ has elapsed.

In this case, therefore, the stored signal amount $V_i$ of the photo cell 11 is calculated by Equation 2 below:

$$V_i = V_2 \qquad \text{(Equation 2)}$$

(for $V_1 \geq V_2$)

If an object to be photographed has a high-luminance portion, it is a common practice to perform correction for controlling the slope of photoelectric conversion characteristics in a high-luminance range of an output from an image pickup element, i.e., so-called knee correction.

The principle of applying this knee correction to the present invention will be described below with reference to FIG. 3.

Figure 3:
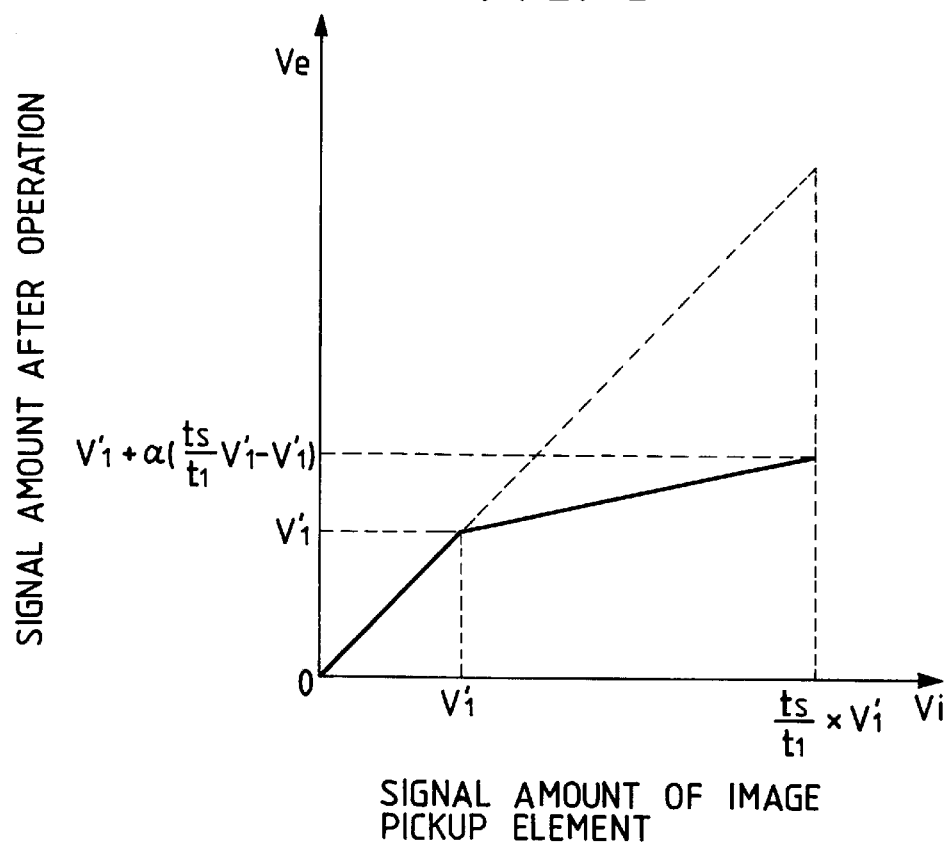
FIG. 3 is a graph showing the stored signal amount after knee correction.

As described above, the signal amount $V_i$ from the image pickup element, plotted on the abscissa in FIG. 3, changes linearly in accordance with the light input and is calculated by Equation 1 or 2 above.

The slope is therefore changed in a high-luminance portion where the signal amount is a predetermined signal amount $V_1'$ or more, thereby obtaining a signal amount after knee correction by the following equations:

(1) If $V_e > V_1'$, $$V_e = V_1' + \alpha(t_s/t_1 \cdot V_1' - V_1') \qquad \text{(Equation 3)}$$

for $1 \geq \alpha \geq 0$.

(2) If $V_e \leq V_1'$, $$V_e = V_1' \qquad \text{(Equation 4)}$$

Various types of knee correction can be made by varying the coefficient $\alpha$ of Equation 3 as a function of the time $t_1$. For example, upon substituting $\alpha = t_1/t_s$ into Equation 3, Equation 3 becomes:

$$\begin{aligned} V_e &= V_1' + \alpha(t_s/t_1 \cdot V_1' - V_1') \\ &= V_1' + t_1/t_s \cdot (t_s/t_1 \cdot V_1' - V_1') \\ &= V_1' + V_1' - t_1/t_s \cdot V_1' \\ &= (2 - t_1/t_s) \cdot V_1' \end{aligned}$$

(for $V_e > V_1'$)

Figure 4:
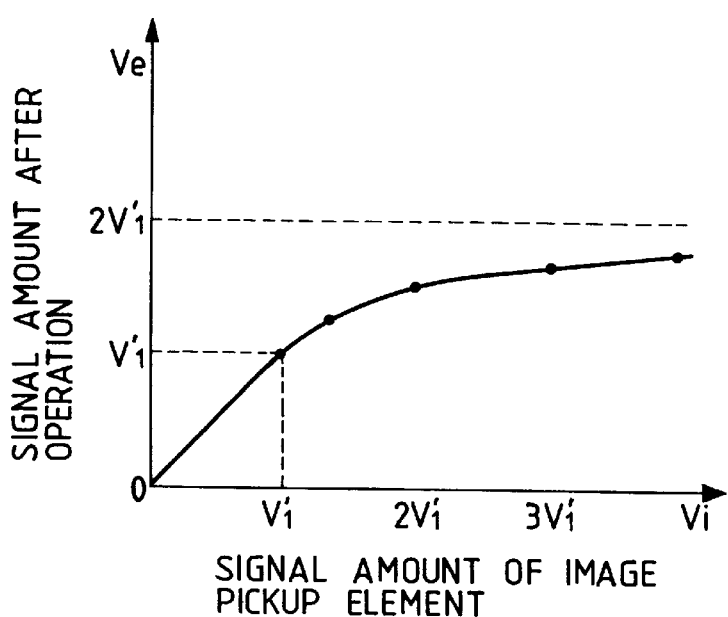
FIG. 4 is a graph showing the stored signal amount after knee correction.

As shown in FIG. 4, this draws a curve, $V_e = 2V_1'$, for $t_1 \to 0$. That is, the earlier the time $t_1$ at which the stored signal amount reaches $V_1'$, i.e., the higher the luminance of a portion, the stronger the signal amount is compressed, and so better knee characteristics can be obtained.

The second embodiment of an image pickup device of the present invention will be described below with reference to the accompanying drawings.

Figure 5:
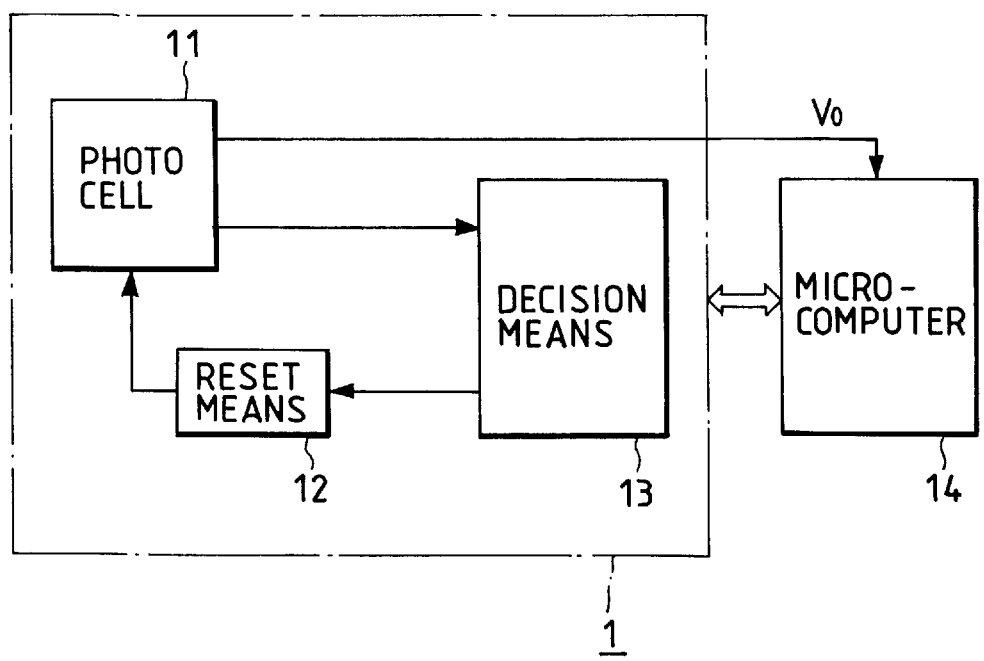
FIG. 5 is a block diagram showing the schematic arrangement of an image pickup device according to the second embodiment of the present invention.
Figure 6:
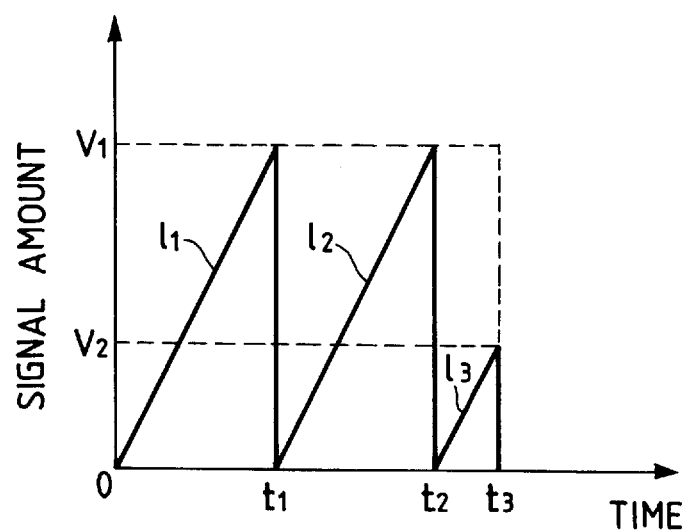
FIG. 6 is a graph showing the relationship between the signal amount stored in one pixel and time.

FIGS. 5 and 6 illustrate the second embodiment of the present invention, in which FIG. 5 is a block diagram showing the schematic arrangement of the embodiment, and FIG. 6 is graph.

Referring to FIG. 5, a photo cell 11 stores an electric charge of one pixel. A reset means 12 resets the electric charge stored in the photo cell 11. A decision means 13 operates the reset means 12 in accordance with a signal amount ($V_1$ in FIG. 2) stored in the photo cell 11. A microcomputer 14 records the number of reset times and a signal amount $V_0$ from the photo cell 11 in a circuit system 1 with this configuration.

The way in which an electric charge is stored in the photo cell 11 of this embodiment will be described below with reference to FIG. 6.

Signals generated when the photo cell 11 is irradiated with light increase along a straight line $l_1$ with time. When the signals reach a predetermined signal amount $V_1$ which is set beforehand, the decision means 13 operates to reset the electric charge stored in the photo cell 11 (time $t_1$).

The photo cell 11 in which the stored charge is reset in this manner again starts storing an electric charge after the time $t_1$ and increases its signal amount along a straight line $l_2$. When the signal amount again reaches the signal amount $V_1$ at time $t_2$, the stored charge is reset.

The photo cell 11 in which the electric charge is reset again restarts charge storage after the time $t_2$ and increases its signal amount along a straight line When a predetermined charge storage end time $t_3$ is reached, the charge storage ends upon setting the signal amount stored after the time $t_2$ as $V_2$. At this point, the signal amount $V_0$ read out from the photo cell 11 is $V_0 = V_2$.

In regular video cameras and the like, a time (0 to $t_3$) from the start of charge storage to the end of it is set to one field period (1/60 sec) as a television rate.

The above charge storage operation is performed in each photo cell 11 of the image pickup element, and the signal $V_0$ is read out from each photo cell 11 when the operation is finished.

Subsequently, the microcomputer 14 checks the number N of reset times in each photo cell 11, calculating a total stored signal amount Vi of each photo cell 11 in accordance with the following equation:

$$V_i = V_1 \times N + V_2$$

Note that the closer the total stored signal amount $V_1$ to the saturation output from the photo cell 11, the smaller the number of the photo cells 11 to be reset, and the smaller the number N of reset times. Since the operation time of the total stored signal amount $V_i$ is also reduced, the total stored signal amount $V_i$ is set at a value as closer to the saturation output as possible.

As a more detailed embodiment, an arrangement using a BASIS image pickup sensor will be described below with reference to FIG. 7.

Figure 7:
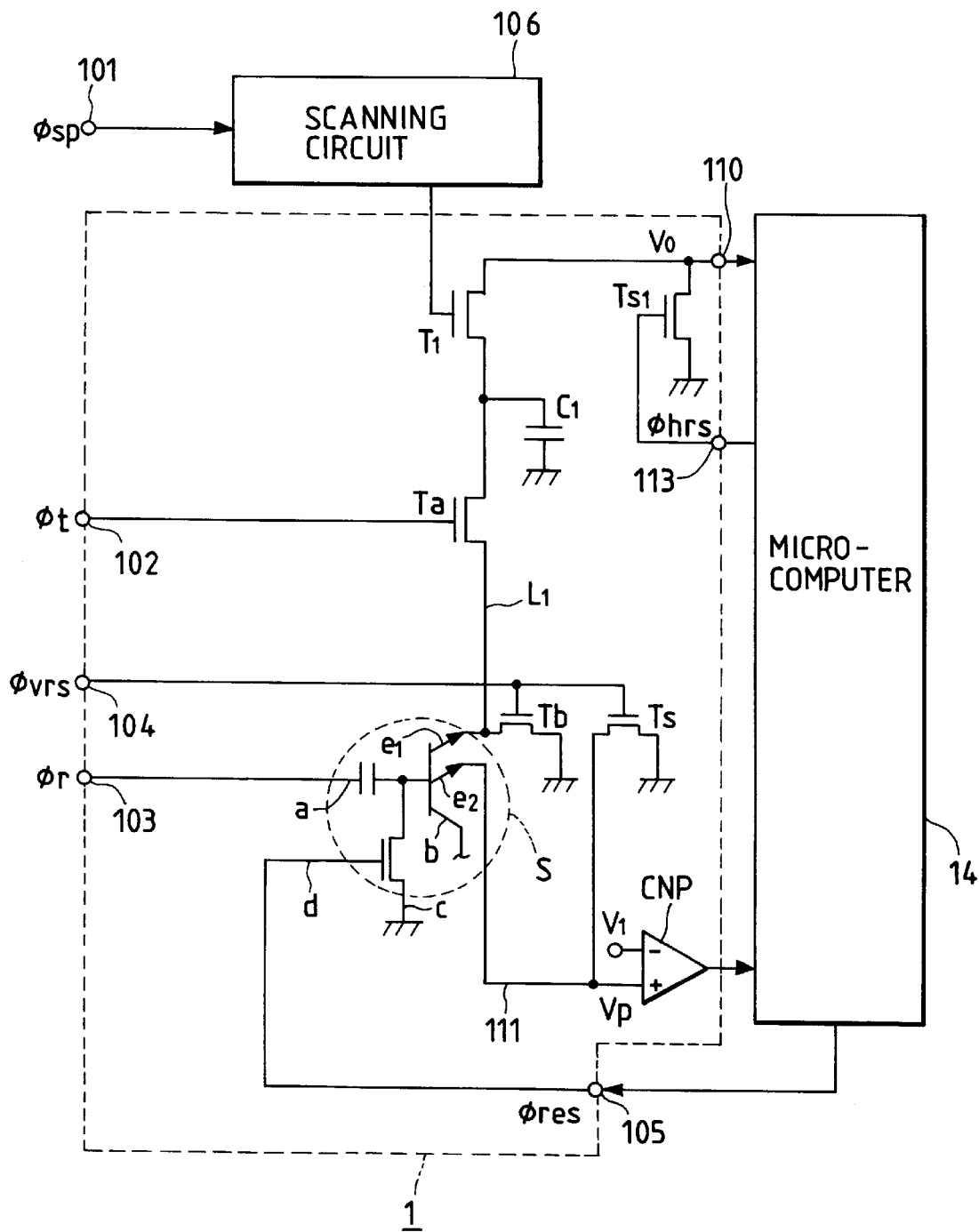
FIG. 7 is a circuit diagram showing the circuit configuration of one pixel of an image pickup element according to the present invention.

Referring to FIG. 7, a circuit system 1 corresponds to one pixel, and an aperture bit S of the image pickup sensor corresponds to the photo cell 11 shown in FIG. 5.

A capacitor electrode a of the bit S is connected to a common terminal 103, and a collector electrode b of the bit S is applied with a constant positive voltage. An electrode c of a reset MOS transistor is grounded, and its gate electrode d is connected to a terminal 105. An emitter electrode $e_1$ of the bit S is connected to a vertical line $L_1$. The vertical line $L_1$ is connected to a charge storage capacitor $C_1$ via a transistor Ta and to an output signal line 110 via a transistor $T_1$.

The output signal line 110 is grounded via a reset transistor $Ts_1$. The gate electrode of the transistor $T_1$ is connected to the parallel output terminal of a scanning circuit 106. A shift pulse $\phi_{sp}$ is applied to this scanning circuit 106 via a terminal 101. The transistor $T_1$ is turned on under the control of the scanning circuit 106.

The vertical line $L_1$ is grounded via a transistor Tb. The gate electrode of the transistor Tb is connected to a common terminal 104.

An emitter electrode $e_2$ of the aperture bit S is connected to a line 111 which is grounded via a transistor Ts. The gate electrode of the transistor Ts is connected to the terminal 104.

A reset operation of the bit S in the above arrangement will be described below. When a microcomputer 14 applies a signal $\phi_{res}$ to the terminal 105, the reset MOS transistor of the bit S is turned on. This removes a stored charge in the p-type base region of the bit S, keeping a potential in this portion constant.

Subsequently, when a signal $\phi_{vrs}$ is applied to the terminal 104, the transistors Tb and Ts are turned on to ground the emitter electrodes $e_1$ and $e_2$. When a pulse $\phi_r$ for initialization is applied to the terminal 103, the stored charge in the p-type base region is removed as described above. The foregoing is the reset operation.

To start an operation of storing light signals from this state, the application of the signal $\phi_{res}$ to the terminal 105 is stopped, and the shift pulse $\phi_{sp}$ is applied to the scanning circuit 106 via the terminal 101 (by the microcomputer 14). Consequently, the reset MOS transistor is turned off.

This starts a photoelectric conversion operation corresponding to a light amount incident on the bit S. Subsequently, to store the electric charge generated by the above operation into the capacitor $C_1$, the application of the signal $\phi_{vrs}$ to the terminal 104 is stopped. This turns off the transistors Tb and Ts, floating the emitter electrodes e1 and $e_2$. Subsequently, the microcomputer 14 applies a signal $\phi_t$ to a terminal 102, thereby turning on the transistor Ta.

When the pulse $\phi_r$ for read-out is applied to the terminal 103 next, signals corresponding to the incident light amount are read out from the bit S through the vertical line $L_1$ and stored in the capacitor $C_1$.

Thereafter, when the signal $\phi_t$ indicating the end of storage is applied to the terminal 102, the transistor Ta is turned off to finish the storage operation to the capacitor $C_1$.

When the shift pulse $\phi_{sp}$ is applied to the terminal 101, the scanning circuit 106 turns on the transistor $T_1$. Therefore, the electric charge of the capacitor $C_1$ corresponding to the ON transistor $T_1$ is output as an image signal $V_0$ via an output terminal 110. When the microcomputer 14 applies a signal $\phi_{hrs}$ to a terminal 113 immediately after the charge is output, the transistor $Ts_1$ is turned on accordingly to remove the residual electric charge from the output signal line 110.

An operation of detecting a signal Vp is performed in parallel with the above storage operation. That is, the signal from the bit S is read out to the line 111 by the signal $\phi_r$ applied to the terminal 103 in the above operation, and is supplied to the noninverting input terminal (+) of a comparator CNP.

The inverting input terminal (−) of the comparator CNP, on the other hand, is supplied with a reference voltage $V_1$, and so the comparator CNP compares the signal Vp with the reference voltage $V_1$. If the signal Vp exceeds the reference voltage $V_1$, the comparator CNP outputs a signal at level "H" to the microcomputer 14.

At this point, the microcomputer 14 executes the reset operation described above in order to reset the stored charge of the bit S, and records the number of reset times.

The image pickup device of the present invention is not limited to the above embodiment but can be realized by other arrangements. That is, in the above embodiment, the microcomputer 14 receives the output from the comparator CNP as a decision means and generates the pulse $\phi_{res}$ for the reset operation. It is, however, also possible to provide hardware, such as a clock generator, for receiving the output from the comparator CNP and generating the reset pulse. In addition, the image pickup element is not limited to the BASIS but may take any form without departing from the gist of the present invention.

According to the embodiments of the present invention as described above, when the signal amount stored for each pixel of the image pickup element reaches the predetermined signal amount, the time until the signal amount reaches the predetermined signal amount is measured. This makes it possible to obtain an image with a wide dynamic range regardless of whether each pixel is saturated.

In addition, since the operation using time in the above embodiments is performed in accordance with the equation $Ve=Ve=V_1'+\alpha(t_s/t_1 V_1'-V_1')$, white painting in a high-luminance portion can be prevented. Also, by setting the coefficient a in the above equation as a function of the time $t_1$, better knee characteristics can be obtained.

Furthermore, the predetermined signal amount in Equation 3 described above is set as a threshold value. Therefore, if the stored amount in the photo cell 11 does not reach the threshold value, this stored amount need not be operated. This can reduce the operation time of the microcomputer.

Moreover, the signal amount stored in each pixel of the solid-state image pickup element is compared with the predetermined signal amount to decide whether the signal amount stored in each pixel has reached the predetermined amount, and the stored charge is reset for each pixel in accordance with the decision result. This makes it possible to operate the total stored signal of each pixel from the number of reset times within a predetermined time and the signal amount stored after the predetermined time. This can prevent overflow and widen the dynamic range of the image pickup device.

In the embodiment shown in FIG. 7, the basic read-out arrangement of one pixel is explained. Other embodiments of the present invention related to a read-out arrangement in which a plurality of light-receiving units are arranged in a matrix manner will be described below.

The object of the following embodiments is to provide a solid-state image pickup element capable of simplifying the read-out circuit configuration and widening the dynamic range.

To achieve the above object of the present invention, there is provided a solid-state image pickup element comprising a plurality of pixels arranged in the horizontal and vertical directions and each including a photoelectric conversion element, a reset switch for sweeping out an electric charge stored in the photoelectric conversion element, and a sample-and-hold circuit for sampling-and-holding the electric charge as a signal, and also comprising random reset circuits each for driving the reset switch of a designated pixel, random sample circuits each for sampling-and-holding the signal from a designated pixel into the sample-and-hold circuit, and random access circuits each for reading out the signal from the sample-and-hold circuit of a designated pixel. In this solid-state image pickup element, the random reset circuits and the random access circuits have a common circuit for designating horizontal addresses and a common circuit for designating vertical addresses.

According to still another embodiment of the present invention, there is provided a solid-state image pickup element comprising a plurality of pixels arranged in the horizontal and vertical directions and each including a photoelectric conversion element, a reset switch for sweeping out an electric charge stored in the photoelectric conversion element, and a sample-and-hold circuit for sampling-and-holding the electric charge as a signal, and also comprising random reset circuits each for driving the reset switch of a designated pixel, random sample circuits each for sampling-and-holding the signal from a designated pixel into the sample-and-hold circuit, and random access circuits each for reading out the signal from the sample-and-hold circuit of a designated pixel. In this solid-state image pickup element, the random reset circuits, the random sample circuits, and the random access circuits have a common circuit for designating horizontal addresses and a common circuit for designating vertical addresses. The solid-state image pickup element further comprises switching elements each for operating the random reset circuit, the random sample circuit, and the random access circuit of a designated pixel. Of these switching elements, those for operating the random reset circuits and the random access circuits have a common control terminal.

According to still another embodiment of the present invention, there is provided a solid-state image pickup element comprising a plurality of pixels arranged in the horizontal and vertical directions and each including a photoelectric conversion element, a reset switch for sweeping out an electric charge stored in the photoelectric conversion element, and a sample-and-hold circuit for sampling-and-holding the electric charge as a signal, and also comprising random reset circuits each for driving the reset switch of a designated pixel, random sample circuits each for sampling-and-holding the signal from a designated pixel into the sample-and-hold circuit, and random access circuits each for reading out the signal from the sample-and-hold circuit of a designated pixel. In this solid-state image pickup element, the random reset circuits, the random sample circuits, and the random access circuits have a common circuit for designating either horizontal addresses or vertical addresses.

According to still another embodiment of the present invention, there is provided a solid-state image pickup element comprising a plurality of pixels arranged in the horizontal and vertical directions and each including a photoelectric conversion element, a reset switch for sweeping out an electric charge stored in the photoelectric conversion element, and a sample-and-hold circuit for sampling-and-holding the electric charge as a signal, and also comprising random reset circuits each for driving the reset switch of a designated pixel, random sample circuits each for sampling-and-holding the signal from a designated pixel into the sample-and-hold circuit, and random access circuits each for reading out the signal from the sample-and-hold circuit of a designated pixel. In this solid-state image pickup element, the random reset circuits, the random sample circuits, and the random access circuits have a common circuit for designating horizontal addresses and a common circuit for designating vertical addresses. The solid-state image pickup element further comprises switching elements each for operating the random reset circuit, the random sample circuit, and the random access circuit of a designated pixel.

These embodiments of the present invention will be described below with reference to the accompanying drawings.

Figure 8:
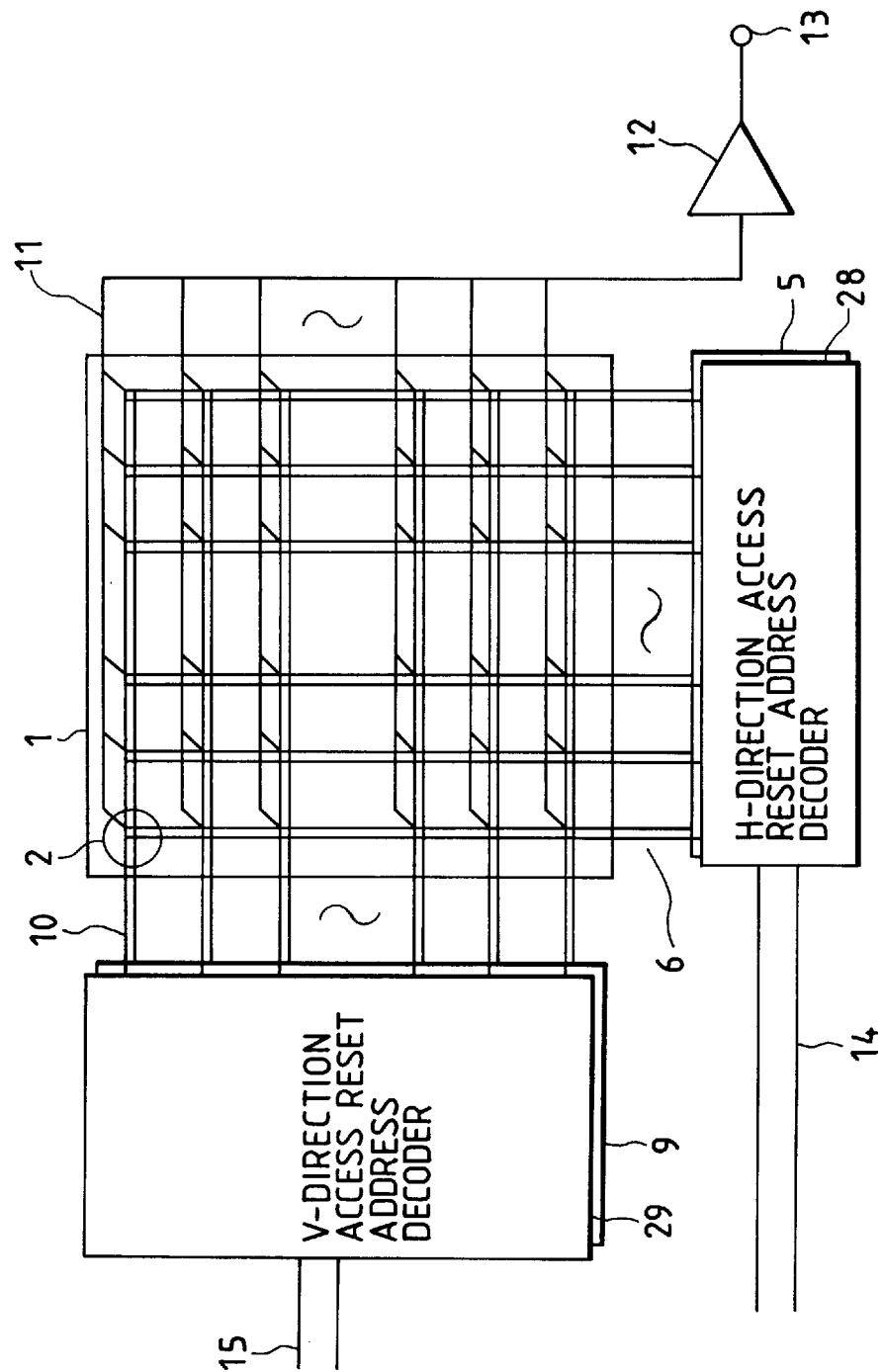
FIG. 8 is a view showing the circuit configuration of an embodiment of a solid-state image pickup element according to the present invention.

FIG. 8 is a view showing the circuit configuration of one of the above embodiments of a solid-state image pickup element. Referring to FIG. 8, an H-direction access reset address decoder 28 is a common circuit for designating H-direction addresses of random access circuits and random reset circuits. A V-direction access reset address decoder 29 is a common circuit for designating V-direction addresses of the random access circuits and the random reset circuits. An image pickup region 1 has a plurality of pixels arranged in the H (horizontal) and V (vertical) directions, and one of pixels constituting this image pickup region 1 is denoted by reference numeral 2. An H-direction decoder 5 is provided for the random access circuits, the random reset circuits, and the random sample circuits. H-direction address lines 6 are also provided. A V-direction decoder 9 is provided for the random access circuits, the random reset circuits, and the random sample circuits. This solid-state image pickup element also includes V-direction address lines 10, data lines 11, an output circuit 12, an output terminal 13 of the solid-state image pickup element, control lines 14 of the H-direction decoder, and control lines 15 of the V-direction decoder.

Figures 9, 10:
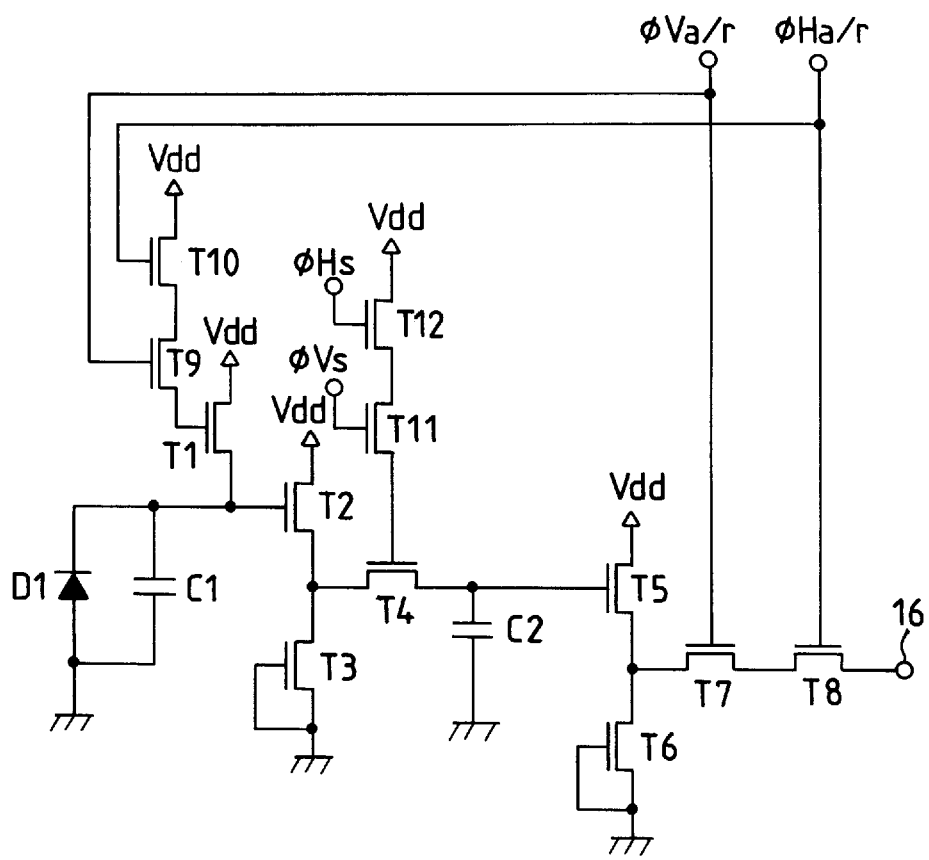
FIG. 9 is a circuit diagram showing the configuration of a pixel of the embodiment shown in FIG. 8.
FIG. 10 is a view showing the arrangement of the pixels of the solid-state image pickup element according to the embodiment shown in FIG. 8.

FIG. 9 is a circuit diagram showing the detailed configuration of the pixel 2 of the above solid-state image pickup element. In this embodiment, the gates of an H-direction access path transistor T8 and an H-direction reset path transistor T10 are connected together to the H-direction address line 6 of the H-direction access reset decoder 28. The gates of a V-direction access path transistor T7 and a V-direction reset path transistors T9 are also connected together to the V-direction address line 10 of the V-direction access reset decoder 29. With this arrangement, an image signal which is sampled-and-held in a pixel selected by an H-direction access reset address pulse øHa/r and a V-direction access reset address pulse øVa/r is read out, and the pixel is reset at the same time. Referring to FIG. 9, the pixel comprises a photodiode D1 and a storage capacitor C1 serving as a photoelectric converting element, a reset transistor T1 for resetting the photodiode D1, transistors T2 and T3 constituting a source follower circuit in the first stage, a sample transistor T4, a sample capacitor C2, and transistors T5 and T6 constituting a source follower circuit in the second stage. The gate of the V-direction access path transistor T7 is connected to the V-direction access address line, and the gate of the H-direction access path transistor T8 is connected to the H-direction access address line. The gate of the V-direction reset path transistor T9 is connected to the V-direction reset address line, and the gate of the H-direction reset path transistor T10 is connected to the H-direction reset address line. A V-direction sample path transistor T11 has a gate connected to a V-direction sample address line, and an H-direction sample path transistor T12 has a gate connected to an H-direction sample address line. An output terminal 16 of the pixel is connected to the data line 11 shown in FIG. 8.

FIG. 10 is a view showing the arrangement of the pixels 2 of the above solid-state image pickup element, in which the pixels are arranged into a 3 (row)×3 (column) matrix. Referring to FIG. 10, pixels are indicated by the row numbers and the column numbers given in parentheses, i.e., (11), (12), (13), . . . , (32), and (33). For example, 1 in (13) represents the V-direction address, and 3 in (13) represents the H-direction address.

Figure 27:
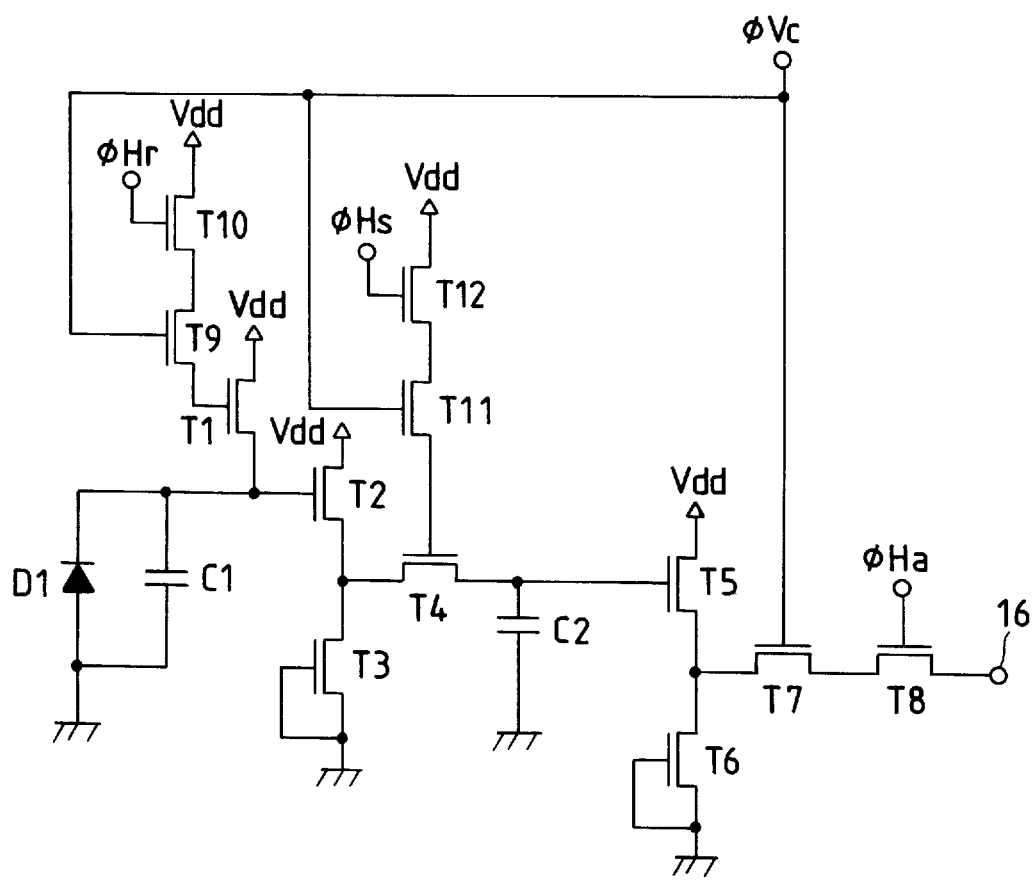
FIG. 27 is a circuit diagram showing the configuration of a pixel according to the embodiment shown in FIG. 26.

FIG. 11 is a view showing, in correspondence with time elapse, the operating states of the random access circuit (indicated by A), the random reset circuit (indicated by R), and the random sample circuit (indicated by S) of each pixel, and the comparison result between a reference signal and an image signal of each corresponding pixel obtained by a comparator 18 shown in FIG. 27. "o" of the comparison result indicates "coincidence," and "x" of the result indicates "noncoincidence." The operation of the solid-state image pickup element of this embodiment will be described below with reference to FIG. 11. Referring to FIG. 11, after the first exposure is performed under certain exposure conditions, the random sample circuits are operated to voltage-convert electric charges stored in the photodiodes D1 and the storage capacitors C1 of all the pixels and sample-and-hold these charges in a predetermined order. Thereafter, the random access circuits are operated to read out the image signals sampled-and-held in all the pixels in a predetermined order. At the same time, the pixels are reset to start reexposure. In this first read-out, the comparison result of the comparator 18 indicates that the pixels (12), (13), and (23) are "x", i.e., the signals of these pixels do not coincide with the reference signal. Therefore, the addresses of these pixels are stored in an address memory 21. When an appropriate exposure time has elapsed, the signal charge of the pixel (12) is sampled-and-held as follows. That is, in this embodiment, although the random access circuits and the random reset circuits operate simultaneously, the random sample circuits can be operated independently. Therefore, at the same time the random access circuit and the random reset circuit of the pixel (31) are operated, the random sample circuit of the pixel (12) is operated on the basis of the information stored in the address memory 21, thereby sampling-and-holding the reexposed signal charge. Reexposure is also performed for the pixels (13) and (23) in the same manner as described above. Subsequently, the image signals sampled-and-held in all the pixels are read out in a predetermined order as the second read-out.

In this embodiment as described above, the random reset circuits and the random access circuits have the common circuit for designating the H-direction addresses and the common circuit for designating the V-direction addresses. This makes it possible to greatly simplify the configuration of the solid-state image pickup element, reducing the scale of the element. In addition, since the random sample circuits can operate independently, the dynamic range of the solid-state image pickup element can be widened like in conventional elements.

Figure 12A:
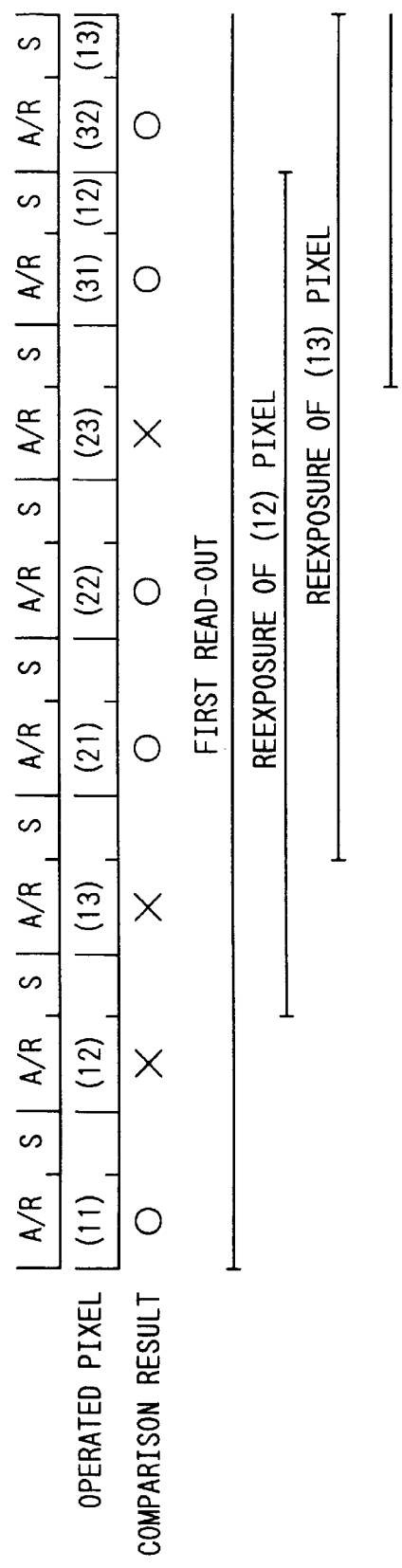
FIGS. 12A and 12B are views showing another embodiment of the present invention.
Figure 12B:
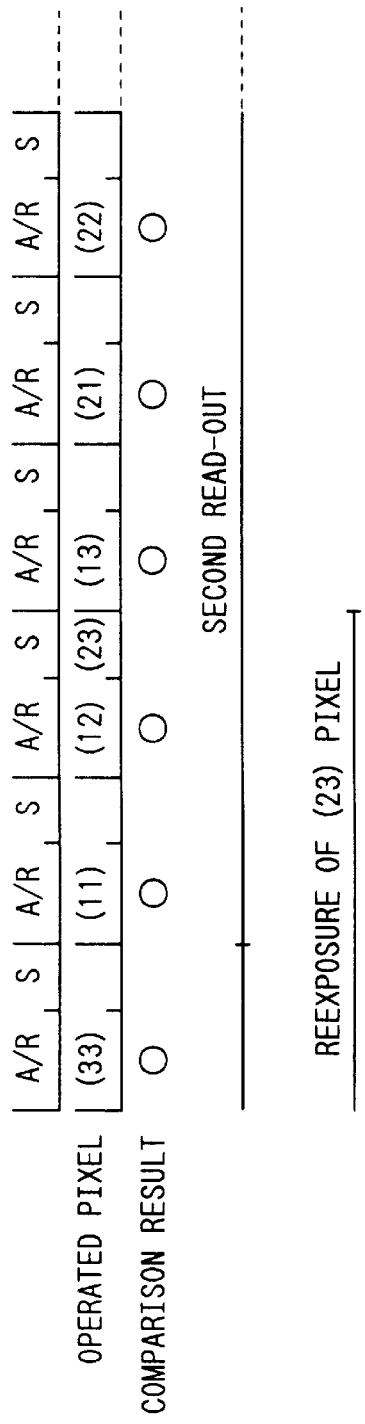

FIGS. 12A and 12B are views each showing the operating states of a random access circuit, a random reset circuit, and a random sample circuit of each pixel according to still another embodiment of the present invention, and the comparison result between a reference signal and an image signal of each corresponding pixel obtained by a comparator 18. Note that the solid-state image pickup element according to the embodiment shown in FIG. 8 is used in this embodiment. In this embodiment, a repetition time during which the random access circuits are operated to read out signals from sample-and-hold circuits of a plurality of pixels in a predetermined order is divided into two parts: one is a time in which the random access circuits and the random reset circuits are operated, and the other is a time in which the random sample circuits are operated. FIGS. 12A and 12B illustrate a series of operations, in which the operation shown in FIG. 12A is followed by that shown in FIG. 12B.

Like in the preceding embodiment, the random access circuits are operated to perform the first read-out, and the comparator 18 compares the readout pixel signals with the reference signal. In this comparison result, pixels (12), (13), and (23) do not agree with the reference signal, and therefore the addresses of these pixels are stored in an address memory 21. Since, on the other hand, the random reset circuits are operated simultaneously with the random access circuits, reexposure is already begun. When a proper exposure time has elapsed, the random sample circuit is operated as follows. That is, in this embodiment, a time in which the random access circuits and the random reset circuits are operated is independent of a time in which the random sample circuits are operated. Therefore, after the random access circuit and the random reset circuit of the pixel (31) are operated, the random sample circuit of the pixel (12) is operated on the basis of the information stored in the address memory 21, thereby sampling-and-holding the reexposed signal charge. Reexposure is also performed for the pixels (13) and (23) in the same manner as described above. Thereafter, as the second read-out, the image signals sampled-and-held in all the pixels are read out in a predetermined order.

Also in this embodiment, the random reset circuits and the random access circuits have a common circuit for designating the H-direction addresses and a common circuit for designating the V-direction addresses. This can not only simplify the arrangement of the solid-state image pickup element but also increase the dynamic range of the element.

Figure 13:
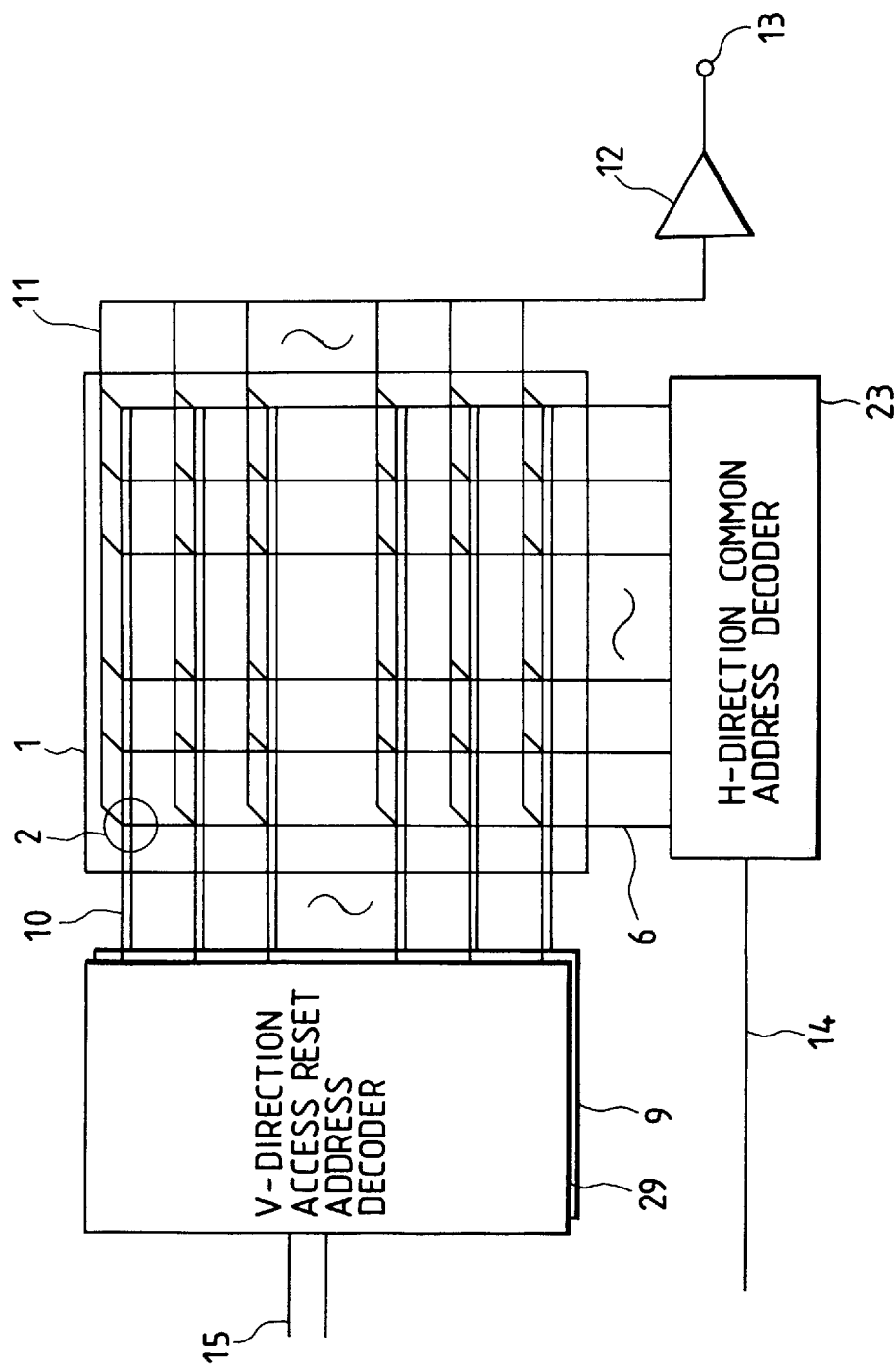
FIG. 13 is a view showing the circuit configuration of still another embodiment of a solid-state image pickup element according to the present invention.

FIG. 13 shows still another embodiment of the solid-state image pickup element. Referring to FIG. 13, an H-direction common address decoder 23 is a common circuit for designating H-direction addresses of random access circuits, random reset circuits, and random sample circuits, and a V-direction access reset address decoder 29 is a common circuit for designating V-direction addresses of the random access circuits and the random reset circuits. The other arrangement is the same as the embodiment shown in FIG. 8.

Figure 14:
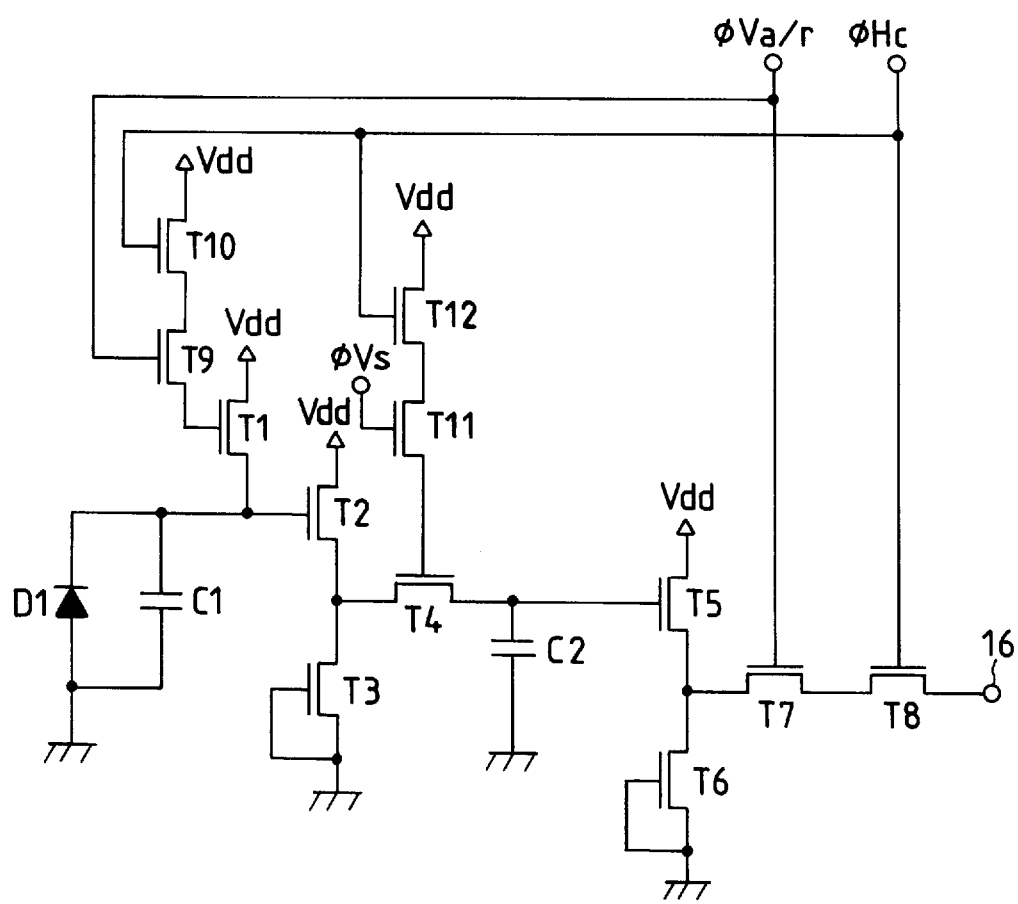
FIG. 14 is a circuit diagram showing the configuration of a pixel according to the embodiment shown in FIG. 13.

FIG. 14 is a circuit diagram showing the configuration of one of pixels 2 of the solid-state image pickup element shown in FIG. 13. Referring to FIG. 14, the gates of an H-direction access path transistor T8, an H-direction reset path transistor T10, and an H-direction sample path transistor T12 are connected together to an H-direction address line 6 of the H-direction common address decoder 23. The gates of a V-direction access path transistor T7 and a V-direction reset path transistor T9 are also connected together to a V-direction address line 10 of the V-direction access reset decoder 29. With this arrangement, the H-direction access path transistors T8, the H-direction reset path transistors T10, and the H-direction sample path transistors T12 of all pixels arranged in line in the V direction, which are selected by an H-direction common address pulse øHc, are turned on. In addition, image signals sampled-and-held in pixels selected by a V-direction access reset address pulse øVa/r are read out from these pixels, and the pixels are reset at the same time. The pixels of this solid-state image pickup element are arranged into a 3 (row)×3 (column) matrix as shown in FIG. 10.

Figure 15:
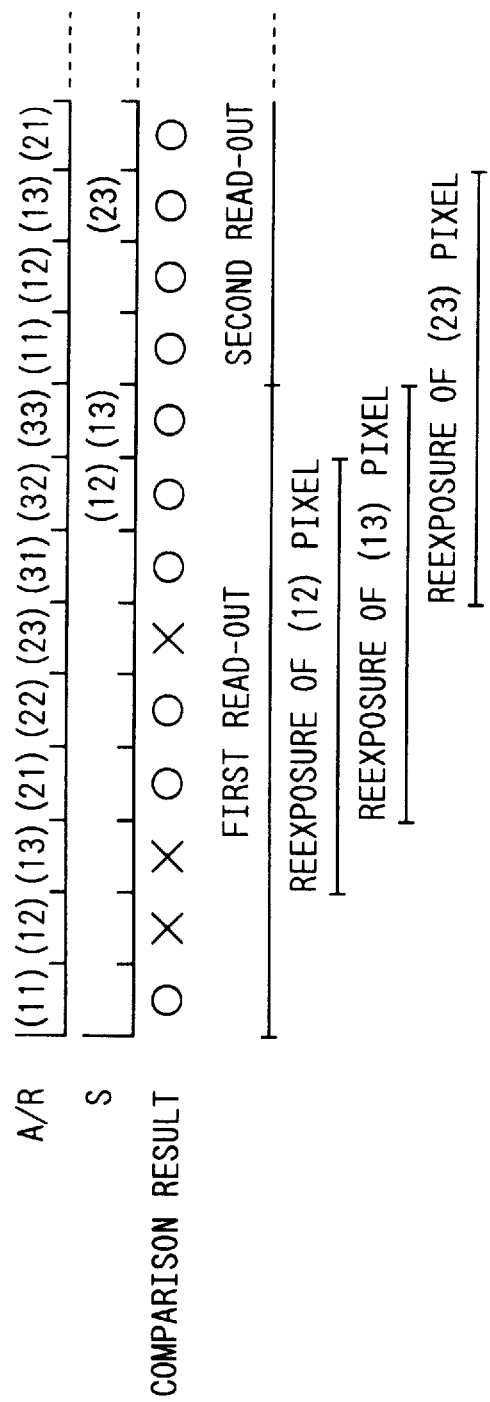
FIG. 15 is a view showing the operation of the solid-state image pickup element according to the embodiment shown in FIG. 13.

FIG. 15 is a view showing, in correspondence with time elapse, the operating states of the random access circuit (indicated by A), the random reset circuit (indicated by R), and the random sample circuit (indicated by S) of each pixel, and the comparison result between a reference signal and an image signal of each corresponding pixel obtained by a comparator 18. The operation of the solid-state image pickup element of this embodiment will be descried below with reference to FIG. 15. First, after the first exposure is performed under given exposure conditions, the random sample circuits are operated to voltage-convert the electric charges stored in photodiodes D1 and storage capacitors C1 of all pixels and sample-and-hold these charges in a predetermined order. The random access circuits are then operated to read out the image signals sampled-and-held in all the pixels in a predetermined order, and at the same time the pixels are reset, thereby starting reexposure. In this first read-out, as shown in FIG. 15, the comparison result of the comparator 18 indicates that pixels (12), (13), and (23) do not coincide with the reference signal. Therefore, the addresses of these pixels are stored in an address memory 21. When an appropriate exposure time has elapsed, the signal charge of the pixel (12) is sampled-and-held as follows. That is, in this embodiment, the common address decoder is used in the H-direction, and so the H-direction address of the pixel (12) is selected when the random access circuits of pixels (22), (32), . . . , are operated. Assume, for example, that the random access circuit of the pixel (32) is operated. Then, the random sample circuit of the pixel (12) is operated by the V-direction decoder for the random sample circuits on the basis of the information stored in the address memory 21, thereby sampling-and-holding the reexposed signal charge. Sampling-and-holding is also performed for the pixels (13) and (23) in the same manner as described above. Subsequently, as the second read-out, the image signals sampled-and-held in all the pixels are read out in a predetermined order. In this embodiment, the common V-direction address decoder and the common H-direction address decoder are used for the random access circuits and the random reset circuits. This can not only simplify the arrangement of the solid-state image pickup element but also widen the dynamic range of the element.

Still another embodiment of the present invention will be described below with reference to FIGS. 12A and 12B. This embodiment uses the solid-state image pickup element according to the embodiment shown in FIG. 13. Referring to FIGS. 12A and 12B, as in the embodiment shown in FIG. 13, the first read-out is performed, and a comparator 18 compares the readout pixel signals with a reference signal. The comparison result of the comparator 18 indicates that pixels (12), (13), and (23) do not match the reference signal. Meanwhile, the pixels are already reset to start reexposure. After the random access circuit of a pixel (31) is operated, the random sample circuit of the pixel (12) is operated to sample-and-hold the reexposed signal charge. Sampling-and-holding is also performed for the pixels (13) and (23) in the same manner as described above. Subsequently, as the second read-out, the image signals sampled-and-held in all the pixels are read out in a predetermined order. At this point, in the previous embodiment, setting of the reexposure time of a certain pixel is limited, i.e., the random reset circuit and the random sample circuit of a given pixel are operated only when the same H-direction address is designated. Therefore, the exposure time can be set only in units of horizontal scan periods. In this embodiment, however, a time in which the random access circuits and the random reset circuits are operated is independent of a time in which the random sample circuits are operated. Therefore, by redesignating the H- and V-direction addresses, the exposure time can be set in units of repetition times during which image signals are read out in a predetermined order.

Figure 16:
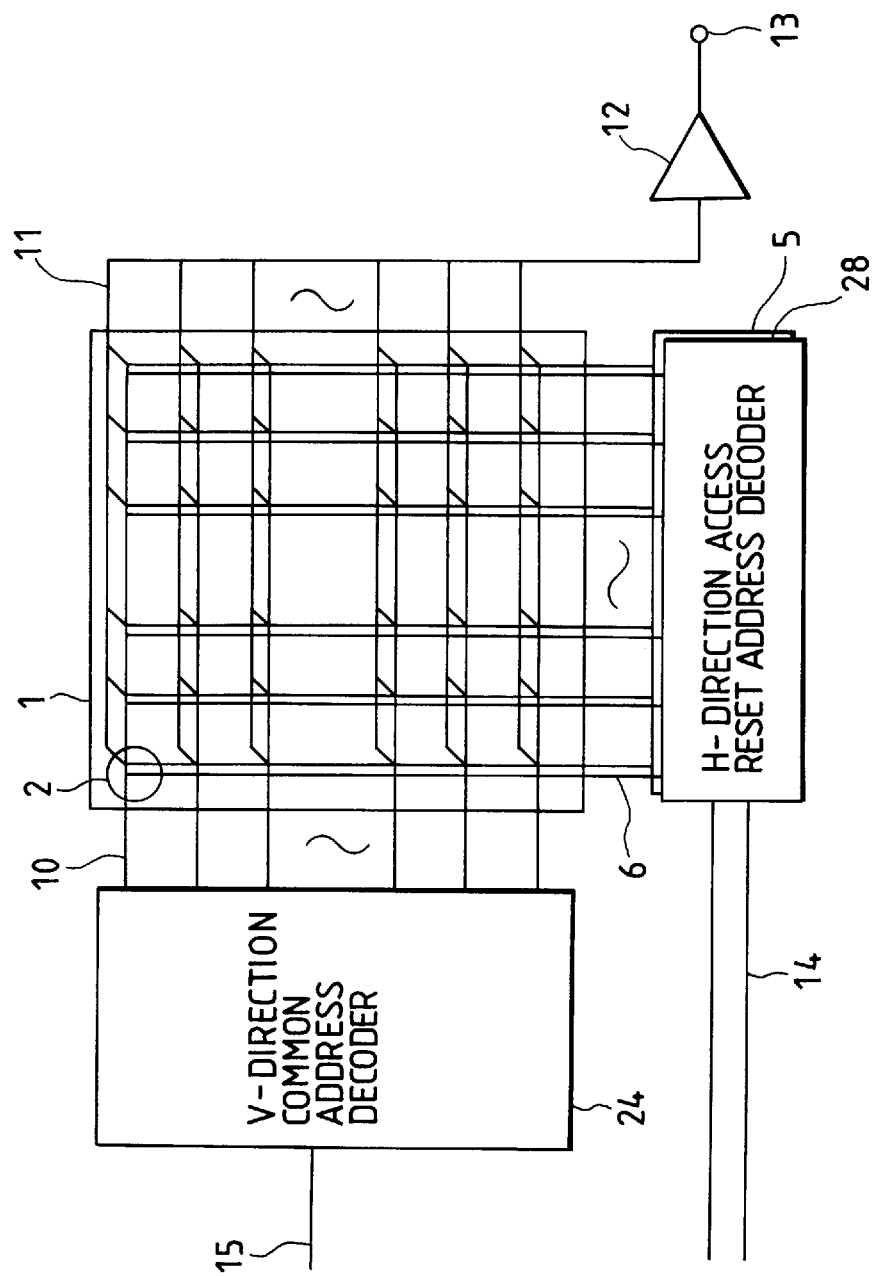
FIG. 16 is a view showing the circuit configuration of still another embodiment of a solid-state image pickup element according to the present invention.
Figure 17:
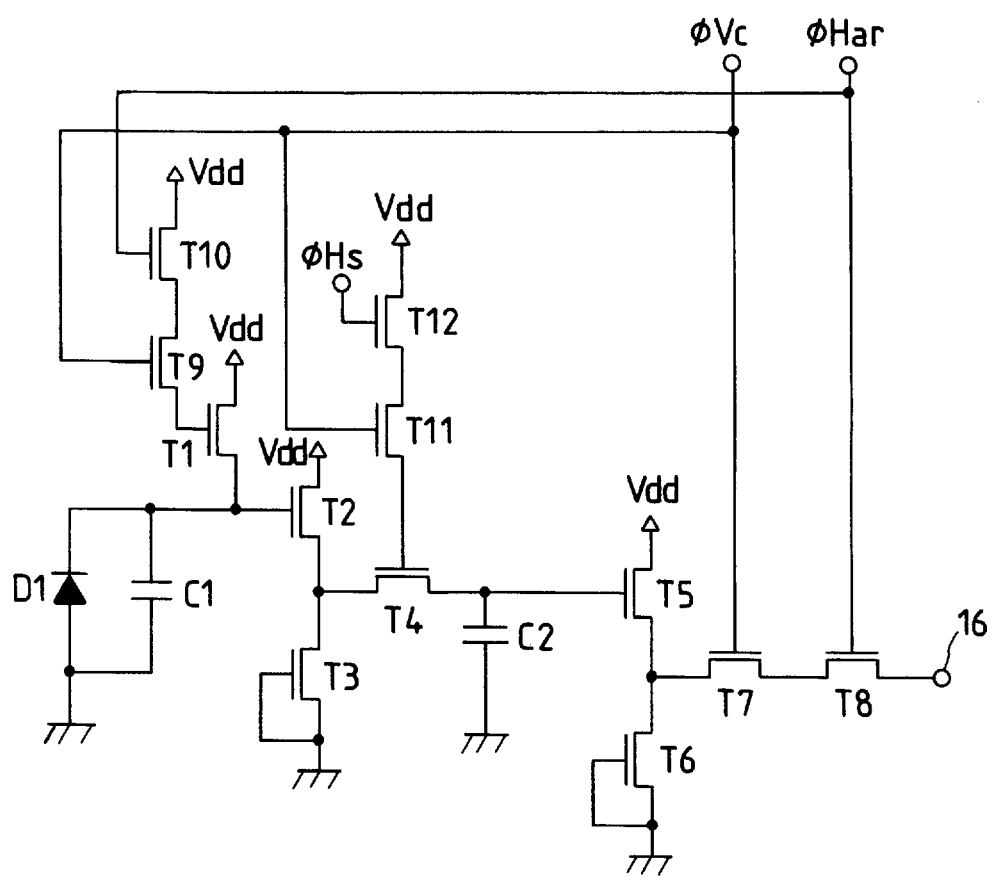
FIG. 17 is a circuit diagram showing the configuration of a pixel according to the embodiment shown in FIG. 16.

FIG. 16 shows still another embodiment of the solid-state image pickup element according to the present invention. Referring to FIG. 16, a V-direction common address decoder 24 is a common circuit for designating V-direction addresses for random access circuits, random reset circuits, and random sample circuits, and an H-direction access reset address decoder 28 is a common circuit for designating H-direction addresses for the random access circuits and the random reset circuits. FIG. 17 is a circuit diagram showing one of pixels 2 constituting the solid-state image pickup element shown in FIG. 16. Referring to FIG. 17, the gates of a V-direction access path transistor T7, a V-direction reset path transistor T9, and a V-direction sample path transistor T11 are connected together to a V-direction address line 10 of the V-direction common address decoder 24. Likewise, the gates of an H-direction access path transistor T8 and an H-direction reset path transistor T10 are connected together to an H-direction address line 6 of the H-direction access reset address decoder 28. With this arrangement, the V-direction access path transistors T7, the V-direction reset path transistors T9, and the V-direction sample path transistors T11 of all pixels arranged in line in the H-direction, which are selected by a V-direction common address pulse øVc, are turned on. Image signals sampled-and-held in pixels selected by an H-direction access reset address pulse øHa/r are read out from these pixels, and at the same time the pixels are reset. Note that the pixels of this solid-state image pickup element are arranged into a 3 (row)×3 (column) matrix as shown in FIG. 10.

Figure 18:
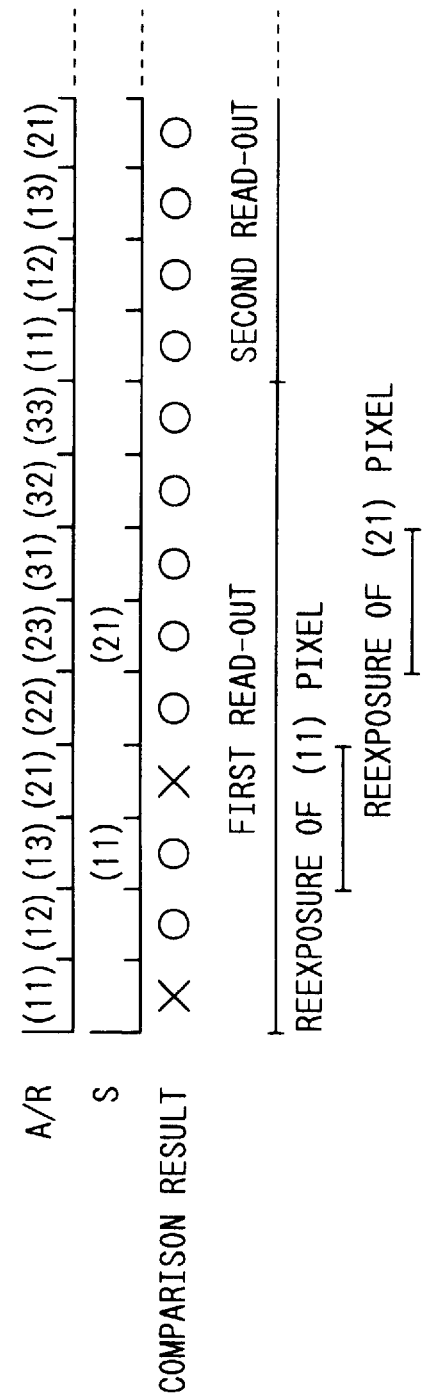
FIG. 18 is a view showing the operation of the solid-state image pickup element according to the embodiment shown in FIG. 16.

FIG. 18 is a view showing, in correspondence with time elapse, the operating states of the random access circuit (indicated by A), the random reset circuit (indicated by R), and the random sample circuit (indicated by S) of each pixel, and the comparison result between a reference signal and an image signal of each corresponding pixel obtained by a comparator 18. The operation of this embodiment will be described with reference to FIG. 18. First, after the first exposure is performed under certain exposure conditions, the random sample circuits are operated to voltage-convert the electric charges stored in photodiodes D1 and storage capacitors C1 of all the pixels and sample-and-hold these electric charges in a predetermined order. Subsequently, the random access circuits are operated to read out the image signals sampled-and-held in all the pixels in a predetermined order, and at the same time the pixels are reset, thereby starting reexposure. In this first read-out, the comparison result of the comparator 18 indicates that pixels (11) and (21) do not coincide with the reference signal. Therefore, the addresses of these pixels are stored in an address memory 21. When a proper exposure time has elapsed, the signal charge of the pixel (11) is sampled-and-held as follows. That is, in this embodiment, since the common V-direction address decoder is used, the V-direction address of the pixel (11) is selected in a current vertical scanning period or after one vertical scanning period. FIG. 18 shows a state in which the V-direction address is currently selected. While the random access circuit of the pixel (13) is being operated, the random sample circuit of the pixel (11) is operated by the H-direction decoder for the random sample circuits on the basis of the information stored in the address memory 21, thereby sampling-and-holding the reexposed signal charge. Sampling-and-holding is also performed for the pixel (21) in the same manner as described above. As the second read-out, the image signals sampled-and-held in all the pixels are read out in a predetermined order. Also in this embodiment, the common H-direction address decoder and the common V-direction address decoder are used for the random access circuits and the random reset circuits. This can simplify the arrangement of the solid-state image pickup element and can also widen the dynamic range of the element.

Still another embodiment of the present invention will be described below with reference to FIGS. 12A and 12B. This embodiment uses the solid-state image pickup element according to the embodiment shown in FIG. 16. As in the preceding embodiment, the first read-out is performed, and a comparator 18 compares the readout pixel signals with a reference signal. The comparison result of the comparator 18 indicates that pixels (12), (13), and (23) do not coincide with the reference signal. Meanwhile, the pixels are already reset to start reexposure. After the random access circuit of a pixel (31) is operated, the random sample circuit of the pixel (12) is operated to sample-and-hold the reexposed signal charge. Sampling-and-holding is also performed for the pixels (13) and (23) in the same manner as described above. Subsequently, as the second read-out, the image signals sampled-and-held in all the pixels are read out in a predetermined order. In this case, in the previous embodiment, setting of the reexposure time of a given pixel is limited, i.e., the random reset circuit and the random sample circuit of a given pixel are operated only when the same V-direction address is designated. Therefore, the exposure time can be set only within a current horizontal scanning period or within a horizontal scanning period corresponding to each vertical scanning period. In this embodiment, however, a time in which the random access circuits and the random reset circuits are operated is independent of a time in which the random sample circuits are operated. Therefore, by redesignating the H- and V-direction addresses, the exposure time can be set in units of repetition times during which pixel signals are read out in a predetermined order.

Figure 19:
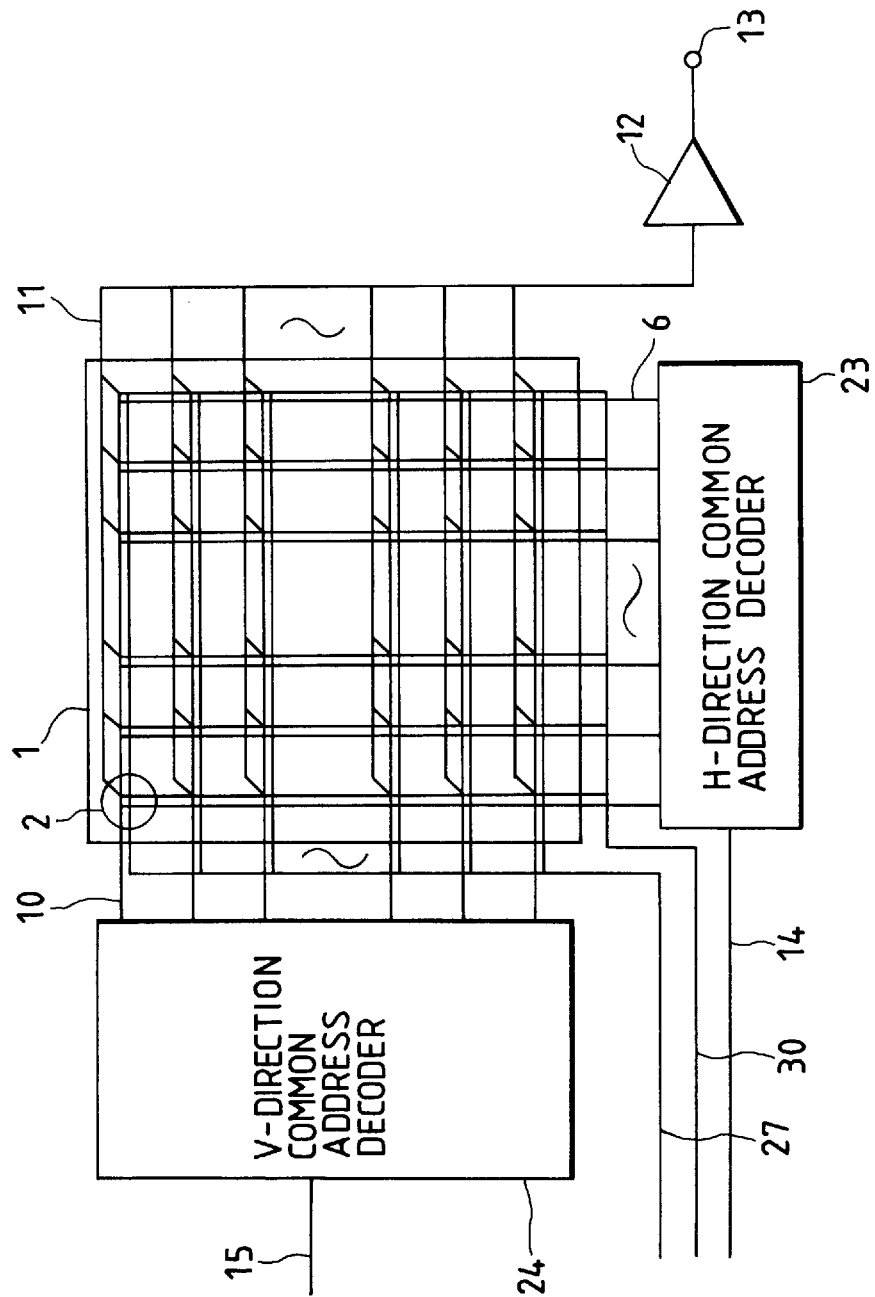
FIG. 19 is a view showing the circuit configuration of still another embodiment of a solid-state image pickup element according to the present invention.

FIG. 19 shows still another embodiment of the solid-state image pickup element according to the present invention. Referring to FIG. 19, an H-direction common address decoder 23 is a common circuit for designating H-direction addresses for random access circuits, random reset circuits, and random sample circuits, and a V-direction common address decoder 24 is a common circuit for designating V-direction addresses for the random access circuits, the random reset circuits, and the random sample circuits. A sample control line 27 is connected to the gates of sample control path transistors T17 of all pixels, and an access reset control line 30 is connected to the gates of access control path transistors T13 and the gates of reset control path transistors T15 of all the pixels.

Figure 20:
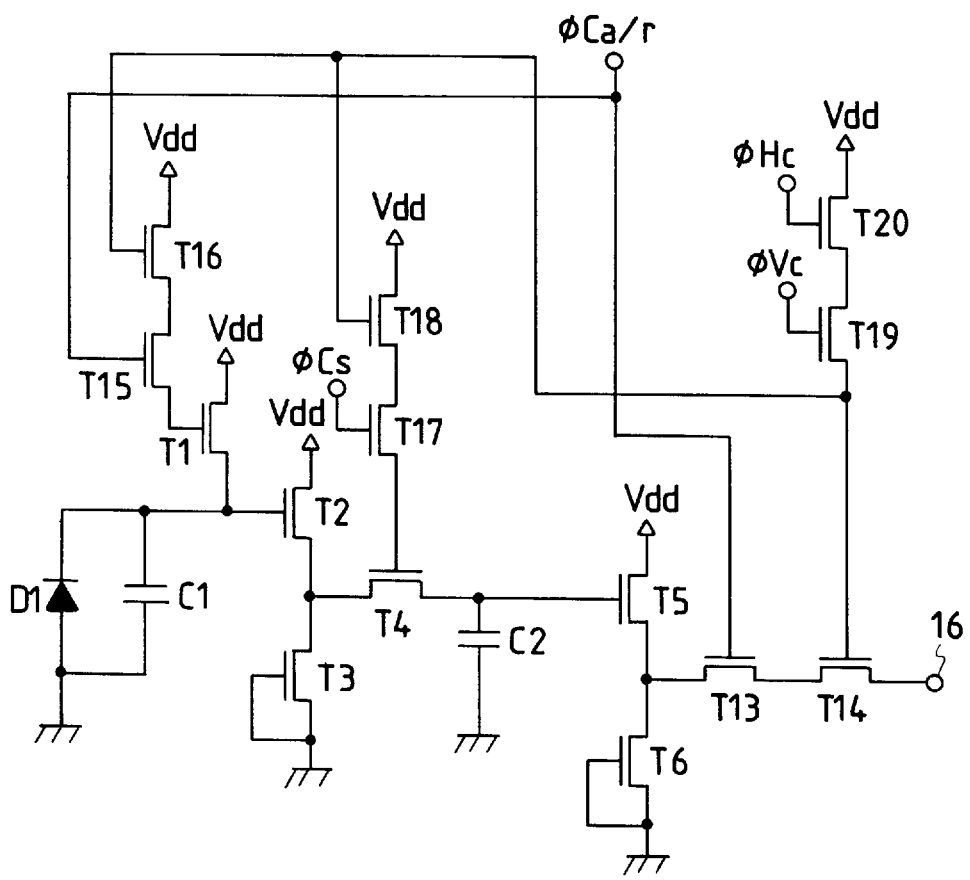
FIG. 20 is a circuit diagram showing the configuration of a pixel according to the embodiment shown in FIG. 19.

FIG. 20 is a circuit diagram showing one of pixels 2 of the solid-state image pickup element shown in FIG. 19. Referring to FIG. 20, an H-direction address path transistor T20 whose gate is connected to an H-direction address line 6 and a V-direction address path transistor T19 whose gate is connected to a V-direction address line 10 are connected in series with each other. The output terminal of the transistor T19 is connected to the gates of an access path transistor T14, a reset path transistor T16, and a sample path transistor T18. With this arrangement, the access path transistor T14, the reset path transistor T16, and the sample path transistor T18 of one pixel selected by an H-direction common address pulse øHc and a V-direction common address pulse øVc are turned on. In addition, the random access circuits, the random reset circuits, and the random sample circuits are selectively operated by an access reset control pulse øCa/r and a sample control pulse øCs. Note that the pixels of this solid-state image pickup element are arranged into a 3 (row)×3 (column) matrix as shown in FIG. 10.

Figures 21A, 21B:
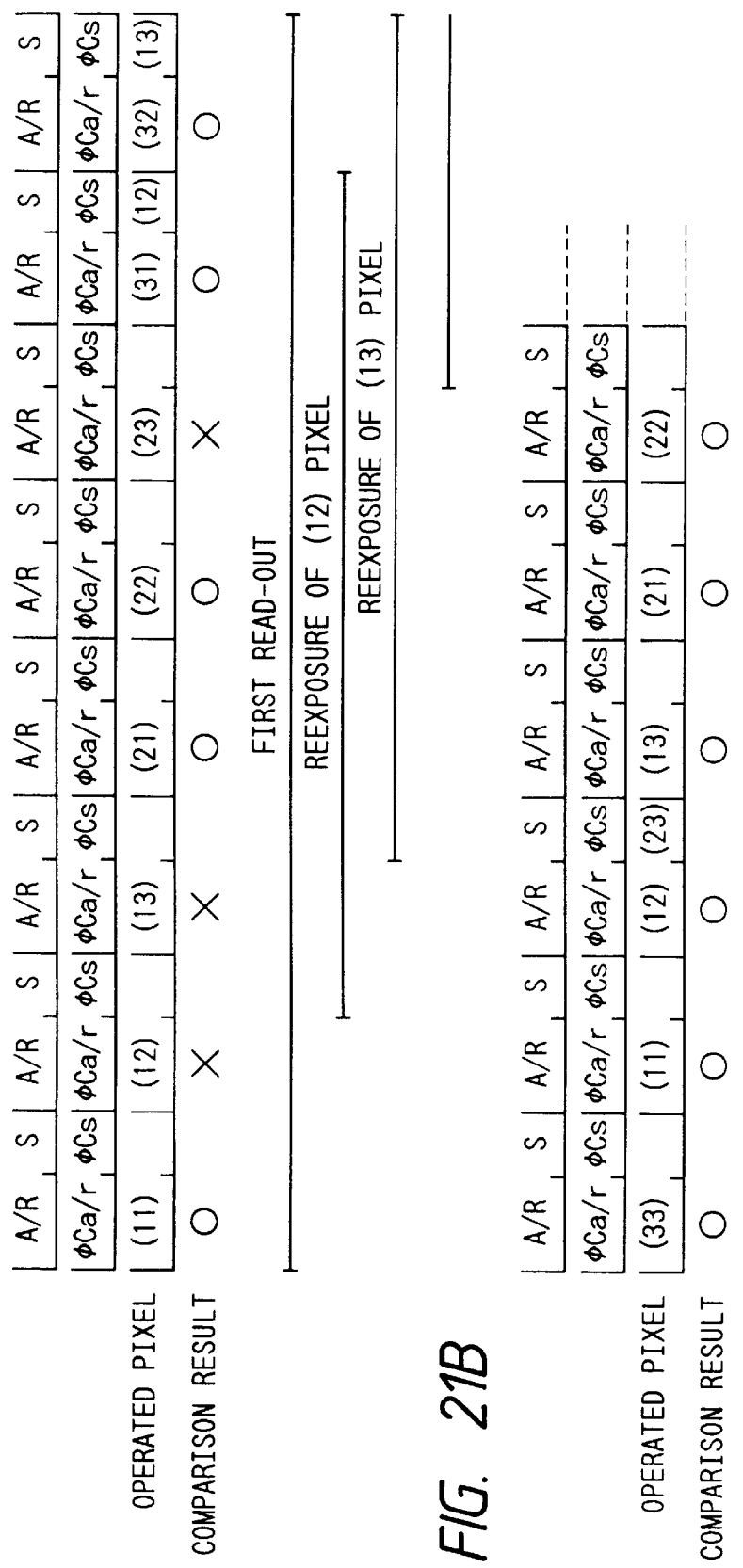
FIGS. 21A and 21B are views showing the operation of the solid-state image pickup element according to the embodiment shown in FIG. 19.

FIGS. 21A and 21B are views each showing, in correspondence with time elapse, the operating states of the random access circuit (indicated by A), the random reset circuit (indicated by R), and the random sample circuit (indicated by S) of each pixel, the access reset control pulse øCa/r and the sample control pulse øCs selected, and the comparison result between a reference signal and an image signal of each corresponding pixel obtained by a comparator 18. In this embodiment, a repetition time during which the random access circuits are operated to read out signals from the sample-and-hold circuits of a plurality of pixels is divided into two parts: one is a time in which the random access circuits and the random reset circuits are operated, and the other is a time in which the random sample circuits are operated. FIGS. 21A and 21B illustrate a series of operations, in which the operation shown in FIG. 21A is followed by that shown in FIG. 21B.

The operation of this embodiment will be described below with reference to FIGS. 21A and 21B. First, after the first exposure is performed under given exposure conditions, the random sample circuits are operated to voltage-convert the electric charges stored in photodiodes D1 and storage capacitors C1 of all the pixels and sample-and-hold these electric charges in a predetermined order. The random access circuits are then operated to read out the image signals sampled-and-held in all the pixels, and at the same time the pixels are reset to start reexposure. In this first read-out, the comparison result of the comparator 18 indicates that pixels (12), (13), and (23) do not agree with the reference signal. Therefore, the addresses of these signals are stored in an address memory 21. When an appropriate exposure time has elapsed, the signal charge of the pixel (12) is sampled-and-held as follows. That is, in this embodiment, a time in which the random access circuits and the random reset circuits are operated is independent of a time in which the random sample circuits are operated. Therefore, after the random access circuit and the random reset circuit of a pixel (31) are operated, the pixel (12) is selected by the H-direction common address decoder 23 and the V-direction common address decoder 24 on the basis of the information stored in the address memory 21. Subsequently, the random sample circuit is operated by the sample control pulse øCs to sample-and-hold the reexposed signal charge. Sampling-and-holding is also performed for the pixels (13) and (23) in the same manner as described above. As the second read-out, the image signals sampled-and-held in all the pixels are read out in a predetermined order. In this embodiment, the common H-direction address decoder and the common V-direction address decoder are used, and the random access circuits and the random reset circuits are connected to the common access reset control line. This can simplify the arrangement of the solid-state image pickup element and can also widen the dynamic range of the element.

Figure 23:
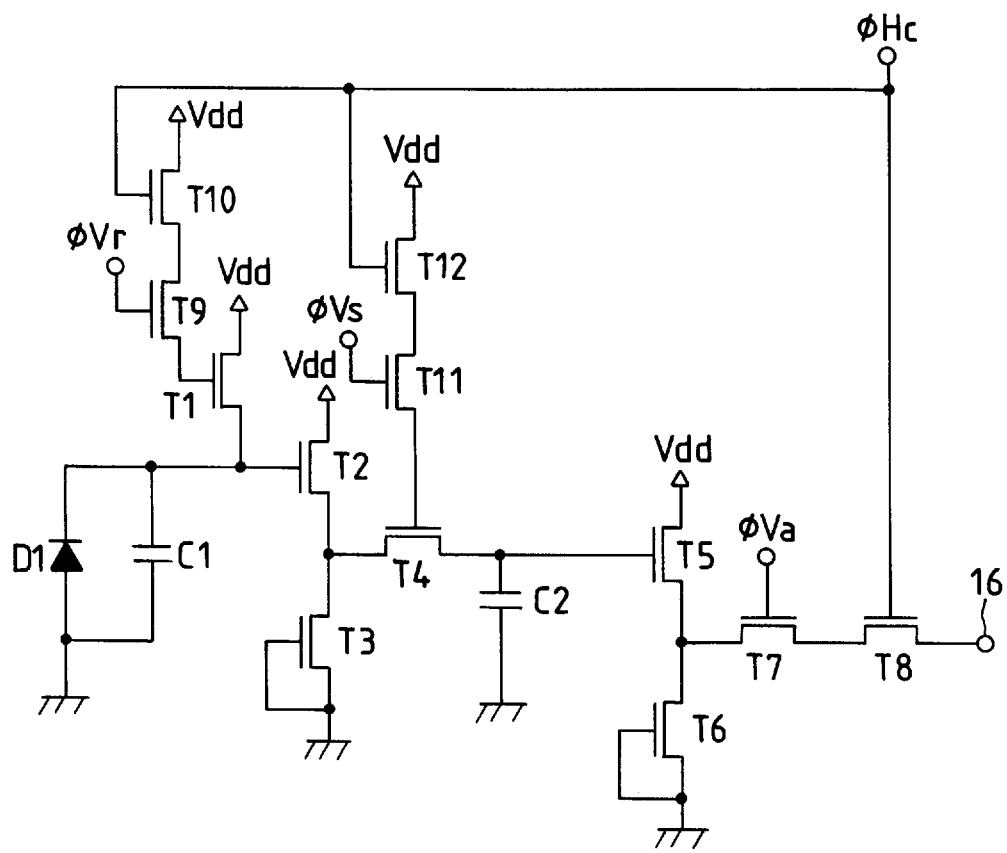
FIG. 23 is a circuit diagram showing the configuration of a pixel according to the embodiment shown in FIG. 22.

FIG. 22 shows still another embodiment of the solid-state image pickup element according to the present invention. Referring to FIG. 22, an H-direction common address decoder 23 is a common circuit for designating H-direction addresses for random access circuits, random reset circuits, and random sample circuits. FIG. 23 is a circuit diagram showing one of pixels 2 constituting the solid-state image pickup element shown in FIG. 22. Referring to FIG. 23, the gates of an H-direction access path transistor T8, an H-direction reset path transistor T10, and an H-direction sample path transistor T12 are connected together to an H-direction address line 6 of the H-direction common decoder 23. With this arrangement, the H-direction access path transistors T8, the H-direction reset path transistors T10, and the H-direction sample path transistors T12 of all pixels arranged in line in the V-direction, which are selected by an H-direction common address pulse øHc, are turned on. The pixels of this solid-state image pickup element are arranged into a 3 (row)×3 (column) matrix as shown in FIG. 10.

FIG. 24 is a view showing, in correspondence with time elapse, the operating states of the random access circuit (indicated by A), the random reset circuit (indicated by R), and the random sample circuit (indicated by S) of each pixel, and the comparison result between a reference signal and an image signal of each corresponding pixel obtained by a comparator 18. The operation of this embodiment will be described below with reference to FIG. 24. First, after the first exposure is performed under given exposure conditions, the random sample circuits are operated to voltage-convert the electric charges stored in photodiodes D1 and storage capacitors C1 of all the pixels and sample-and-hold these electric charges in a predetermined order. Subsequently, the random access circuits are operated to read out the image signals sampled-and-held in all the pixels in a predetermined order. In this first read-out, the comparison result of the comparator 18 shows that pixels (12), (13), and (23) do not coincide with the reference signal, and so the addresses of these pixels are stored in an address memory 21. In this embodiment, since the common address decoder is used in the H-direction, the H-direction address of the pixel (12) is selected next when the random access circuit of the pixel (22) is operated. At this point, the random reset circuit of the pixel (12) is operated by the V-direction decoder for the random reset circuits on the basis of the information stored in the address memory 21, thereby starting reexposure. Reexposure is also performed for the pixels (13) and (23) in the same manner as described above. When a proper exposure time has elapsed, the signal charge of the pixel (12) is sampled-and-held as follows. That is, in this embodiment, while the random access circuit of the pixel (32) with the same H-direction address as that of the pixel (12) is being operated, the random sample circuit of the pixel (12) is operated by the V-direction decoder for the random access circuits on the basis of the information stored in the address memory 21, thereby sampling-and-holding the reexposed signal charge. Sampling-and-holding is also performed for the pixels (13) and (23) in the same manner as described above. As the second read-out, the image signals sampled-and-held in all the pixels are read out in a predetermined order. In this embodiment, the use of the common address decoder in the H-direction makes it possible to simplify the configuration of the solid-state image pickup element and widen the dynamic range of the element.

Figure 25A:
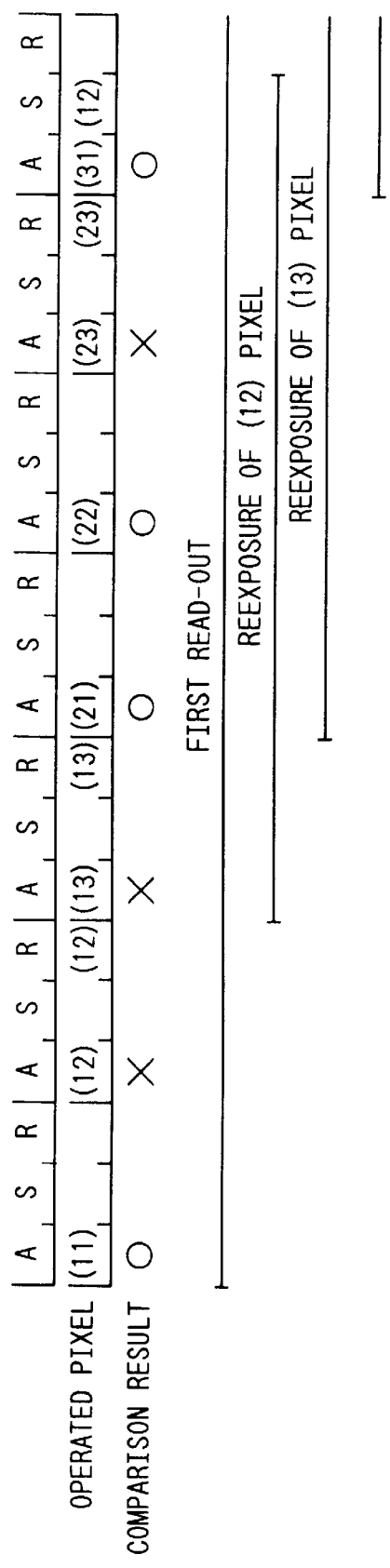
FIGS. 25A and 25B are views showing still another embodiment of the present invention.
Figure 25B:
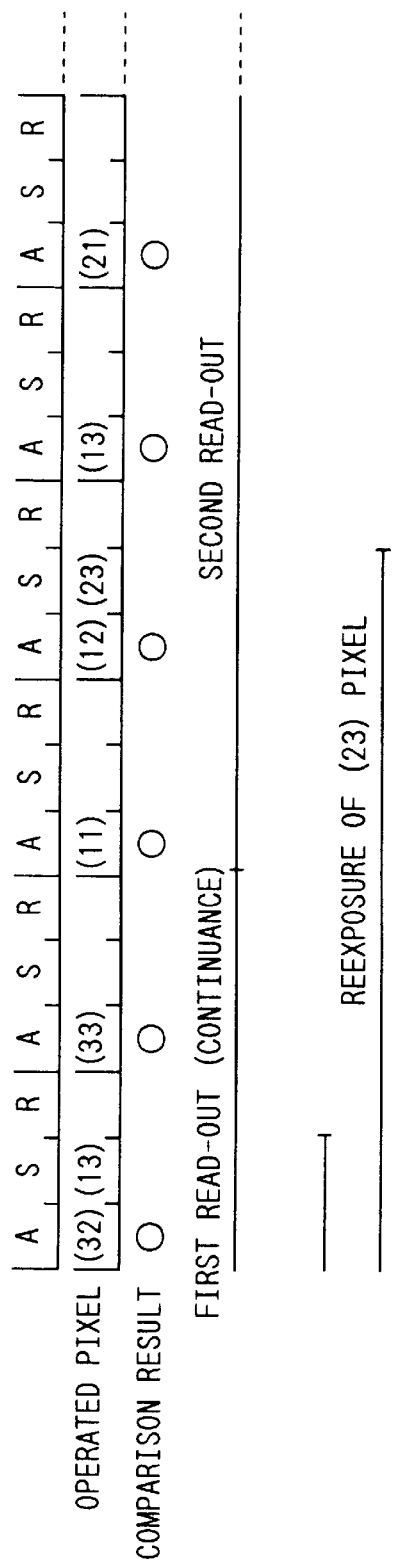

Still another embodiment of the present invention will be described below with reference to FIGS. 25A and 25B. FIGS. 25A and 25B are views each showing, in correspondence with time elapse, the operating states of a random access circuit (indicated by A), a random reset circuit (indicated by R), and a random sample circuit (indicated by S) of each pixel, and the comparison result between a reference signal and an image signal of each corresponding pixel obtained by a comparator 18. Note that this embodiment uses the solid-state image pickup element according to the embodiment shown in FIG. 22. In this embodiment, a repetition time during which the random access circuits are operated to read out signals from the sample-and-hold circuits of a plurality of pixels is divided into three parts: the first one is a time in which the random access circuits are operated, the second one is a time in which the random sample circuits are operated, and the third one is a time in which the random reset circuits are operated. FIGS. 25A and 25B illustrate a series of operations, in which the operation shown in FIG. 25A is followed by that shown in FIG. 25B.

Referring to FIGS. 25A and 25B, the first read-out is performed, and the comparator 18 compares the readout pixel signals with the reference signal. The comparison result of the comparator 18 shows that pixels (12), (13), and (23) do not match the reference signal. Therefore, after the random access circuit of the pixel (12) is operated, the random reset circuit of the pixel (12) is operated to start reexposure. Reexposure is also performed for the pixels (13) and (23) in the same manner as described above. After the random access circuit of a pixel (31) is operated, the random sample circuit of the pixel (12) is operated to sample-and-hold the reexposed signal charge. Sampling-and-holding is also performed for the pixels (13) and (23) in the same manner as described above. Subsequently, as the second read-out, the image signals sampled-and-held in all the pixels are read out in a predetermined order. In this case, in the previous embodiment, setting of a reexposure time of a given pixel is limited, i.e., the random reset circuit and the random sample circuit of a given pixel are operated only when the same H-direction address is designated, so the exposure time can be set only in units of horizontal scanning periods. In this embodiment, however, a time in which the random access circuits are operated, a time in which the random sample circuits are operated, and a time in which the random reset circuits are operated are independent of one another. Therefore, by redesignating the H- and V-direction addresses, the exposure time can be set in units of repetition times during which pixel signals are read out in a predetermined order.

FIG. 26 shows still another embodiment of the solid-state image pickup element according to the present invention. Referring to FIG. 26, a V-direction common address decoder 24 is a common circuit for designating V-direction addresses for random access circuits, random reset circuits, and random sample circuits. FIG. 27 is a circuit diagram showing one of pixels 2 of the solid-state image pickup element shown in FIG. 26. Referring to FIG. 27, the gates of a V-direction access path transistor T7, a V-direction reset path transistor T9, and a V-direction sample path transistor T11 are connected together to a V-direction address line 10 of the V-direction common decoder 24. With this arrangement, the V-direction access path transistors T7, the V-direction reset path transistors T9, and the V-direction sample path transistors T11 of all pixels arranged in line in the H-direction, which are selected by a V-direction common address pulse øVc, are turned on. The pixels of this solid-state image pickup element are arranged in to a 3 (row)×3 (column) matrix as shown in FIG. 10.

Figure 28:
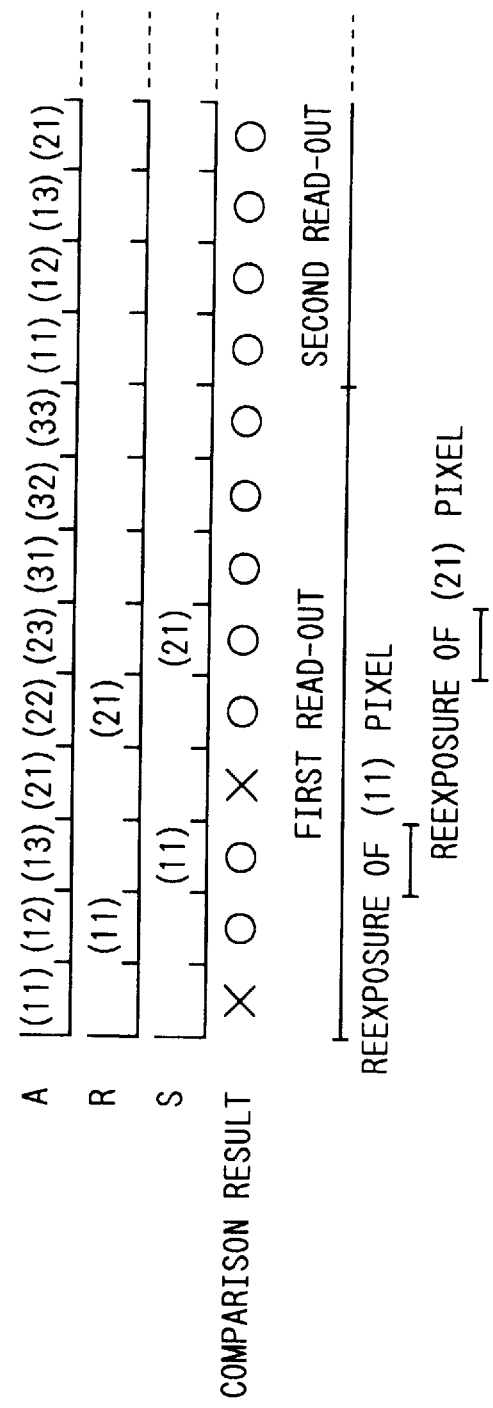
FIG. 28 is a view showing the operation of the solid-state image pickup element according to the embodiment shown in FIG. 26.

FIG. 28 is a view showing, in correspondence with time elapse, the operating states of the random access circuit (indicated by A), the random reset circuit (indicated by R), and the random sample circuit (indicated by S) of each pixel, and the comparison result between a reference signal an image signal of each corresponding pixel obtained by a comparator 18. The operation of this embodiment will be described below with reference to FIG. 28. First, after the first exposure is performed under certain exposure conditions, the random sample circuits are operated to voltage-convert the electric charges stored in photodiodes D1 and storage capacitors C1 of all the pixels and sample-and-hold these electric charges in a predetermined order. Subsequently, the random access circuits are operated to read out the image signals sampled-and-held in all the pixels in a predetermined order. In this first read-out, the comparison result of the comparator 18 exhibits that pixels (11) and (21) do not agree with the reference signal, and so the addresses of these pixels are stored in an address memory 21. In this embodiment, since the common V-direction address decoder is used, the V-direction address of the pixel (11) is selected in a current vertical scanning period or after one vertical scanning period.

FIG. 28 illustrates a state in which the V-direction address is currently selected and hence the random access circuit of the pixel (12) is operated. At this point, the random reset circuit of the pixel (11) is operated by the H-direction decoder for the random reset circuits on the basis of the information stored in the address memory 21, thereby starting reexposure. Reexposure is also started for the pixel (21) in the same manner as described above. When an appropriate exposure time has elapsed, the signal charge of the pixel (11) is sampled-and-held as follows. That is, in this embodiment, while the random access circuit of the pixel (13) having the same V-direction address as that of the pixel (11) is being operated, the random sample circuit of the pixel (11) is operated by the H-direction decoder for the random sample circuits on the basis of the information stored in the address memory 21, thereby sampling-and-holding the reexposed signal charge. Sampling-and-holding is also performed for the pixel (21) in the same manner as described above. As the second read-out, the image signals sampled-and-held by all the pixels are read out in a predetermined order. In this embodiment, the use of the common V-direction address decoder makes a simple arrangement of the solid-state image pickup element possible and can also widen the dynamic range of the element.

Still another embodiment of the present invention will be described with reference to FIGS. 25A and 25B. This embodiment uses the solid-state image pickup element according to the embodiment shown in FIG. 26. Referring to FIGS. 25A and 25B, the first read-out is performed, and then a comparator 18 compares the readout pixel signals with a reference signal. The comparison result of the comparator 18 shows that pixels (12), (13), and (23) do not coincide with the reference signal. Therefore, after the random access circuit of the pixel (12) is operated, the random reset circuit of the pixel (12) is operated to start reexposure. Reexposure is also performed for the pixels (13) and (23) in the same manner as described above. After the random access circuit of a pixel (31) is operated, the random sample circuit of the pixel (12) is operated to sample-and-hold the reexposed signal charge. Sampling-and-holding is also performed for the pixels (13) and (23) in the same manner as described above. Subsequently, as the second read-out, the image signals sampled-and-held in all the pixels are read out in a predetermined order. In this case, in the embodiment shown in FIG. 26, setting of a reexposure time of a given pixel is limited, i.e., the random reset circuit and the random sample circuit of a given pixel are operated only when the same V-direction address is designated. Therefore, the exposure time can be set only within a current horizontal scanning period or within a horizontal scanning period corresponding to each vertical scanning period. In this embodiment, however, a time in which the random access circuits are operated, a time in which the random sample circuits are operated, and a time in which the random reset circuits are operated are independent of one another. Therefore, by redesignating the H- and V-direction addresses, the exposure time can be set in units of repetition times during which pixel signals are read out in a predetermined order.

Figure 29:
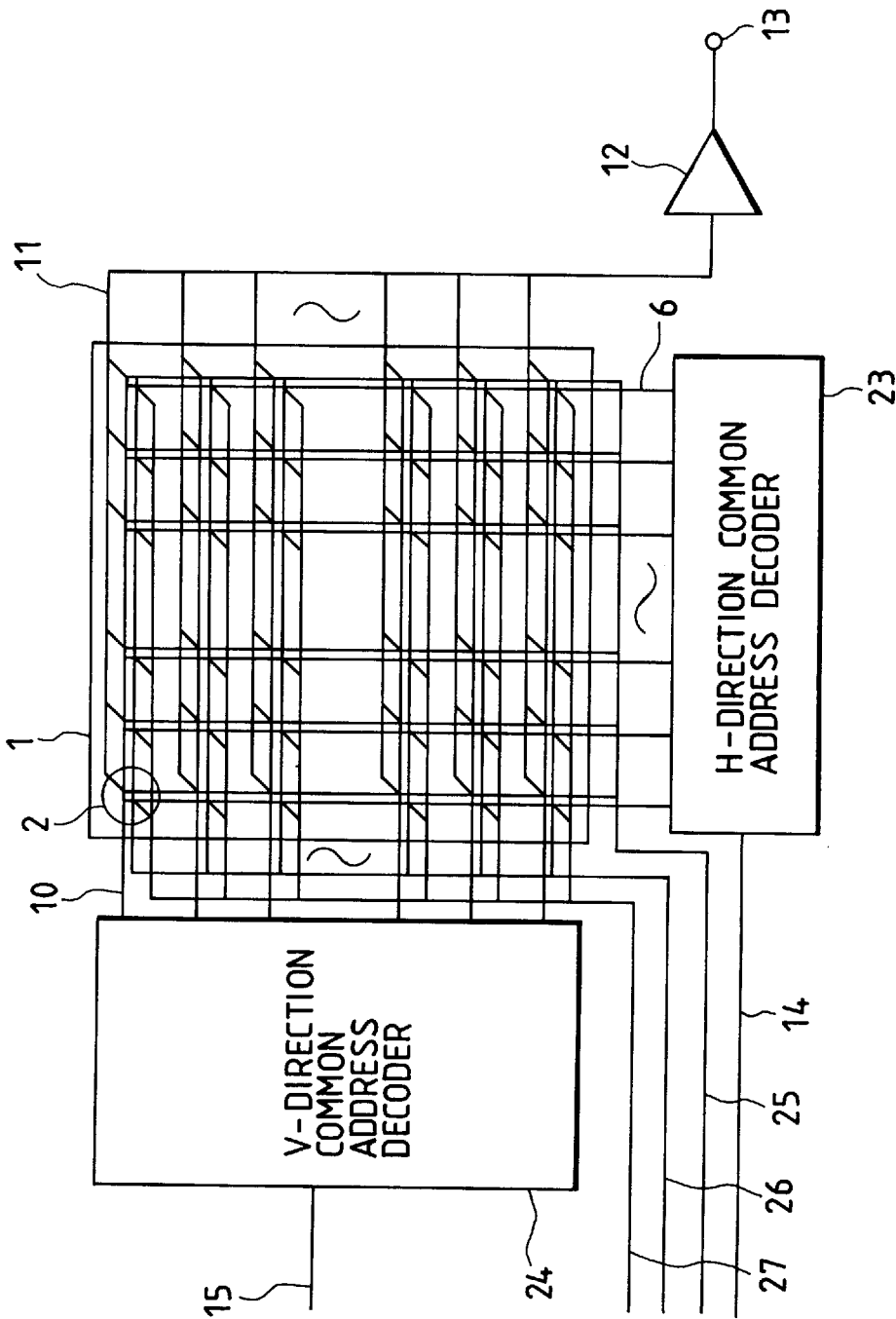
FIG. 29 is a view showing the circuit configuration of still another embodiment of a solid-state image pickup element according to the present invention.

FIG. 29 shows still another embodiment of the solid-state image pickup element. Referring to FIG. 29, an H-direction common address decoder 23 is a common circuit for designating H-direction addresses for random access circuits, random reset circuits, and random sample circuits, and a V-direction common address decoder 24 is a common circuit for designating V-direction addresses for the random access circuits, the random reset circuits, and the random sample circuits. An access control line 25 is connected to the gates of access control path transistors T13 of all pixels, a reset control line 26 is connected to the gates of reset control path transistors T15 of all pixels, and a sample control line 27 is connected to the gates of sample control path transistors T17 of all pixels.

Figure 30:
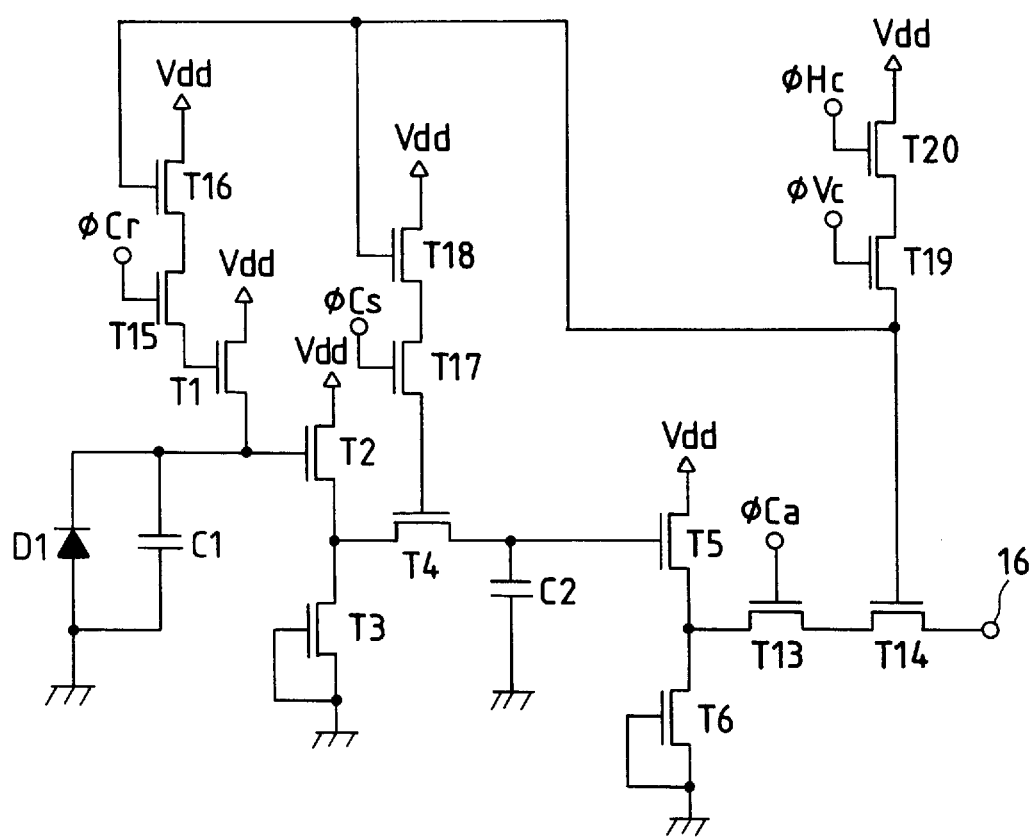
FIG. 30 is a circuit diagram showing the configuration of a pixel according to the embodiment shown in FIG. 29.

FIG. 30 is a circuit diagram showing one of pixels 2 of the solid-state image pickup element of this embodiment. Referring to FIG. 30, an H-direction address path transistor T20 whose gate is connected to an H-direction address line 6 and a V-direction address path transistor T19 whose gate is connected to a V-direction address line 10 are connected in series with each other. The output terminal of the transistor T19 is connected to the gates of an access path transistor T14, a reset path transistor T16, and a sample path transistor T18, which gates are connected together. With this arrangement, the access path transistor T14, the reset path transistor T16, and the sample path transistor T18 of one pixel selected by an H-direction common address pulse øHc and a V-direction common address pulse øVc are turned on. The random access circuits, the random reset circuits, and the random sample circuits are selectively operated by an access control pulse øCa, a reset control pulse øCr, and a sample control pulse øCs, respectively. The pixels of this solid-state image pickup element are arranged into a 3 (row)×3 (column) matrix as shown in FIG. 10.

Figure 31:
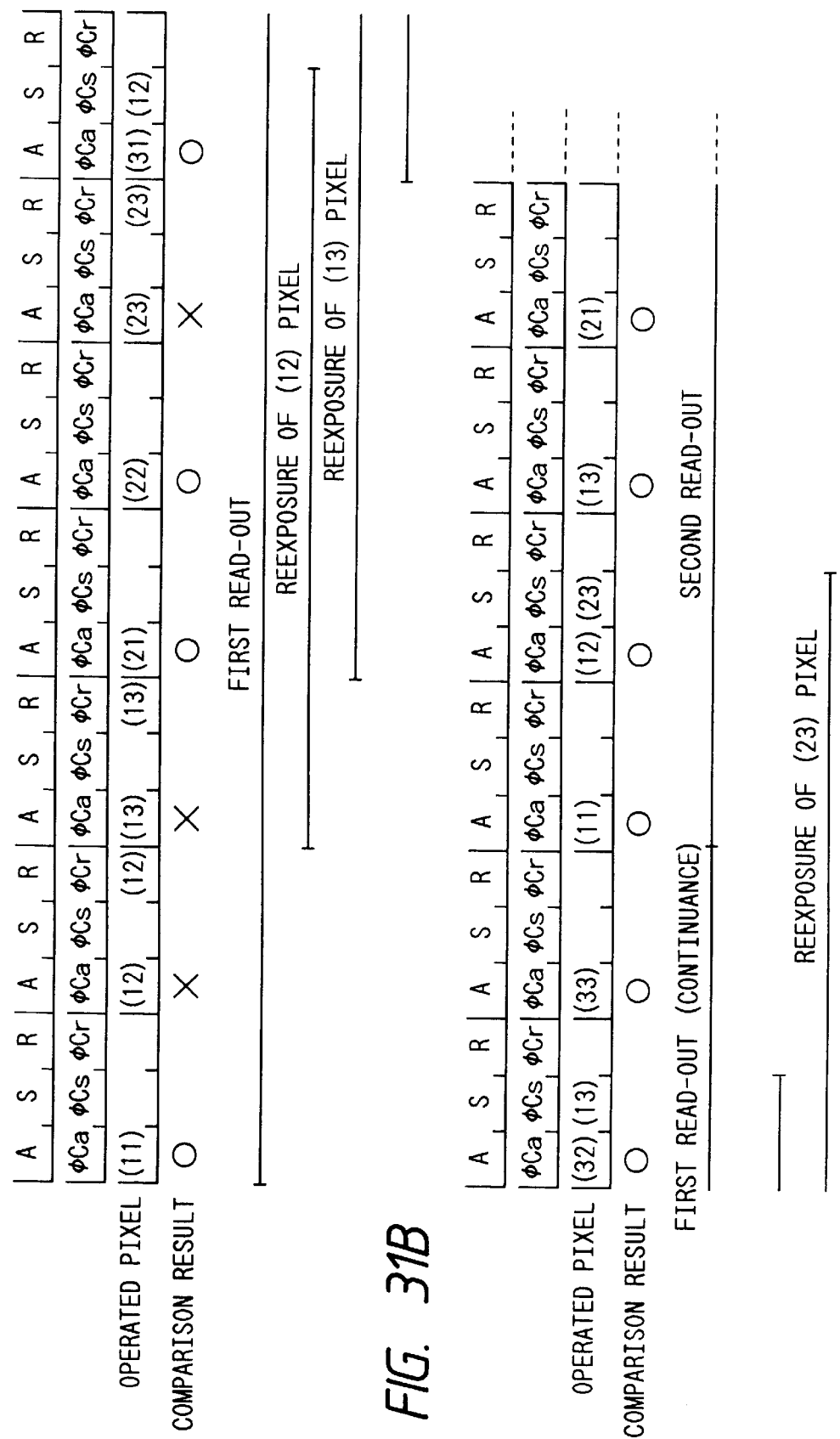
FIGS. 31A and 31B are views showing the operation of the solid-state image pickup element according to the embodiment shown in FIG. 29.

FIGS. 31A and 31B are views each showing, in correspondence with time elapse, the operating states of the random access circuit (indicated by A), the random reset circuit (indicated by R), and the random sample circuit (indicated by S) of each pixel, the access control pulse øCa, the reset control pulse øCr, and the sample control pulse øCs selected, and the comparison result between a reference signal and an image signal of each corresponding pixel obtained by a comparator 18. In this embodiment, a repetition time during which the random access circuits are operated to read out signals from the sample-and-hold circuits of a plurality of pixels in a predetermined order is divided into three parts: the first one is a time in which the random access circuits are operated, the second one is a time in which the random sample circuits are operated, and the third one is a time in which the random reset circuits are operated. FIGS. 31A and 31B illustrate a series of operations, in which the operation shown in FIG. 31A is followed by that shown in FIG. 31B.

The operation of this embodiment will be described below with reference to FIGS. 31A and 31B. After the first exposure is performed under certain exposure conditions, the random sample circuits are operated to voltage-convert the electric charges stored in photodiodes D1 and storage capacitors C1 of all the pixels and sample-and-hold these electric charges in a predetermined order. The random access circuits are then operated to read out the image signals sampled-and-held in all the pixels in a predetermined order. In this first read-out, the comparison result of the comparator 18 indicates that pixels (12), (13), and (23) do not agree with the reference signal. Therefore, the addresses of these pixels are stored in an address memory 21. In this embodiment, a time in which the random access circuits are operated, a time in which the random sample circuits are operated, and a time in which the random reset circuits are operated are independent of one another. Therefore, after the random access circuit and the random reset circuit of the pixel (12) are operated, the pixel (12) is selected by the H-direction command address decoder 23 and the V-direction common address decoder 24 on the basis of the information stored in the address memory 21. Subsequently, the random reset circuit is operated by the reset control pulse øCr, thereby starting reexposure. Reexposure is also performed for the pixels (13) and (23) in the same manner as described above. When a proper exposure time has elapsed, the signal charge of the pixel (12) is sampled-and-held as follows. That is, in this embodiment, after the random access circuit of a pixel (31) is operated, the pixel (12) is selected by the H-direction common address decoder 23 and the V-direction common address decoder 24 on the basis of the information stored in the address memory 21. Thereafter, the random sample circuit is operated by the sample control pulse øCs to sample-and-hold the reexposed signal charge. Sampling-and-holding is also performed for the pixels (13) and (23) in the same manner as described above. As the second read-out, the image signals sampled-and-held by all the pixels are read out in a predetermined order. Also in this embodiment, the use of the common H-direction address decoder and the common V-direction address decoder makes it possible to simplify the configuration of the solid-state image pickup element and widen the dynamic range of the element.

According to each of the above-mentioned embodiments, common circuits are used as the H-direction decoder and the V-direction decoder for operating the random reset circuits, the random sample circuits, or the random access circuits. This can widen the dynamic range of the solid-state image pickup element and can also decrease the circuit scale of the element. Consequently, miniaturization of the apparatus and reduction in cost can be realized.

The information of each pixel of an optical image obtained by each of the above solid-state image pickup elements undergoes a process of repetitive charging or long-distance transfer performed by a CCD or a switching circuit of a MOS transistor before being supplied to a signal processor. In such a process, the information is charged repeatedly or transferred a long distance such that the charge amount is kept stored as much as possible. The transfer efficiency, however, cannot be 100%, and this causes deterioration in image quality, such as a reduction in S/N ratio.

Although digital signal processing is performed to reduce degradation in image quality even if complicated signal processing is performed, the advantage of such digital signal processing has not been used effectively because analog charge transfer is performed before the processing.

Still another embodiment of the solid-state image pickup element which can solve the above problem and provide digital data directly for each pixel will be described below. In addition, an embodiment of an addition apparatus capable of changing the addition ratio of a plurality of digital signals with a simple circuit configuration will be described below.

That is, in the former embodiment of the present invention, a plurality of analog-to-digital converting means for converting outputs from a plurality of photoelectric converting elements into digital data are provided.

The latter embodiment of the present invention comprises a plurality of current switches each for controlling a current in accordance with a digital signal, and a resistor circuit for adding the currents controlled by these current switches.

According to the above first embodiment, analog-to-digital conversion is performed for information of each pixel of an image pickup element or for information of pixels subjected to subsampling or addition that is required in signal processing, and then the converted data is output as digital data. This can prevent a decrease in S/N ratio caused by analog charge transfer.

According to the above second embodiment, the individual current switches are controlled by respective digital data, and their respective controlled currents are added by the resistor circuit. As a result, an analog signal calculated by adding a plurality of digital signals at a given addition ratio can be obtained from the resistor circuit.

Figure 32:
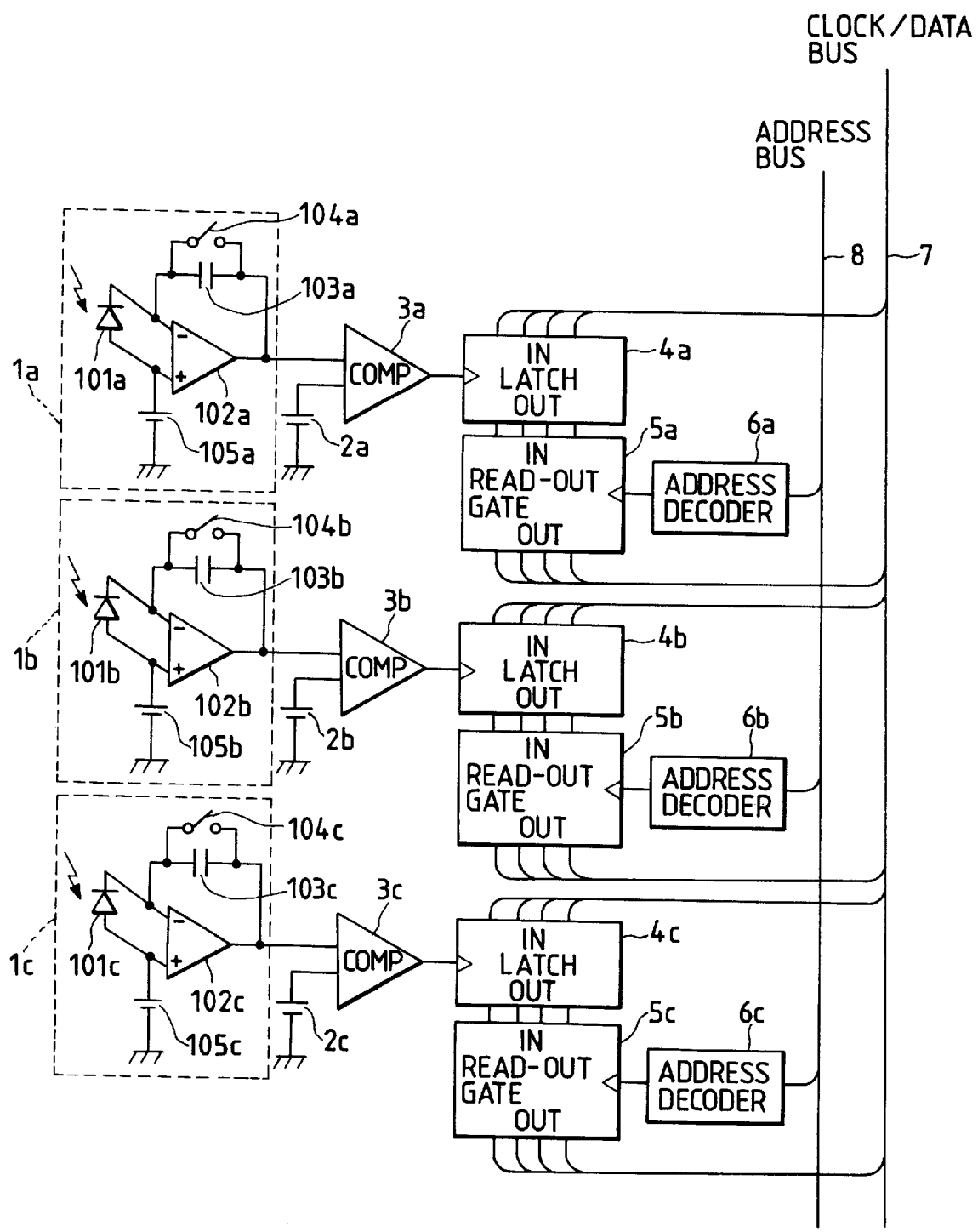
FIG. 32 is a circuit diagram showing still another embodiment of the present invention.

FIG. 32 shows a practical embodiment. Referring to FIG. 32, symbols a, b, and c suffixed to reference numerals 1 to 6 are used to distinguish between a plurality of blocks or circuit elements having the same function. The arrangement and the operation of this embodiment will be described below without using these suffixes a, b, and c, and the suffixes are used only when they are needed.

Referring to FIG. 32, a photoelectric converting element 101 converts light into an electric charge, and an operational amplifier 102 constitutes an integrator for integrating the charge generated by the photoelectric converting element 101. A capacitor 103 constitutes the integrator, and a switch 104 initializes the integrator by discharging the capacitor 103. The integrator also has a reference voltage source 105. Each of light quantity sensors 1a, 1b, and 1c each constituted by these components 101 to 105 outputs a signal corresponding to the integrated amount of the quantity of light radiated onto the photoelectric converting element 101.

A comparator 3 compares the output from the light quantity sensor 1 with a reference voltage from a reference voltage source 2 and outputs the comparison result. A latch 4 holds the value of a clock/data bus 7 (to be described later) in accordance with the output from the comparator 3. A read-out gate 5 sequentially reads out the outputs from the latch 4 in accordance with the value of an address bus 8 (to be described later). An address decoder 6 decodes the address data of the address bus 8 to generate a signal for controlling the read-out gate 5.

The 4-bit clock/data bus 7 supplies clocks for count and reads out data from the latch 4. The address bus 8 is used to select the latch 4 to be read out. Although only three photoelectric converting elements 101 are shown in FIG. 32, a large number of these photoelectric converting elements are arranged two-dimensionally in practice.

The operation of extracting an optical image as still picture information in the above arrangement will be described below with reference to the timing chart shown in FIG. 33.

First, S1, S2, IRIS, and MECHANICAL SHUTTER shown in FIG. 33 will be described. S1 represents an output waveform from a switch ("H" in an ON state) which is turned on by a first-stroke manipulation of a release button (not shown). S2 represents an output waveform from a switch ("H" in an ON state) which is turned on by a second-stroke manipulation of the release button. IRIS represents a waveform indicating the operation of an optical iris. The iris is open in a normal state (the lowest level in FIG. 33), stopped down to a predetermined iris value (the leading edge in FIG. 33) during imaging, and returned to the initial open position (the trailing edge in FIG. 33) at the end of imaging. In FIG. 33, the overshoot after the leading edge is due to inertia when iris blades are stopped at the predetermined iris value.

MECHANICAL SHUTTER represents the operation of a shutter such as a focal-plane shutter. In FIG. 33, the lowest level indicates a closed state, and the highest level indicates an open state.

When S1 is turned on, the luminance of an object to be imaged is measured by using a known photometry sensor, thereby calculating an iris value and an exposure time by which a necessary light quantity is given to an image formation surface on which the photoelectric converting elements 101 are arranged. Subsequently, when S2 is turned on, the iris is stopped down to the iris value calculated while only S1 is ON.

A reset switch 104 of each integrator is then opened from ON to OFF to thereby perform integration reset, and the mechanical shutter is also opened. As a result, an image of the object is radiated onto each photoelectric converting element 101, and integration of photoelectrons begins in each pixel.

When the exposure time calculated while S1 is ON has elapsed, the mechanical shutter is closed to stop the exposure, i.e., the integration of photoelectrons in each pixel. The manners of this integration in the individual pixels, i.e., the outputs from the individual integrators are represented by Comp A in, Comp B in, and Comp C in shown in FIG. 33.

Subsequently, after the mechanical shutter is closed, even white light (AUXILIARY LIGHT in FIG. 33) is radiated onto the surface, on which the photoelectric converting elements are arranged, on the rear surface side of the mechanical shutter away from the object to be imaged. At the same time, the 4-bit value of the clock/data bus 7 is decremented at predetermined time intervals (CLOCK/DATA 0, 1, 2, and 3 in FIG. 33). At this point, the address bus 8 is set in an address state that does not exist (in the embodiment of FIG. 33, ADDRESS 000), and all the outputs from the read-out gates 5 are set in a high-impedance state.

When the even white light is radiated as described above, the light quantity sensors 1 again start integration of photoelectrons for the individual pixels. Each comparator 3 compares the output from the corresponding light quantity sensor 1 with the reference voltage from the reference voltage source 2. If the output voltage (Comp A in, Comp B in, or Comp C in shown in FIG. 33) from the light quantity sensor 1 exceeds the reference voltage (the level indicated by an alternate long and short dashed line given to each of Comp A in, Comp B in, and Comp C in shown in FIG. 33), the output from the comparator 3 goes "H" (Comp A out, Comp B out, or Comp C out in FIG. 33). In response to the leading edge of the output from the comparator 3, the corresponding latch 4 latches the value of the clock/data bus 7 at that time.

Figure 33:
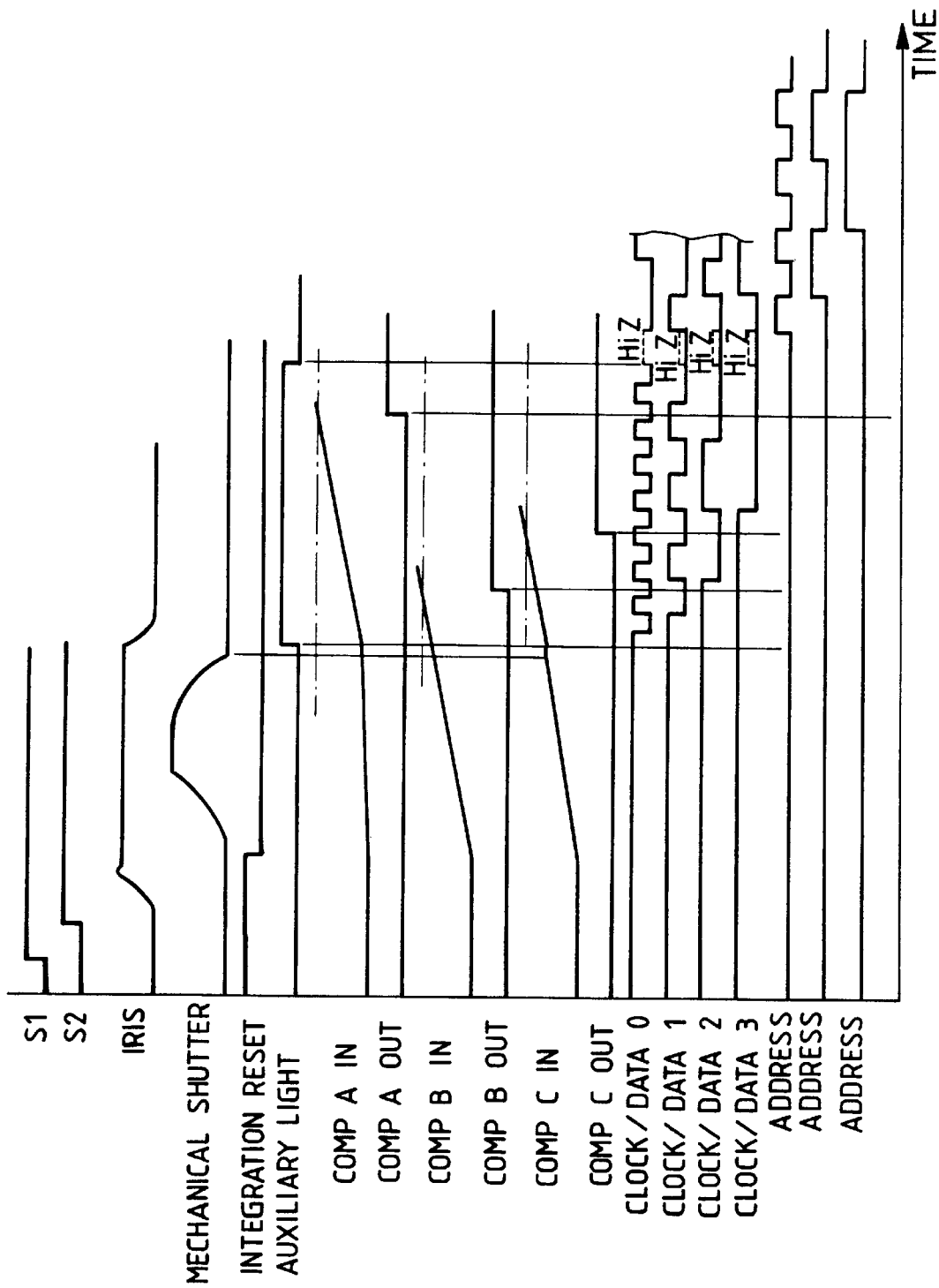
FIG. 33 is a timing chart showing the operation of the embodiment shown in FIG. 32.

In the embodiment shown in FIG. 33, the output from the comparator 3a goes "H" when the state of the clock/data bus 7 is 0010, so the latch 4a holds 0010. Since the output from the comparator 3b goes "H" when the state of the clock/data bus 7 is 1100, the latch 4b holds 1100. Likewise, the latch 4c holds 1001. When the clock/data bus 7 is decremented to 0000, the count operation (the decrement of the clock/data bus 7) is stopped, and at the same time the radiation of the auxiliary light to the light quantity sensors 1 is stopped.

Thereafter, a drive circuit for the clock/data bus 7 is set in a high-impedance state (HiZ in FIG. 33), and the value of the address bus 8 is set to an address corresponding to the light quantity sensor 1 to be read out. In the embodiment shown in FIG. 33, this address is simply incremented like 001, 010, 011, 100, . . .

This consequently makes it possible to enable the read-out gate 5 by the output signal from the designated address decoder 6, reading out the data from the latch 4 at the designated address through the clock/data bus 7. In FIG. 33, the value of the address bus 8 is changed sequentially, and this makes the data 0010, 1100, and 1001 held in the latches 4a, 4b, and 4c correspond to the addresses 001, 010, and 011, respectively. Accordingly, the contents of the latches 4a, 4b, and 4c can be read out in sequence.

In this embodiment, the photoelectric converting element, the integrator, and the comparator constitute each light quantity sensor 1. The same function, however, can be realized by making a large number of potential wells with the same charge capacity, such as CCDs, and providing means for detecting overflow of the charge of each well, thereby checking whether a predetermined light quantity is integrated.

When the photoelectric conversion efficiency of an object to be imaged is taken into account, it is desirable that the image formation surface of the solid-state image pickup element be covered with only the photoelectric converting elements 101. In this case, other components such as the latches and the buses are formed in locations except for the image formation surface. In other words, a three-dimensional integrating circuit in which parts except for light-receiving units are arranged in the direction of depth with respect to the image formation surface is desirable.

In addition, the clock/data bus 7 and the address bus 8 are provided independently of each other in this embodiment. It is, however, of course possible to reduce the number of lines by using a common bus for the clock/data bus and the address bus.

Figure 34:
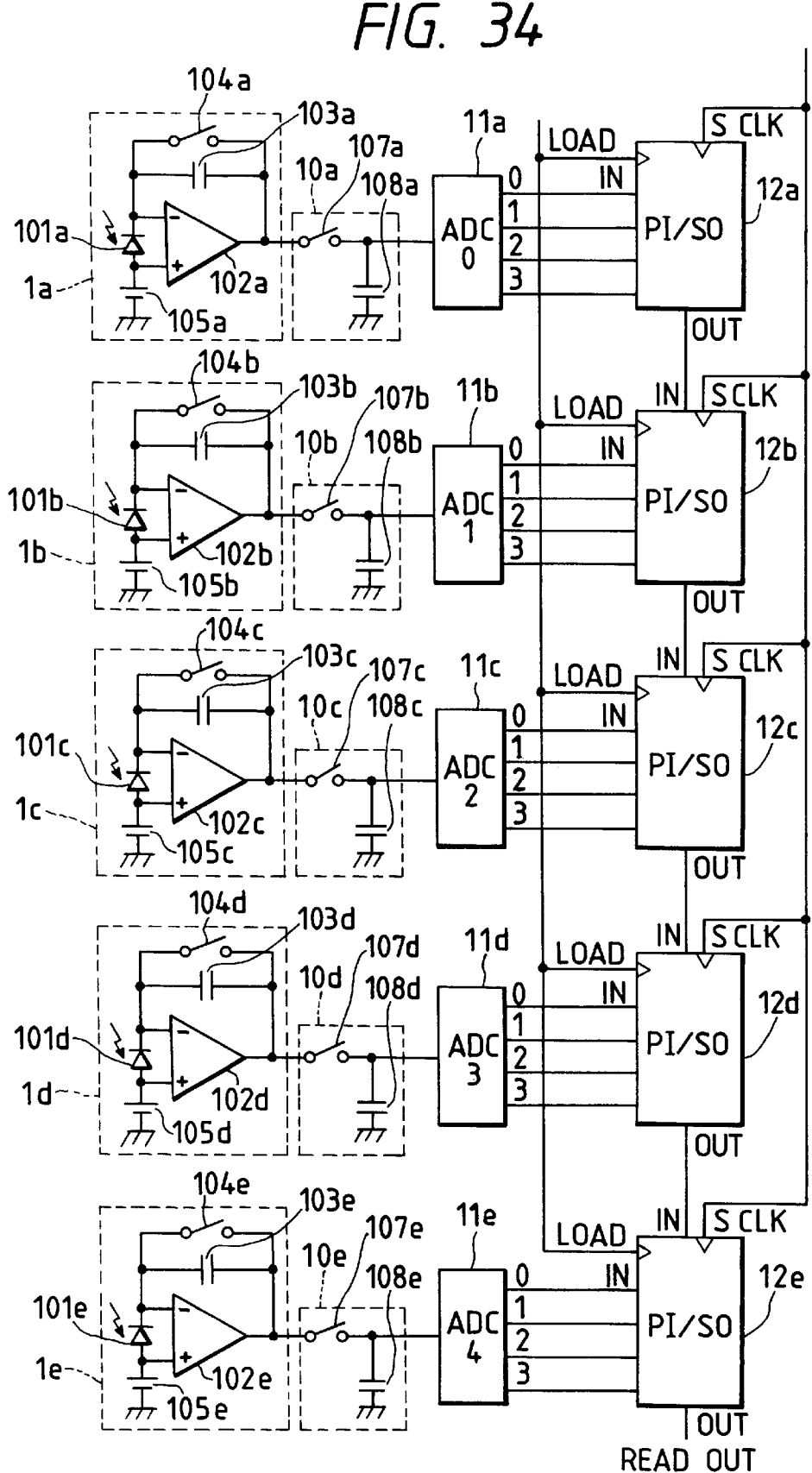
FIG. 34 is a circuit diagram showing still another embodiment of the present invention.
Figure 35:
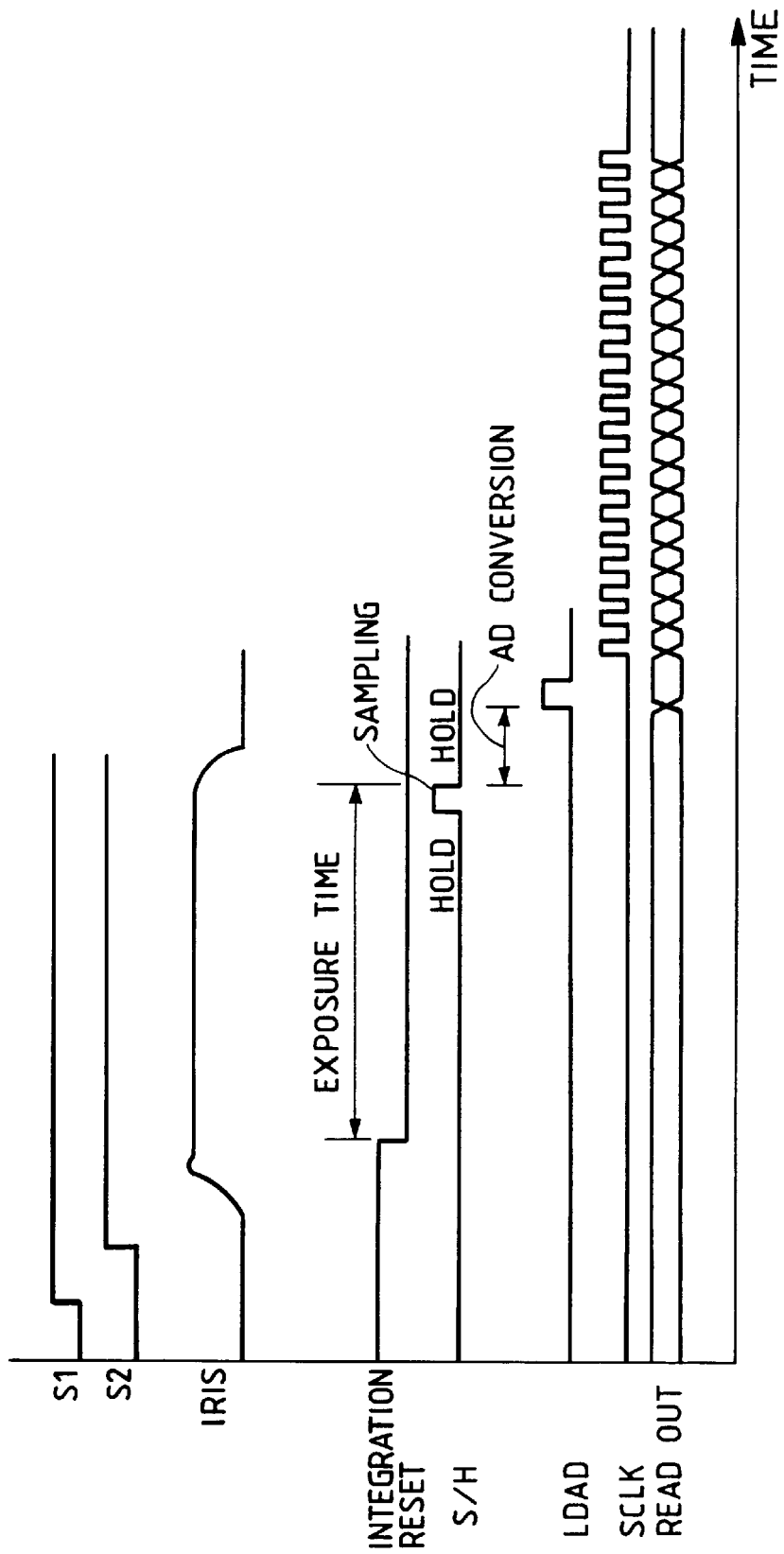
FIG. 35 is a timing chart showing the operation of the embodiment shown in FIG. 34.

FIG. 34 is a block diagram showing still another embodiment of the present invention, and FIG. 35 is a timing chart for explaining the operation of this embodiment.

Light quantity sensors 1a to 1e have the same arrangement as that shown in FIG. 32. A sample-and-hold circuit (to be referred to as an S/H circuit hereinafter) 10 samples and holds the output from the corresponding light quantity sensor 1 in accordance with a control signal. A switch 107 is turned on or off by a control signal to sample the output from the light quantity sensor 1. A capacitor 108 holds the sampled output from the light quantity sensor 1. An A/D converter (to be referred to as an ADC hereinafter) 11 converts the output from the light quantity sensor 1, which is held by the S/H circuit 10, into a digital value. A shift register 12 holds the output from the ADC 11 by bit parallel and outputs the signal by bit serial in accordance with clocks, thereby performing parallel/serial conversion.

The operation of the above arrangement will be described with reference to FIG. 35. Referring to FIG. 35, S1, S2, and an iris have the same functions as in FIG. 33.

When S1 is turned on, an iris value and an exposure time are calculated. Thereafter, when S2 is turned on, the iris is stopped down to the calculated iris value. The processing up to this point is the same as in the embodiment shown in FIG. 32.

Subsequently, reset switches 104 of integrators are opened to start integration. Since this embodiment has no mechanical shutter, exposure is started immediately after opening of the reset switches 104. An exposure time is counted from this point. When the calculated exposure time has elapsed, a control signal for performing sampling is applied to the S/H circuits 10, thereby starting sampling. The output values from the light quantity sensors 1 at the time the control signal is applied are held so that the operation is not influenced by an image of an object to be imaged that is radiated on the light quantity sensors 1. With this operation, the exposure time when no mechanical shutter is used can be controlled.

When the S/H circuits 10 go to a holding state after the above sampling operation, the ADCs 11 start A/D conversion. This A/D conversion is performed for the outputs from the S/H circuits 10, and so an arbitrary A/D conversion rate can be set. This makes the use of sequential comparison type ADCs possible although image signals are to be handled. When a time required for the A/D conversion has elapsed, a load signal LOAD is applied to the shift registers 12. The outputs from the ADCs 11 upon application of the signal LOAD are latched by the shift registers 12.

Subsequently, by applying a shift clock SCLK to the shift registers 12, all the data of the shift registers 12 connected in series with each other can be read out from the output terminal of the one in the final stage.

In this embodiment, the conversion rate of the ADCs 11 can take an arbitrary value because of the presence of the S/H circuits 10 as described above. It is, in contrast, obvious that the S/H circuits 10 need not be used if the conversion rate of the ADCs 11 is high enough that changes in the outputs from the light quantity sensors 1 during conversion can be neglected even in the ones corresponding to a high-luminance portion of an object to be imaged.

Figure 36:
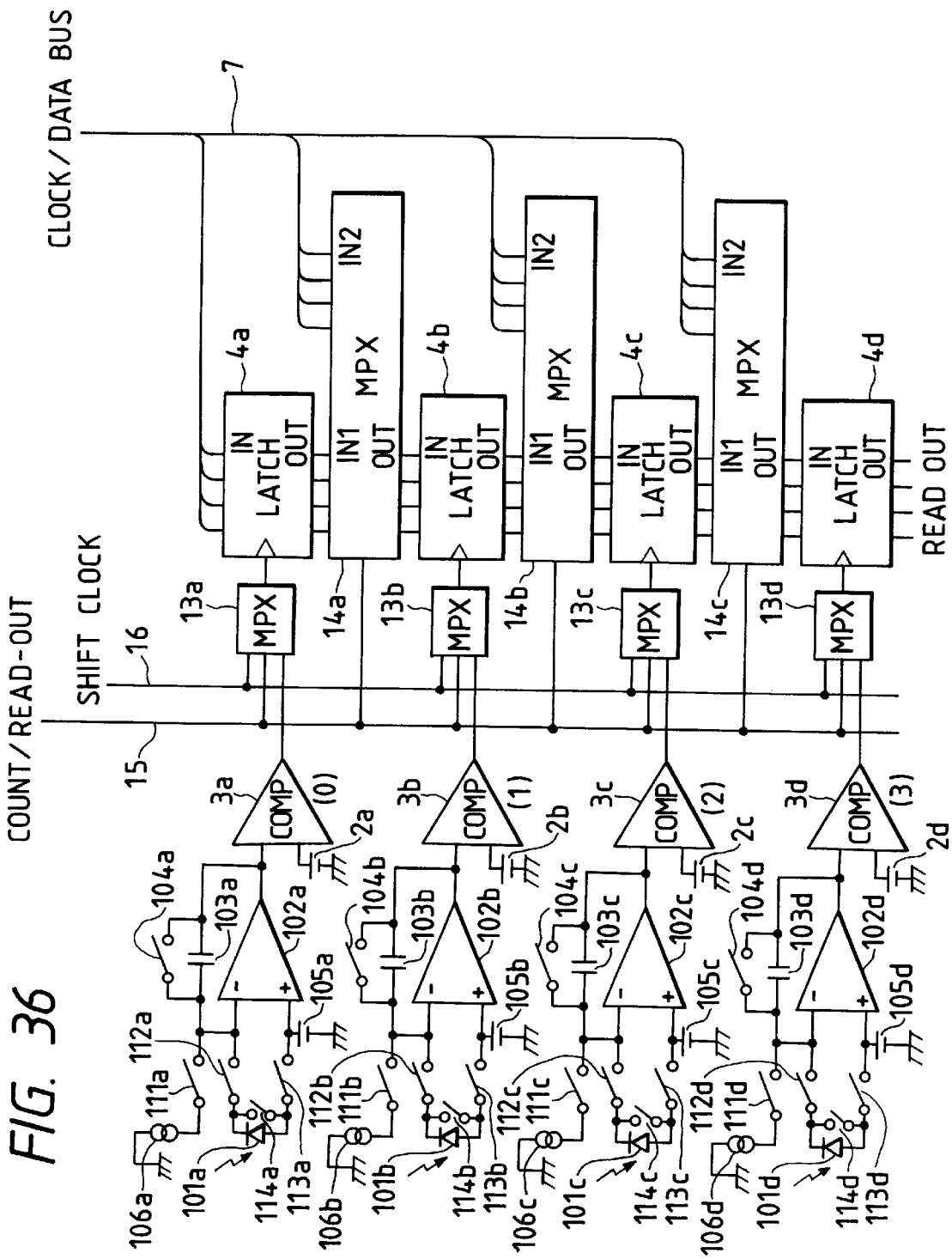
FIG. 36 is a circuit diagram showing still another embodiment of the present invention.

FIG. 36 shows still another embodiment which is different from the embodiment shown in FIG. 32 in the following respects. That is, in the preceding embodiment, the time (the time of reintegration) from the point at which light is shielded by the mechanical shutter to the point at which the integrated value in each integrator becomes a predetermined value by auxiliary light is counted. In this embodiment, however, an electric charge for performing reintegration until the integrated value becomes a predetermined value is given not by auxiliary light but by other current sources 106 which can be switched by switches 111 to 114. This is the first difference.

The second difference is to read out the value of a clock/data bus 7 latched by the outputs from comparators 3 while latches 4 are kept cascaded in parallel with each other. For this purpose, multiplexers (MPXs) 13 and 14 and control lines 15 and 16 are provided.

Figure 37:
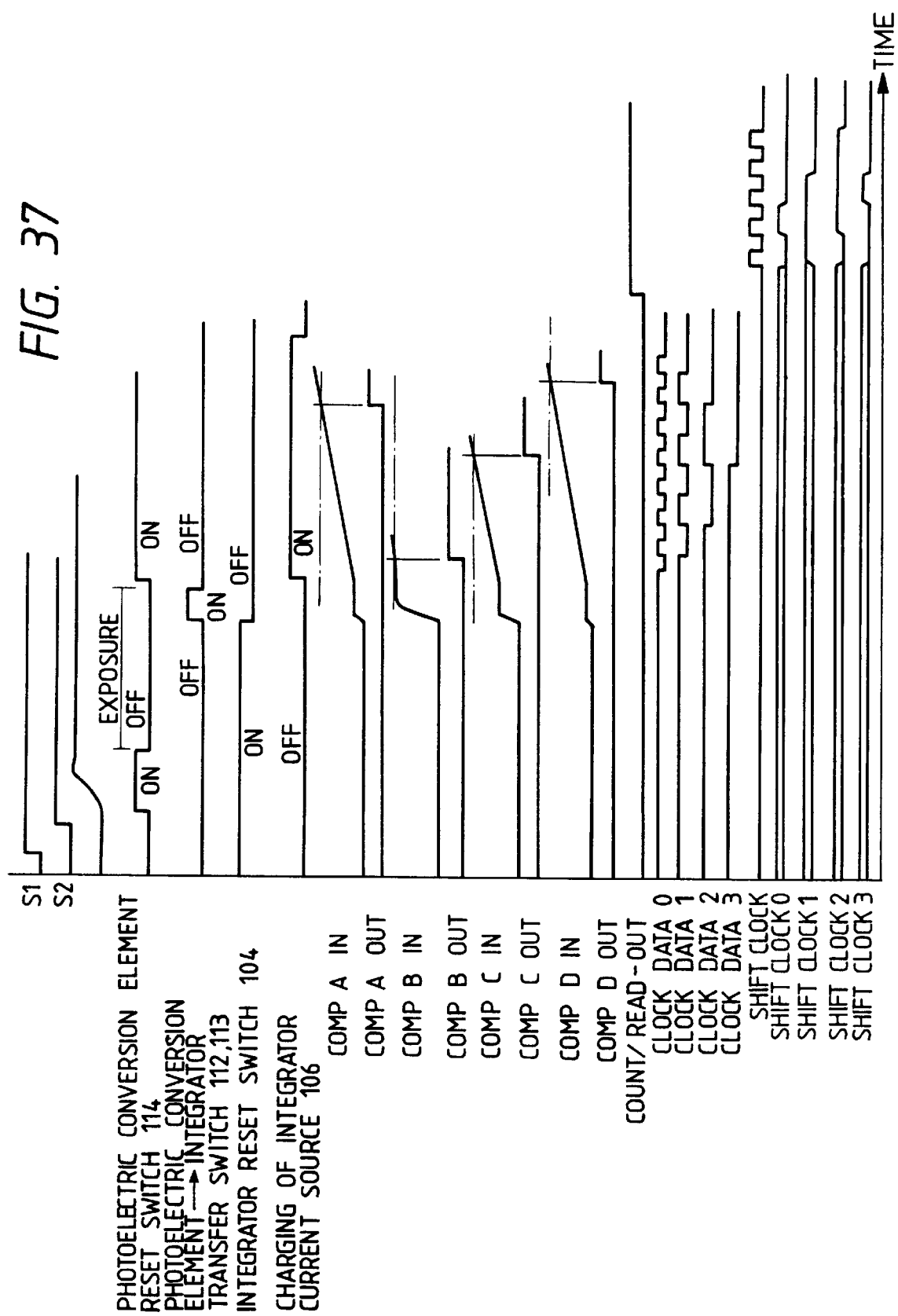
FIG. 37 is a timing chart showing the operation of the embodiment shown in FIG. 36.

The operation of this embodiment will be described below with reference to FIG. 37. Like in the two previous embodiments, an iris is stopped down to a predetermined value when S2 is turned on. When the iris is set at the predetermined value, the switches 114 that have reset photoelectric converting elements 101 are switched from ON to OFF, thereby starting storage of electric charges into junction capacitors of the photoelectric converting elements 101. At this point, the switches 112 and 113 for connecting the photoelectric converting elements 101 to the integrators and the switches 111 for connecting the current sources 106 for reintegration to the integrators are OFF, and reset switches 104 of the integrators are ON.

When an exposure time calculated during the ON period of S1 has elapsed from the start of exposure, the switches 104 are turned off and the switches 112 and 113 are turned on in order to transfer the electric charges stored in the junction capacitors of the photoelectric converting elements 101 to the integrators. When the charges in the photoelectric converting elements 101 are completely transferred to the integrators, the switches 112 and 113 are turned off immediately. At substantially the same time, the switches 114 for resetting the photoelectric converting elements 101 are turned on for the reason explained below.

That is, since this embodiment has no mechanical shutter like in the embodiment shown in FIG. 34, light is kept incident on each photoelectric converting element 101 even after exposure. Therefore, if the photoelectric converting element 101 generates an electric charge exceeding its own junction capacitance, the charge may leak out to other portions of the element, adversely affecting these portions. To avoid this problem, the switches 114 are turned on. In this case, it is apparent that each element need not be short-circuited between the anode and the cathode but may be grounded.

Subsequently, the integrators perform reintegration by using the current sources 106, and the clock/data bus 7 is decremented. At this point, the count/read-out control line 15 is at "L," and so the MPXs 13 are set to connect the outputs from the comparators 3 to the load terminals of the latches 4, and the MPXs 14 are set to connect the clock/data bus 7 to the data input terminals of the latches 4. Therefore, as in the embodiment shown in FIG. 32, the output from each comparator 3 goes "H" when the corresponding reintegrated value becomes a predetermined value (indicated by an alternate long and short dashed line given to each of COMP a to d in shown in FIG. 37), and the corresponding latch 4 latches the value of the clock/data bus 7 in response to this leading edge. When the value of the clock/data bus 7 is decremented to zero, count-down is stopped, and charging to the integrator by using the current source 106 is also stopped.

Subsequently, the control line 15 is set to "H" to perform switching between the MPX 13 and the MPX 14. In addition, the shift clock control line 16 is connected to the load terminal of the latch 4, and the output terminals of the latch 4 are connected to the input terminals of the next latch 4. When a data shift pulse is applied to the control line 16 in this state, the data in each latch 4 are output in series with each other by bit parallel.

Figure 38:
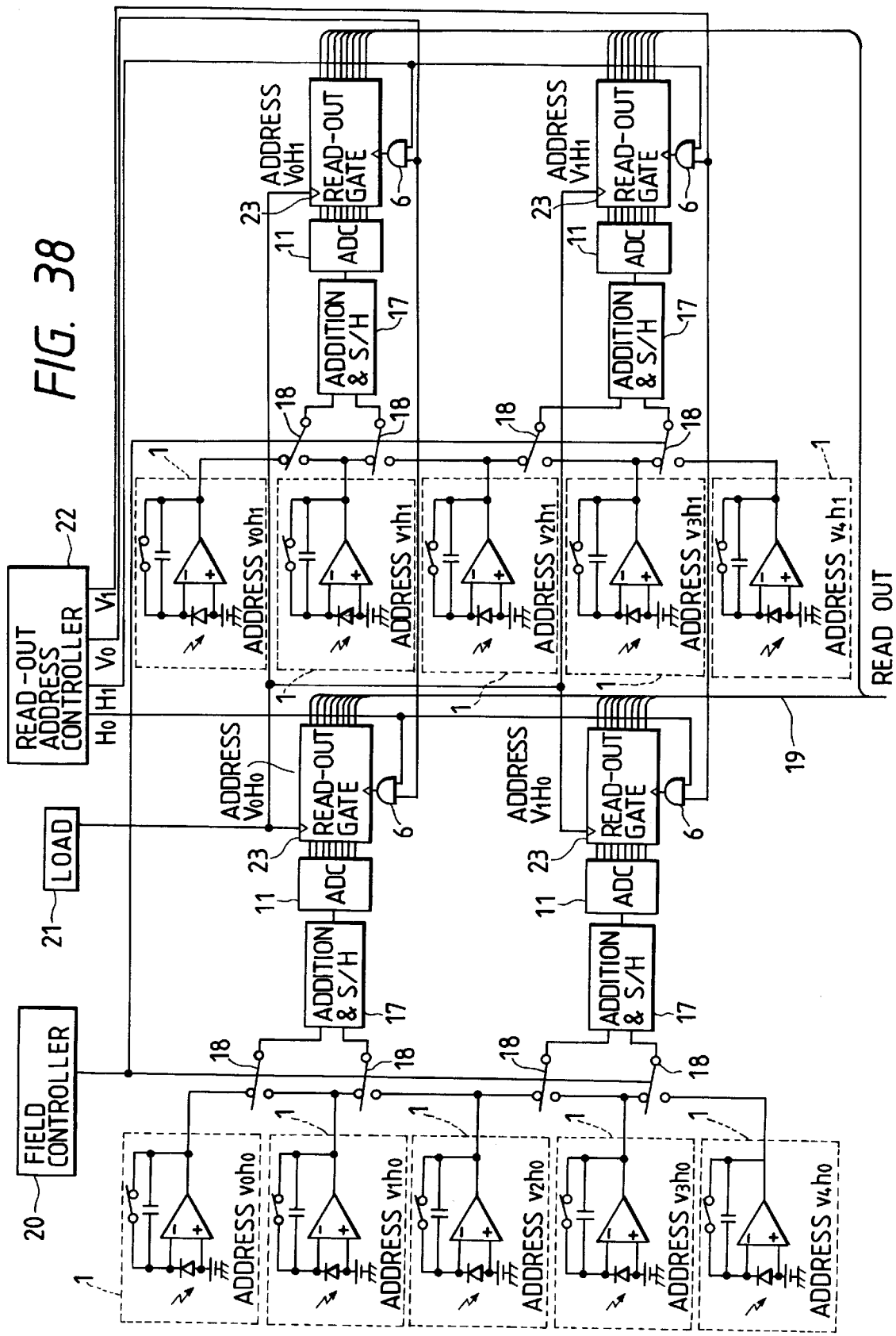
FIG. 38 is a circuit diagram showing still another embodiment of the present invention.
Figure 39:
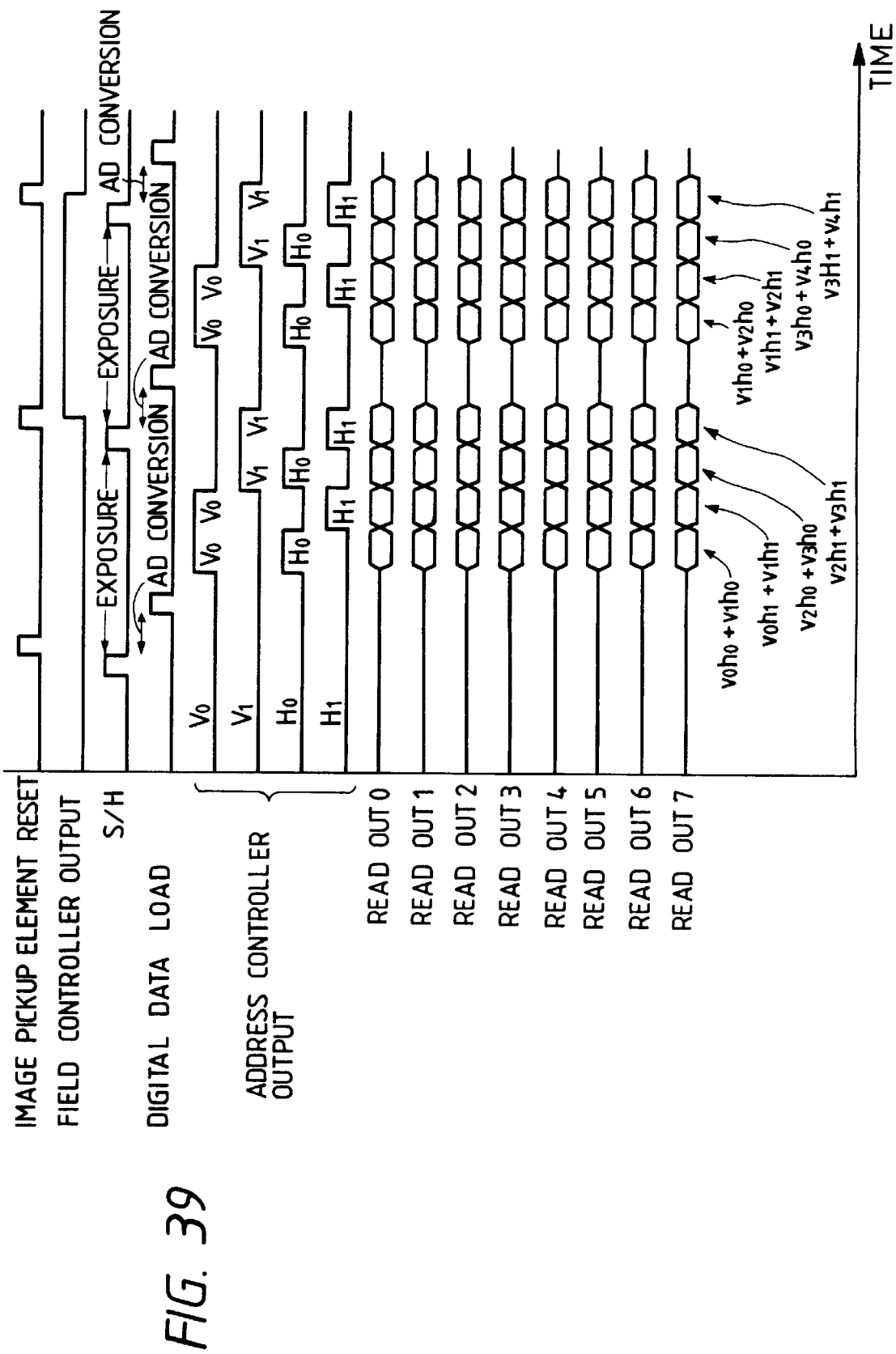
FIG. 39 is a timing chart showing the operation of the embodiment shown in FIG. 38.

FIG. 38 shows still another embodiment of the present invention, and FIG. 39 is a timing chart showing the operation of this embodiment. Like in the embodiment shown in FIG. 34, outputs from light quantity sensors 1 are sampled-and-held and then A/D-converted into digital values.

A method of reading out the digital data is identical with that of the embodiment shown in FIG. 32. That is, necessary data is read out from a given address by outputting the data onto a data bus line 19 by address designation. Therefore, explanation of the operation of converting the outputs from the light quantity sensors 1 into digital values and the operation of reading out these digital data will be omitted.

This embodiment differs from the previous embodiments in the following respect. That is, the outputs from the light quantity sensors 1 are added in units of two pixels in the vertical direction by addition & S/H circuits 17 via switches 18 controlled by a field controller 20, and the sums are A/D-converted by ADCs 11. This operation is performed by changing the combinations of two pixels to be added for each picture, thereby performing field interlace read-out from read-out gates 23 controlled by a load circuit 21.

There is also a difference in wiring between the address lines of FIGS. 38 and 32. In FIG. 38, address lines to be controlled by a read-out address controller 22 with respect to one pixel (in this embodiment, the sum of two pixels is processed as one pixel) are only two vertical address lines $V_0$ and $V_1$ and two horizontal address lines $H_0$ and $H_1$ corresponding to addresses $v_n$ and $h_n$ of each light quantity sensor 1. This wiring is advantageous in element design. In the embodiment shown in FIG. 32, on the other hand, it is necessary to arrange address lines for all pixels, and so 18 address lines are required for an image pickup element with about 260,000 pixels. In addition, address decoders are also required for all of these address lines in FIG. 32.

In this embodiment, as can be readily understood from FIG. 38, the outputs from the read-out address controller 22 shown in FIG. 39 indicate addresses (uppercase) with respect to the added data.

Figure 40:
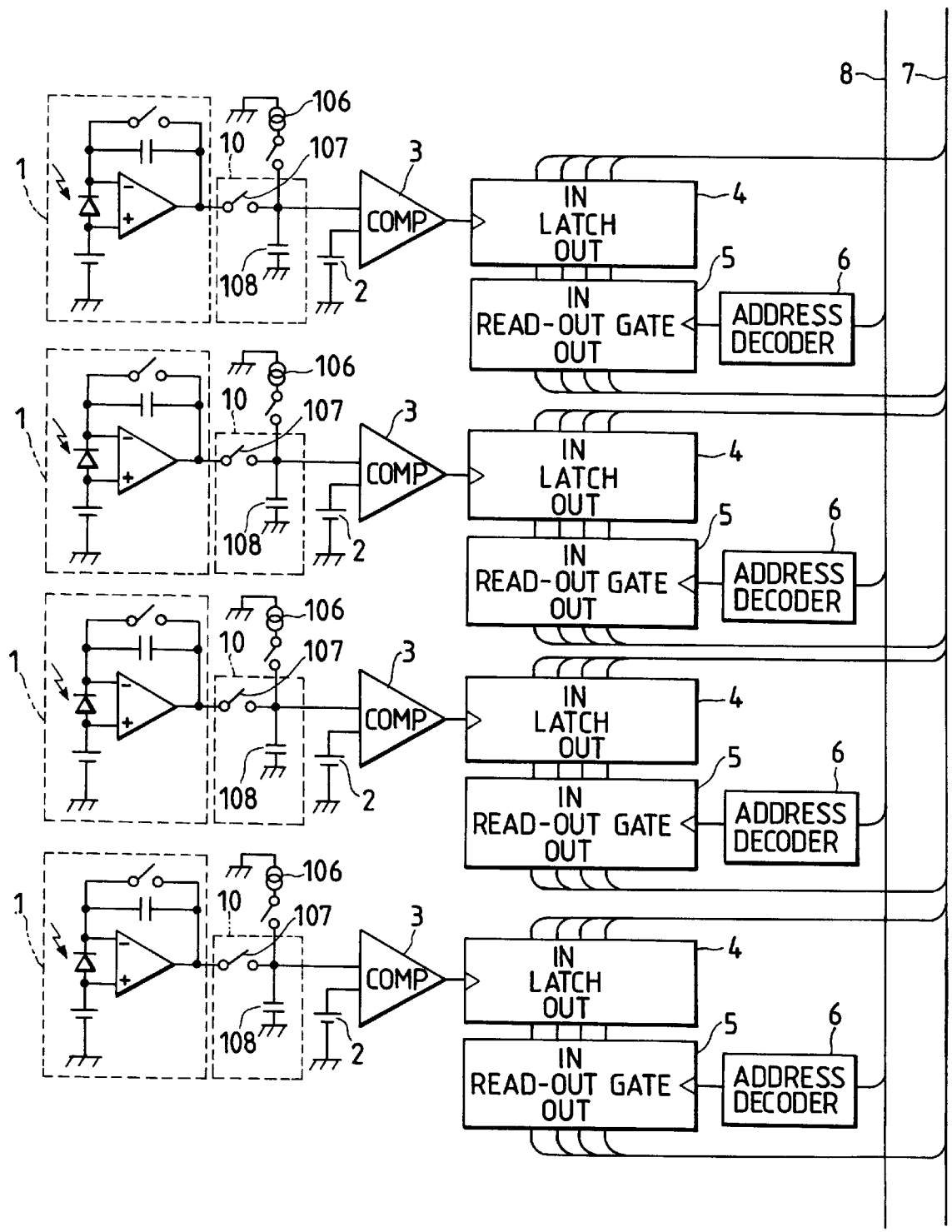
FIG. 40 is a circuit diagram showing still another embodiment of the present invention.

FIG. 40 shows still another embodiment of the present invention. A method of reading out digital signals of this embodiment is the same as that of the embodiment shown in FIG. 32. This embodiment is different from the embodiment shown in FIG. 36 in that charging of integrators of light quantity sensors 1 is performed for capacitors 108 after sampling-and-holding.

In each of the above embodiments, after exposure and light shielding or sampling-and-holding are performed, the outputs from the light quantity sensors are converted into digital values by counting a time between starting reintegration and reaching overflow or a predetermined level. The same result can also be obtained by counting a time from the timing at which discharge is started, instead of reintegration, such that an electric charge is reduced at a predetermined rate to the timing at which the electric charge becomes zero (the voltage drops below a predetermined voltage). In this case, the count of the time from the start of discharge is preferably count-up.

In the previous embodiments, since nondestructive read-out is possible at an arbitrary necessary timing even during exposure, photometry can be advantageously performed in real time.

In the previous embodiments, by setting a nonlinear value for the reference resistor array of the ADCs 11, an object to be imaged can be nonlinearly converted into a digital value in order to obtain γ or Knee characteristics. The same effect can be obtained in the other embodiments by setting unequal clock intervals for counting the time. This effect can also be obtained by partially abandoning the electric charges being stored in the photoelectric converting elements 11 or the integrators during the storage period.

Figure 41:
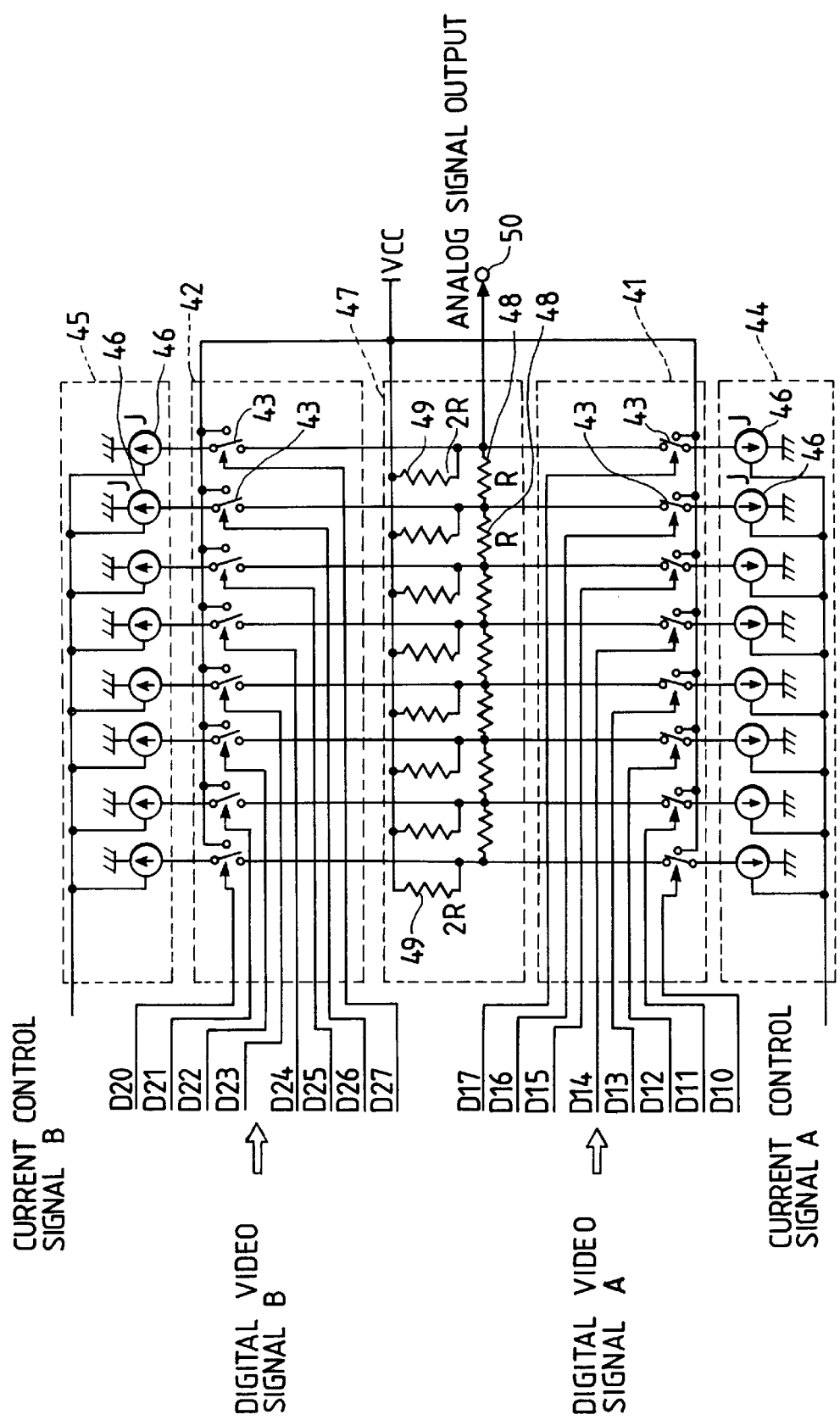
FIG. 41 is a circuit diagram showing still another embodiment of the present invention.

FIG. 41 shows still another embodiment of the present invention.

Referring to FIG. 41, switch circuits 41 and 42 are constituted by a plurality of switches 43 switched by digital data of digital video signals A and B, respectively. Current source circuits 44 and 45 are constituted by a plurality of current sources 46 connected to one end each of the switch circuits 41 and 42, respectively. The currents of the current sources 46 constituting the current source circuit 44 are controlled by an external current control signal A, and the currents of the current sources 46 constituting the current source circuit 45 are controlled by an external current control signal B. A resistor circuit 47 includes a plurality of resistors 48 and 49 connected to the other ends of the switch circuits 41 and 42, respectively. The resistor circuit 47 is connected to an analog signal output terminal 50.

The operation of this embodiment will be described below. The digital data (e.g., eight bits from D17 to D10) of the digital video signal A input to the switch circuit 41 controls switching between the switches 43 as the constituent elements of the switch circuit 41 in accordance with data. Since the current source circuit 44 is connected to one end of the switch circuit 41, the switch circuit 41 and the current source circuit 44 together function as a current switch for controlling current supply to a load in accordance with the data of the digital video signal A. In this case, the load is the resistor circuit 47 connected to the other end of the switch circuit 41.

As shown in FIG. 41, the resistor circuit 47 is constituted by the resistors 48 and 49 with resistances R and 2R, respectively, and the current switch described above is connected to the intermediate taps of these resistors. In this resistor circuit 47, as is well known as an R-2R resistor network, the impedance equals 2R in all directions of the resistors 48 and 49 connected to any intermediate tap. Therefore, currents having an equal value J controlled by the individual bits of the digital data of the digital video signal A are so distributed as to undergo binary weighting ($2^0/3 \times J$ to $2^{-7}/3 \times J$) at the analog signal output terminal 50 in accordance with the individual bits and flow through the resistors 49 connected to the analog signal output terminal 50. As a result, a voltage proportional to the digital value of the digital video signal A is output.

The resistor circuit 47 is also connected to another current switch identical with the above-mentioned current switch; that is, a current switch constituted by the switch circuit 42 controlled by the digital data (e.g., eight bits from D27 to D20) of the digital video signal B and the current source circuit 45.

These two current switches therefore share the resistor circuit 47 as the load. Also in this case, due to the characteristics of the resistor circuit 47 as described above, currents controlled by the individual bits of the data of the digital video signal B are so distributed as to undergo binary weighting in accordance with the individual bits and flow through the resistors 49 connected to the analog signal output terminal 50. Since the current distributed by the digital video signal A already flows at this time, the currents controlled by the digital video signals A and B are so distributed as to undergo binary weighting independently of each other by the resistor circuit 47. Consequently, a voltage obtained by adding the digital values indicated by the digital video signals A and B is output as an analog video signal.

In addition, the current values of the current source circuits 44 and 45 can be controlled continuously by the current control signals A and B, respectively, and so their conversion gains for converting digital values into analog values (voltages) can also be controlled continuously. This makes it possible to freely adjust the addition ratio of the digital video signal A to the digital video signal B. Although the above embodiment has two current switches, the same effect can naturally be obtained by using a plurality of current switches.

Figure 42:
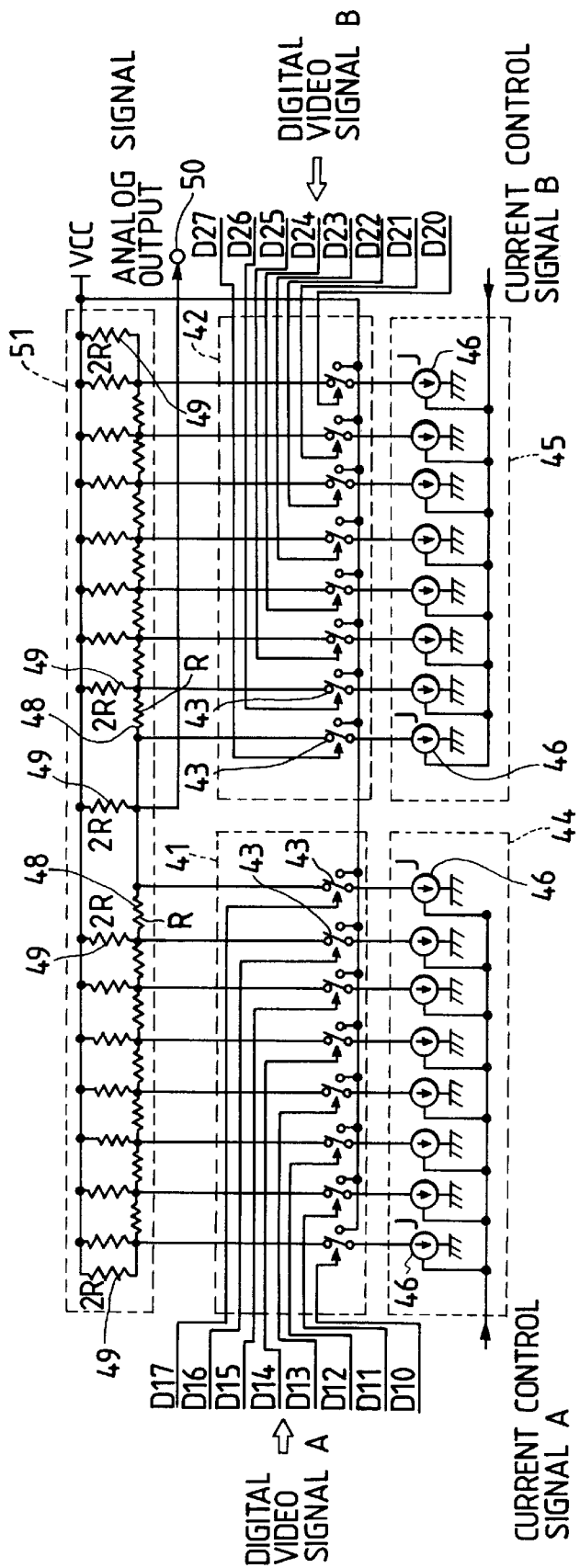
FIG. 42 is a circuit diagram showing still another embodiment of the present invention.

FIG. 42 shows still another embodiment of the present invention. The same reference numerals 41 to 50 as in FIG. 41 denote the same parts in FIG. 42. Referring to FIG. 42, a resistor circuit 51 includes resistors 48 and 49 with resistances R and 2R, respectively. Two current switches constituted by switch circuits 41 and 42 and current source circuits 44 and 45, respectively, are connected to different terminals of the resistor circuit 51.

Focusing attention on an analog signal output terminal 50 of the resistor circuit 51, the impedance in the direction of the resistor 48 with the resistance R on the right-hand side is 2R. Therefore, for the current switch controlled by digital data of a digital video signal A, this resistor circuit is a load exactly equivalent to the resistor circuit 47 shown in FIG. 41, and a current distributed by the resistors 49 connected to the analog signal output terminal 50 is also the same as that shown in FIG. 41. Likewise, since the impedance in the direction of the resistor 48 with the resistance R on the left side of the analog signal output terminal 50 is also 2R, the same current distribution as in FIG. 41 is obtained by a digital video signal B. As a result, the arrangement shown in FIG. 42 is equivalent in operation to that shown in FIG. 41 and can therefore provide the same effect.

Figure 43:
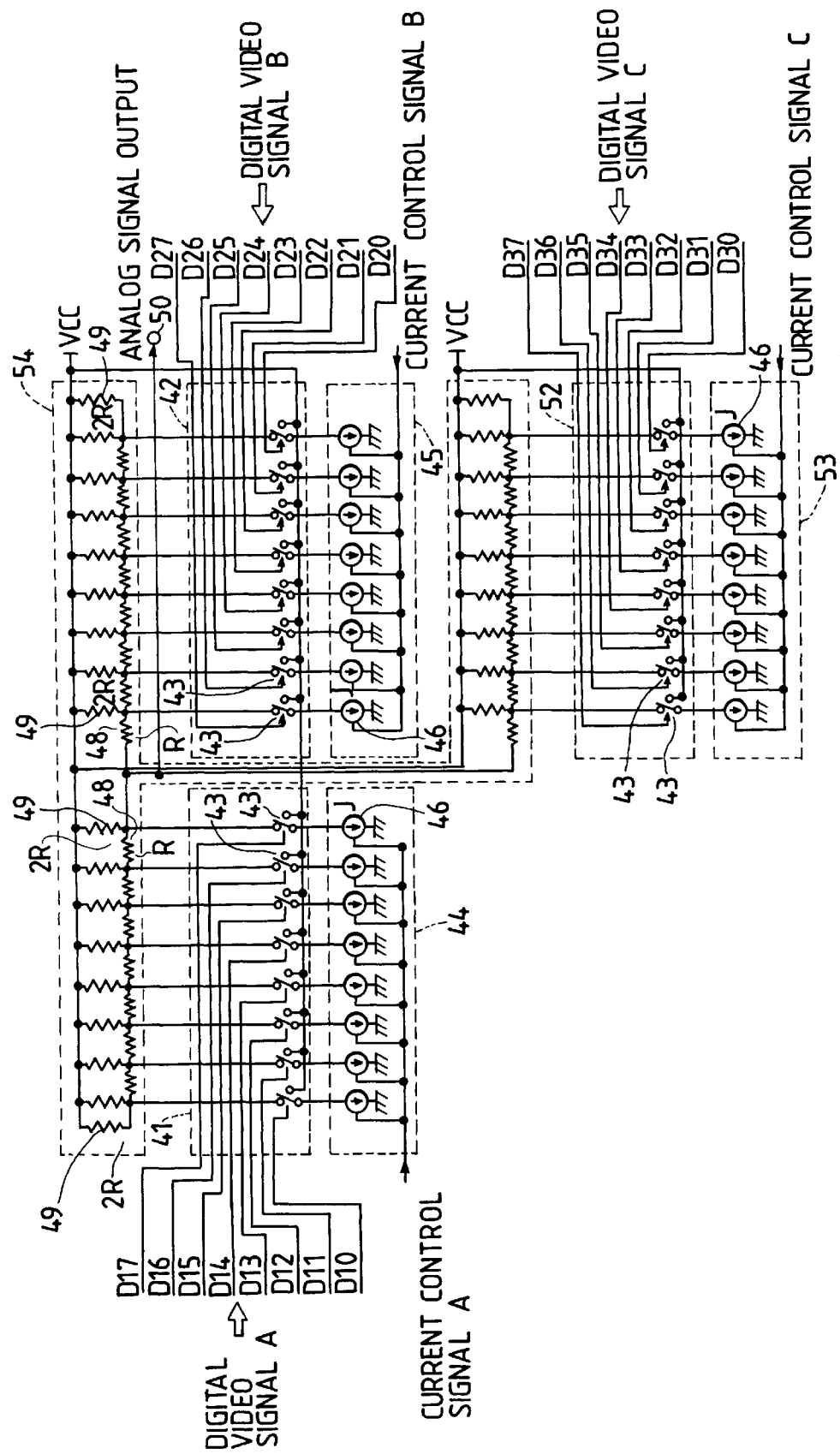
FIG. 43 is a circuit diagram showing still another embodiment of the present invention.

FIG. 43 shows still another embodiment of the present invention. The same reference numerals 41 to 50 as in FIG. 41 denote the same parts in FIG. 43. Referring to FIG. 43, a switch circuit 52 is constituted by switches 43 controlled by digital data of a digital video signal C. A current source circuit 53 is constituted by a plurality of current sources 46 connected to the switch circuit 52. A resistor circuit 54 includes resistors 48 and 49 having resistances R and 2R, respectively. Three current switches constituted by the switch circuits 41, 42, and 52 and the current source circuits 44, 45, and 53, respectively, are connected to different terminals of the resistor circuit 54.

The circuit shown in FIG. 43 illustrates an example of addition of the three digital video signals A, B, and C at a given addition ratio, as an extension of the arrangement shown in FIG. 42. Like in the embodiment shown in FIG. 42, the impedance of an analog signal output terminal 50 is 2R in any direction, and this means that current distribution is performed in the same manner as in FIG. 42.

Figure 44:
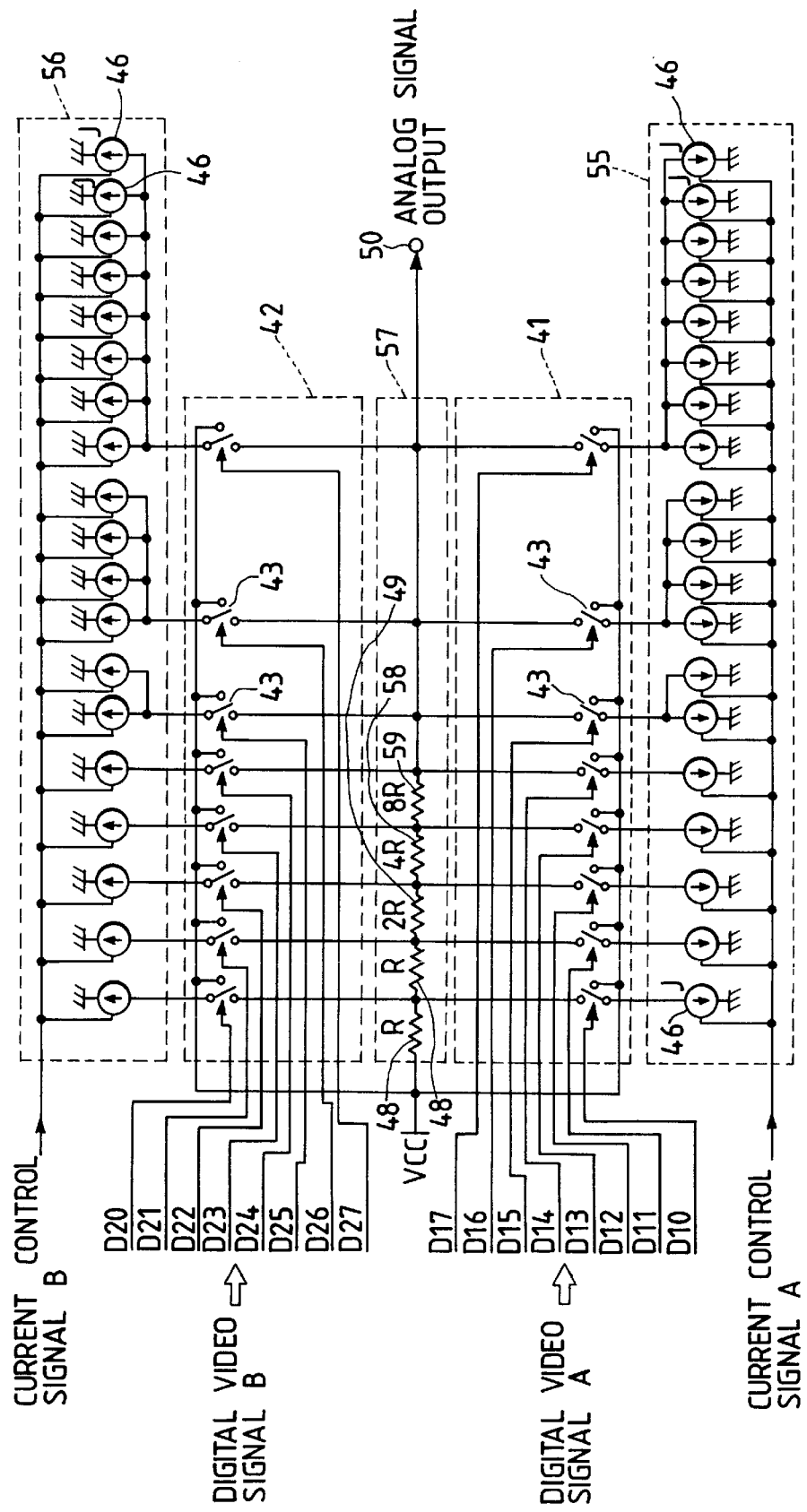
FIG. 44 is a circuit diagram showing still another embodiment of the present invention.

FIG. 44 shows still another embodiment of the present invention. Referring to FIG. 44, switch circuits 41 and 42 are analogous to those shown in FIG. 41. Current source circuits 55 and 56 are constituted by current sources 46 connected to one end each of the switch circuits 41 and 42 and externally controlled by current control signals A and B, respectively. In these current source circuits 55 and 56, the numbers of the current sources 46 connected to switches 43 as the constituent elements of the switch circuits 41 and 42 are weighted. A resistor circuit 57 includes resistors 48, 49, 58, and 59 connected to the other ends of the switch circuits 41 and 42 and having weighted resistances R, 2R, 4R, and 8R, respectively.

The operation of this embodiment will be described below. As described above, the current source circuit 55 is connected to one end of the switch circuit 41, and the other end of the switch circuit 41 is connected to the intermediate tap of the resistor circuit 57. This constitutes a current switch for controlling current supply to the resistor circuit 57, as a load, in accordance with digital data of a digital video signal A.

In the resistor circuit 57, the resistances of the resistors 48, 49, 58, and 59 as the constituent components are binary-weighted, as shown in FIG. 44. Therefore, currents that are switch-controlled by the lower bits of the digital video signal A and have an equal value J flow through the resistor circuit 57, generating voltages binary-weighted in accordance with the individual bits at an analog signal output terminal 50. As for currents controlled by the three upper bits of the digital video signal A, since the numbers of the current sources 46 of the current source circuit 55 are binary-weighted, voltages binary-weighted in accordance with the individual bits are also generated at the analog signal output terminal 50. As described above, by weighting the resistances and the current values, a voltage proportional to the digital value indicated by the digital video signal A is output to the analog signal output terminal 50.

The resistor circuit 57 is also connected to another current switch identical with the above current switch, which consists of the switch circuit 42 and the current source circuit 56 controlled by a digital video signal B. These two current switches therefore share the resistor circuit 57 as a load. Since, however, these two current switches operate independently of each other, a voltage proportional to the digital data indicated by the digital video signal B is generated at the analog output terminal 50. At this point, the voltage generated by the digital video signal A already exists. Consequently, a voltage of an analog video signal as the sum of the digital video signals A and B is generated. In addition, the current values of the current source circuits 55 and 56 can be controlled continuously by the current control signals A and B, respectively, and so their conversion gains for converting digital values into analog values (voltages) can also be controlled continuously. This makes it possible to freely adjust the addition ratio of the digital video signal A to the digital video signal B.

Also in this embodiment, three or more current switches can be provided.

According to the above embodiment of the present invention, the analog-to-digital converting means are provided for the individual pixels in the solid-state image pickup element. This can reduce the quantity of analog information transfer, preventing degradation in image quality caused by analog information transfer.

In addition, according to the other embodiment of the present invention, a plurality of current switches whose currents are controlled by their respective digital signals are connected to the resistor circuit. Therefore, a plurality of digital signals can be converted into an analog signal by adding them at a given addition ratio.

Furthermore, there can be provided an addition device which can perform current control over a relatively wide range and hence has a wide dynamic range, and is also excellent in frequency characteristics because of the ability to switch the current switches at a high speed. Since the device has a relatively simple configuration formed by arranging a plurality of current switches, it is advantageous in circuit scale and consumption power.

What is claimed is:

1. An image pickup device comprising:

indication means for producing an indication signal when a signal amount accumulated in each pixel of a solid-state image pickup element reaches a predetermined signal amount which is set in advance;

time measuring means for measuring a time period from a start of accumulation in a pixel of a signal to a time when said indication signal is produced by said indication means and outputting time information corresponding to the time period; and calculation means for calculating an accumulation signal amount of the pixel at a predetermined subsequent timing based on the time information output from said time measuring means.

2. A device according to claim 1, wherein said calculation means performs the calculation on the basis of an equation below:

$$V_e = V_1 + \alpha\{(t_s/t_1)V_1' - V_1'\}$$

where $V_e$ ... the signal amount of one pixel $V_1'$ ... the predetermined signal amount $t_s$ ... the accumulation time $t_1$ ... the time required to reach $V_1'$ $\alpha$ ... a coefficient ($0 \leq \alpha \leq 1$).

3. A device according to claim 2, wherein the predetermined signal amount $V_1'$ of the equation is the same as a preset threshold value.

4. An image pickup device comprising:

indication means for indicating whether a signal amount accumulated in each pixel of a solid-state image pickup element reaches a predetermined signal amount during an accumulation time;

reset means for resetting the accumulated signal for each pixel in accordance with the indication by said indication means; and calculation means for calculating the total accumulated signal of each pixel based on a number of reset times occurring within a predetermined time and the amount of the signal accumulated after the predetermined time has elapsed.

5. An image pickup apparatus comprising:

(a) a light receiving cell for photoconverting incident light into an electrical signal;

(b) detecting means for detecting a first timing when said electrical signal reaches a predetermined level; and (c) calculation means for calculating an electrical signal level at a subsequent second timing based on a relationship between the first timing and the second timing.

6. An image pickup apparatus comprising:

(a) a light receiving cell for photoconverting incident light into an electrical signal;

(b) detecting means for detecting that the electrical signal reaches a predetermined level;

(c) resetting means for resetting the electrical signal in response to an output of said detecting means;

(d) counting means for counting how many times said detecting means detects that the electrical signal reaches the predetermined level; and (e) calculating means for calculating a signal level based on the counted number and a level of the electrical signal remaining after a last resetting operation.

* * * * *

UNITED STATES PATENT AND TRADEMARK OFFICE
CERTIFICATE OF CORRECTION

PATENT NO. : 5,872,596
DATED : February 16, 1999
INVENTOR(S) : TOSHIKAZU YANAI, ET AL.

Page 1 of 3

It is certified that error appears in the above-identified patent and that said Letters Patent is hereby corrected as shown below:

COLUMN 1

Line 31, "plurality of" should be deleted.

COLUMN 6

Line 21, "closer" should read --close--.

COLUMN 7

Line 6, "e1" should read --$e_1$--.

COLUMN 11

Line 13, "like" should read --as--.
line 32, "Like" should read --As--.

UNITED STATES PATENT AND TRADEMARK OFFICE
CERTIFICATE OF CORRECTION

PATENT NO. : 5,872,596
DATED : February 16, 1999
INVENTOR(S) : TOSHIKAZU YANAI ET AL.

It is certified that error appears in the above-identified patent and that said Letters Patent is hereby corrected as shown below:

COLUMN 12

Line 31, "descried" should read --described--.

COLUMN 18

Line 9, "in to" should read --into--.

COLUMN 24

Line 65, "Like" should read --As--.

COLUMN 25

Line 22, "like" should read --as--.
Line 43, "in shown" should read --as shown--.
Line 59, "Like" should read --As--.

UNITED STATES PATENT AND TRADEMARK OFFICE
CERTIFICATE OF CORRECTION

PATENT NO. : 5,872,596
DATED : February 16, 1999
INVENTOR(S) : TOSHIKAZU YANAI ET AL.

It is certified that error appears in the above-identified patent and that said Letters Patent is hereby corrected as shown below:

COLUMN 26

Line 6, "addition &" should read --additional--.

COLUMN 28

Line 37, "Like" should read --As--.

Signed and Sealed this

Ninth Day of May, 2000

Attest:

Attesting Officer

Q. TODD DICKINSON

Director of Patents and Trademarks